United States Patent [19]
Ohmori

[11] Patent Number: 5,805,550
[45] Date of Patent: Sep. 8, 1998

[54] RECORDING MEDIUM CAPABLE OF RECORDING A FIRST DATA-TYPE AND A SECOND DATA-TYPE, PLAYBACK METHOD AND PLAYBACK DEVICE FOR PLAYING BACK FROM THE RECORDING MEDIUM, AND RECORDING DEVICE FOR RECORDING FIRST-TYPE DATA AND SECOND TYPE DATA ON THE RECORDING MEDIUM

[75] Inventor: Takashi Ohmori, Tokyo, Japan

[73] Assignee: Sony Corporation, Tokyo, Japan

[21] Appl. No.: 870,505

[22] Filed: Jun. 6, 1997

Related U.S. Application Data

[62] Division of Ser. No. 505,749, Jul. 21, 1995, Pat. No. 5,737,290.

[30] Foreign Application Priority Data

Jul. 29, 1994 [JP] Japan .................................. 6-196162

[51] Int. Cl.$^6$ ...................................................... G11B 3/90
[52] U.S. Cl. ............................................. 369/58; 369/32
[58] Field of Search ............................. 369/30, 32, 33, 369/47, 48, 53, 54, 58

[56] References Cited

U.S. PATENT DOCUMENTS

| 4,893,193 | 1/1990 | Nakamura et al. | 358/341 |
|---|---|---|---|
| 5,303,219 | 4/1994 | Kulakowski et al. | 369/54 |
| 5,349,657 | 9/1994 | Lee | 395/650 |
| 5,428,598 | 6/1995 | Veldhuis et al. | 369/275.3 |
| 5,499,224 | 3/1996 | Sanada | 369/48 |

FOREIGN PATENT DOCUMENTS

| 0 165 320 A1 | 12/1985 | European Pat. Off. | G11B 7/00 |
|---|---|---|---|
| 0 274 196 A1 | 7/1988 | European Pat. Off. | H04N 1/40 |
| 0 448 378 A2 | 9/1991 | European Pat. Off. | G11B 7/007 |
| 0 613 144 A2 | 8/1994 | European Pat. Off. | G11B 27/28 |
| 0 655 740 A1 | 5/1995 | European Pat. Off. | G11B 27/00 |
| 37 34 638 A1 | 4/1988 | Germany | G11B 7/007 |

Primary Examiner—Paul W. Huber
Attorney, Agent, or Firm—Limbach & Limbach L.L.P.

[57] ABSTRACT

The present invention relates to a recording medium recorded with audio data and general data (including image data for computers and character data) mixed together, provided with data for each control region, where by providing a special simple control region, editing of complicated control regions does not have to be carried out and a memory region is not necessary as a working region for editing.

The present invention also provides a playback device where playback can be achieved without mixing the simple control region with the control region for the audio and general data and, by also recording copy-protection information at the simple control region, a playback operation from a recording medium which has been copied illegally will not be possible.

The present invention further relates to a recording device a recording device for updating each control region while data updating is being carried out at the recording medium.

13 Claims, 45 Drawing Sheets

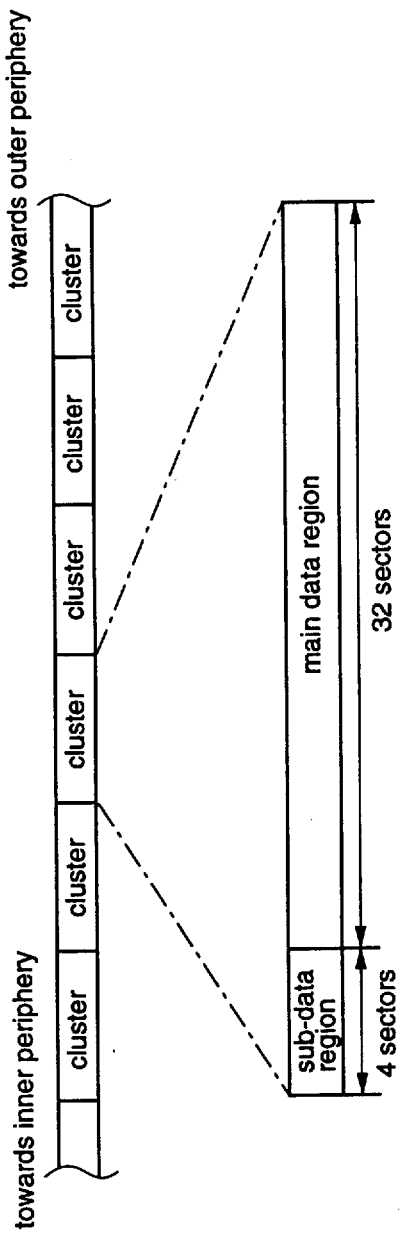

| | 16bit | | 16bit | | |
|---|---|---|---|---|---|
| | MSB LSB | MSB LSB | MSB LSB | MSB LSB | |
| header | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | clusterH | clusterL | 00000000 | 00000000 | 3 |
| | 00000000 | 00000000 | 00000000 | 00000000 | 4 |
| | 00000000 | 00000000 | 00000000 | 00000000 | 5 |
| | "M" | "I" | "N" | "X" | 6 |
| | disk type | rec power | first TNO | last TNO | 7 |
| | read out start address(LOA) | | | used sectors | 8 |
| | power calibration area start address(PCA) | | | rec powerPW2 | 9 |
| | U-TOC start address(USTA) | | | 00000000 | 10 |
| | recordable user area start address(RSTA) | | | 00000000 | 11 |
| compatible table indication data | 00000000 | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| control table (255 part table) (01) | start address (track #1) | | | track mode | 78 |
| | end address | | | 00000000 | 79 |
| (02) | start address (track #1) | | | track mode | 80 |
| | end address | | | 00000000 | 81 |
| (03) | start address (track #1) | | | track mode | 82 |
| | end address | | | 00000000 | 83 |
| (FC) | start address | | | track mode | 580 |
| | end address | | | 00000000 | 581 |
| (FD) | start address | | | track mode | 582 |
| | end address | | | 00000000 | 583 |
| (FE) | start address | | | track mode | 584 |
| | end address | | | 00000000 | 585 |
| (FF) | start address (track #255) | | | track mode | 586 |
| | end address | | | 00000000 | 587 |

P-TOC sector-0

FIG.5

| | 16bit | | 16bit | | |
|---|---|---|---|---|---|
| | MSB     LSB | MSB     LSB | MSB     LSB | MSB     LSB | |
| header { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | clusterH | clusterL | 00000000 | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | maker code | model code | first TNO | last TNO | 7 |
| | 00000000 | 00000000 | 00000000 | used sectors | 8 |
| | 00000000 | 00000000 | 00000000 | 00000000 | 9 |
| | 00000000 | 00000000 | 00000000 | disk serial No | 10 |
| compatible table indication data { | disk | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| (01) | start address | | track mode | | 78 |
| | end address | | link information | | 79 |
| (02) | start address | | track mode | | 80 |
| | end address | | link information | | 81 |
| (03) | start address | | track mode | | 82 |
| | end address | | link information | | 83 |
| control table (255 part table) (FC) | start address | | track mode | | 580 |
| | end address | | link information | | 581 |
| (FD) | start address | | track mode | | 582 |
| | end address | | link information | | 583 |
| (FE) | start address | | track mode | | 584 |
| | end address | | link information | | 585 |
| (FF) | start address | | track mode | | 586 |
| | end address | | link information | | 587 |

U-TOC sector-0

| 0 0 | allocation block yet to be recorded |
| 0 1 | allocation block already recorded |
| 1 0 | defect allocation block |
| 1 1 | yet-to-be-defined allocation block |

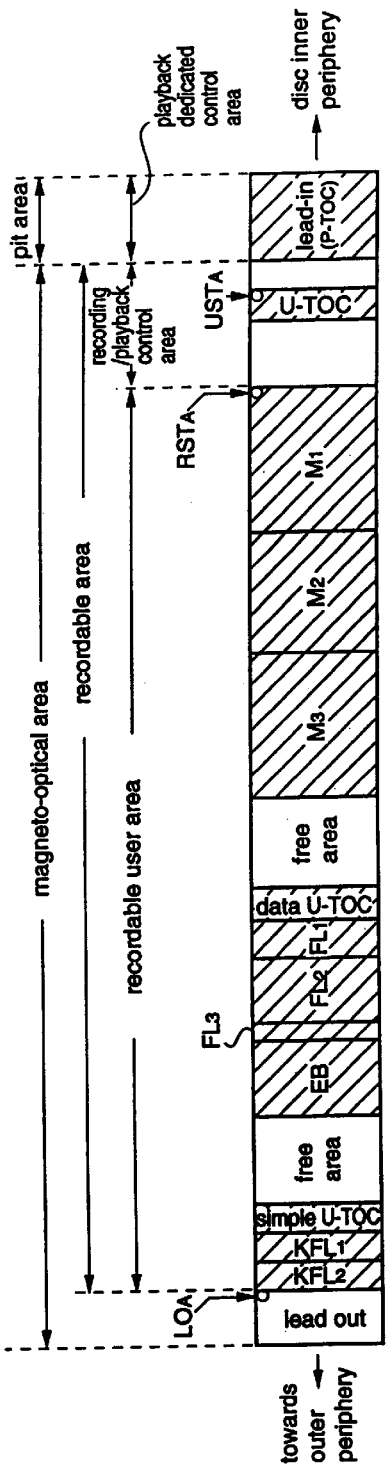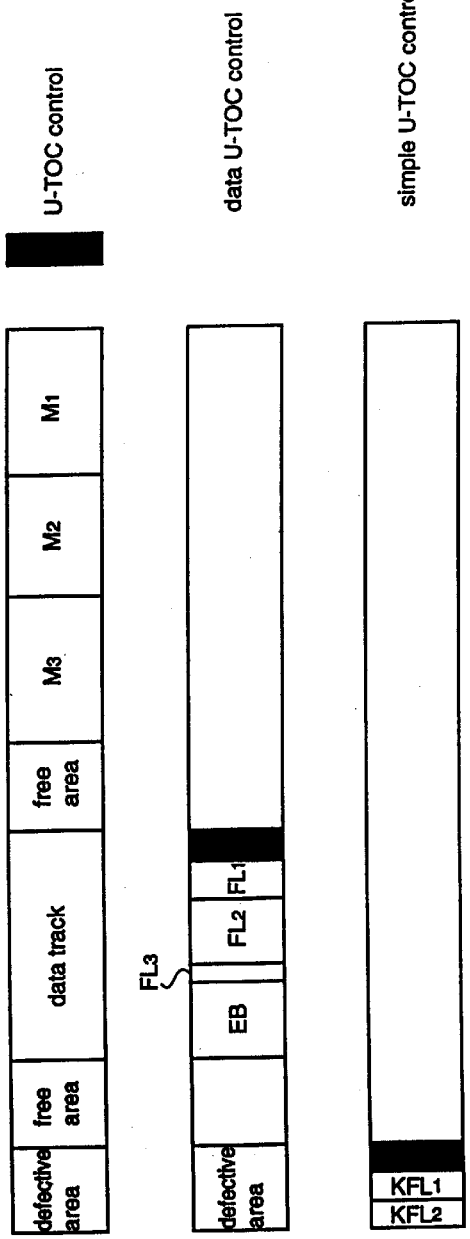
FIG.23A  FIG.23B  FIG.23C  FIG.23D

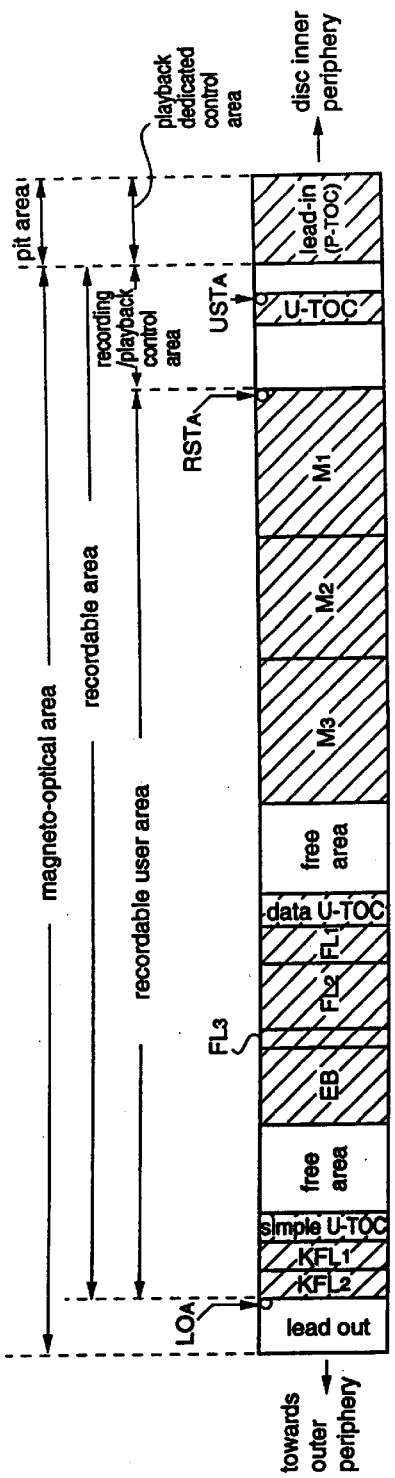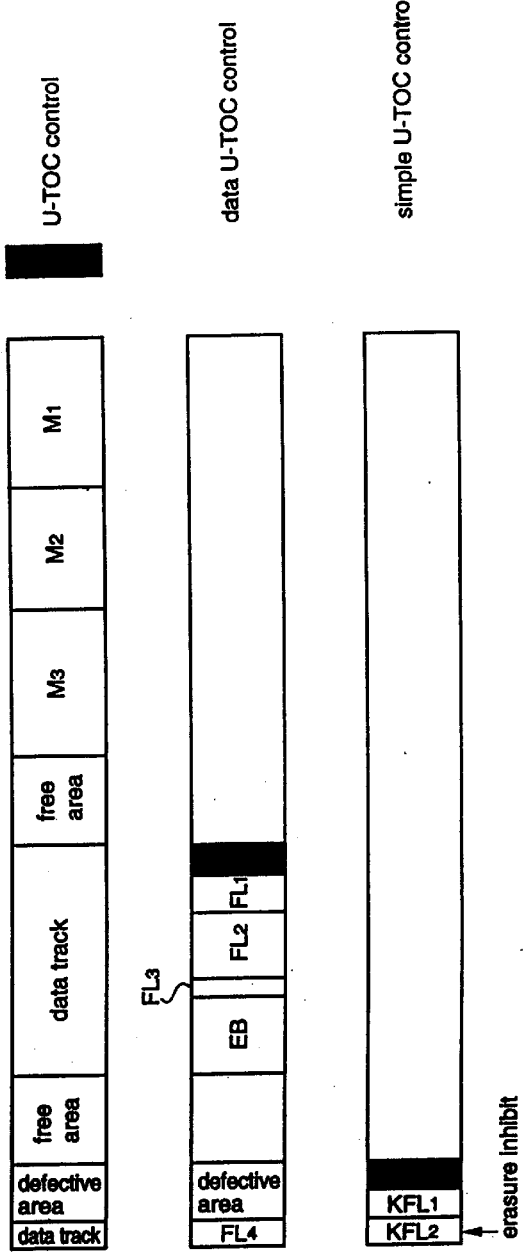
FIG.24A  FIG.24B  FIG.24C  FIG.24D

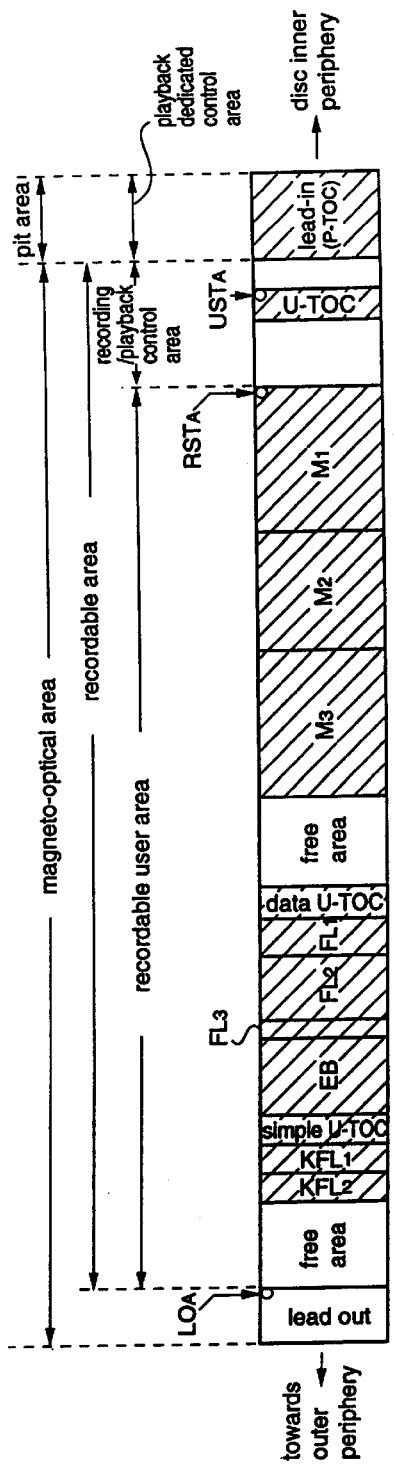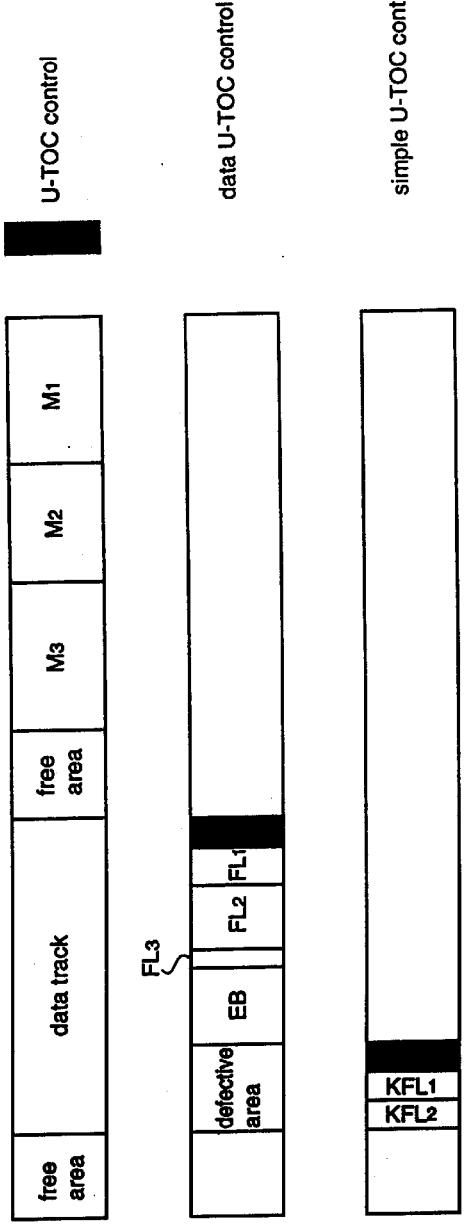
FIG.25A  FIG.25B  FIG.25C  FIG.25D

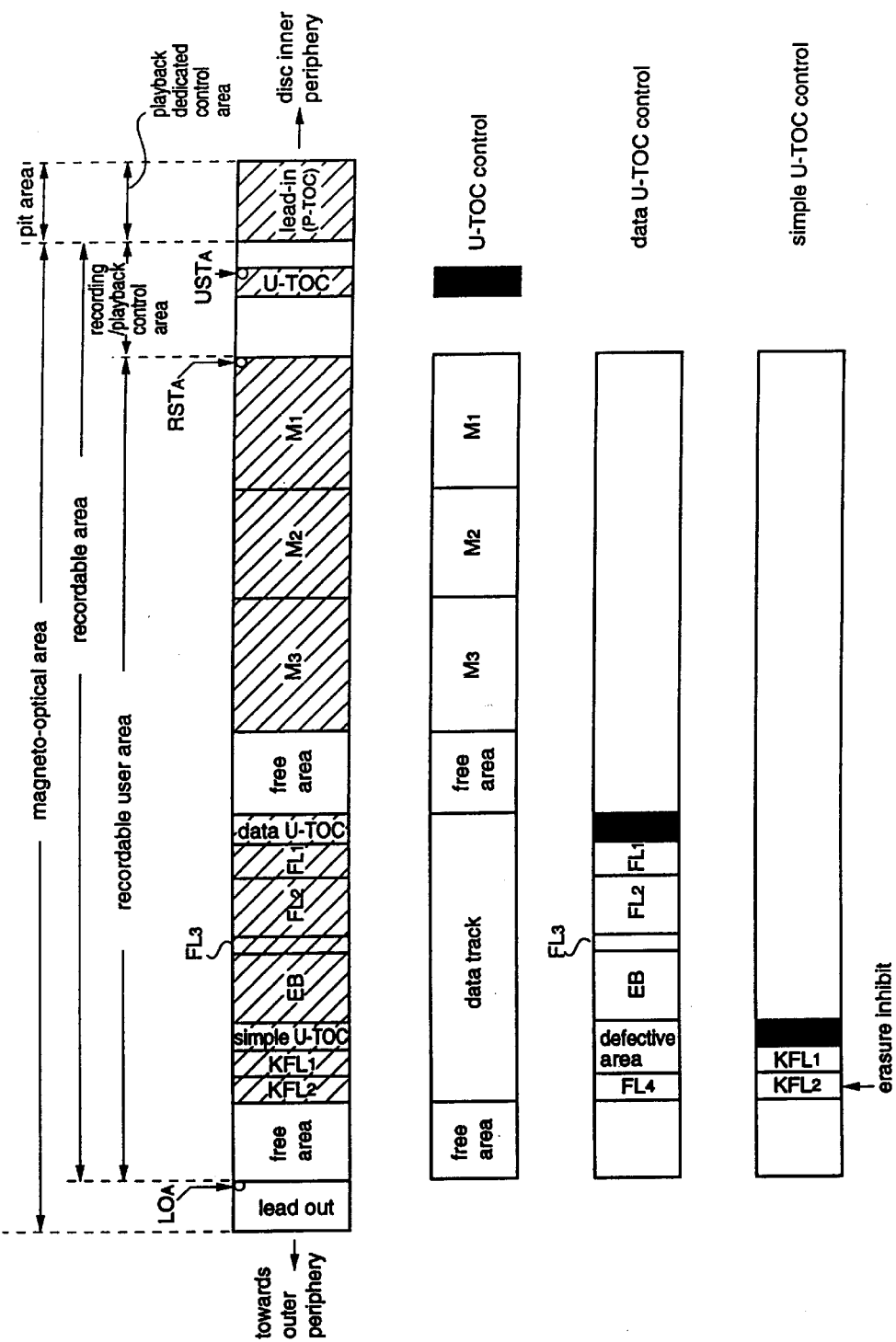

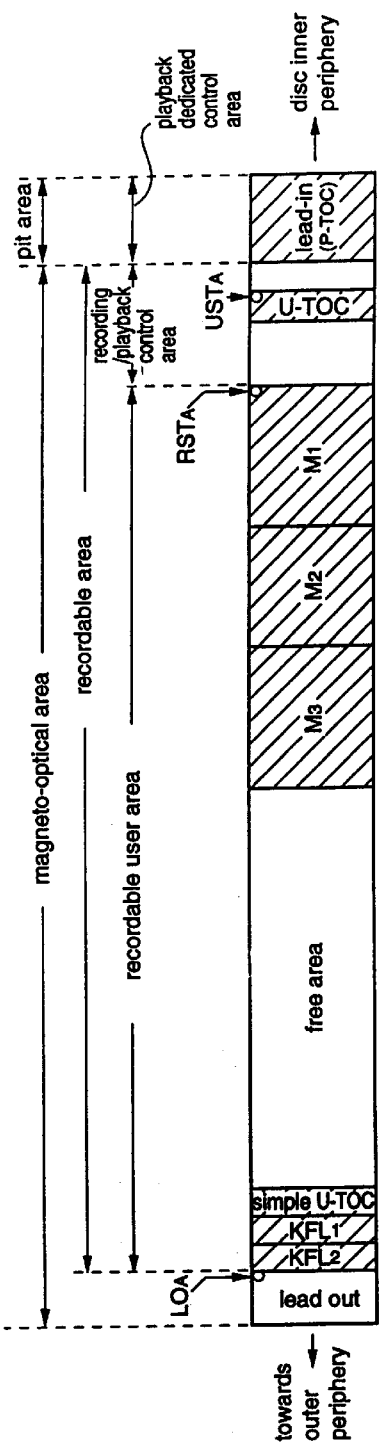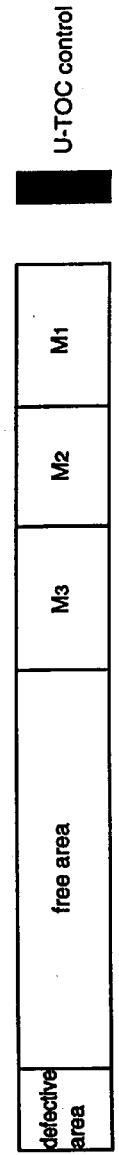
FIG.27A  FIG.27B  FIG.27C  FIG.27D

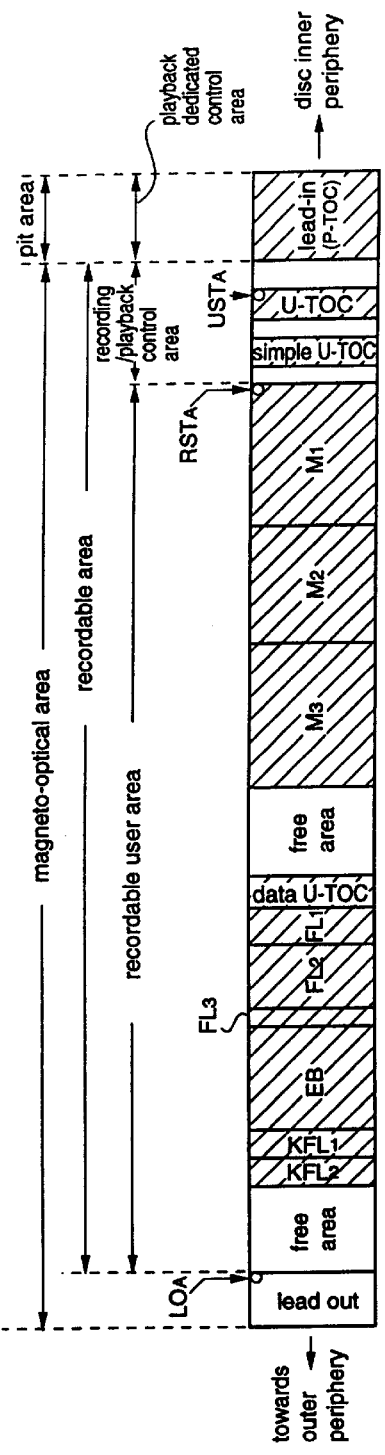
FIG.37A   FIG.37B   FIG.37C   FIG.37D

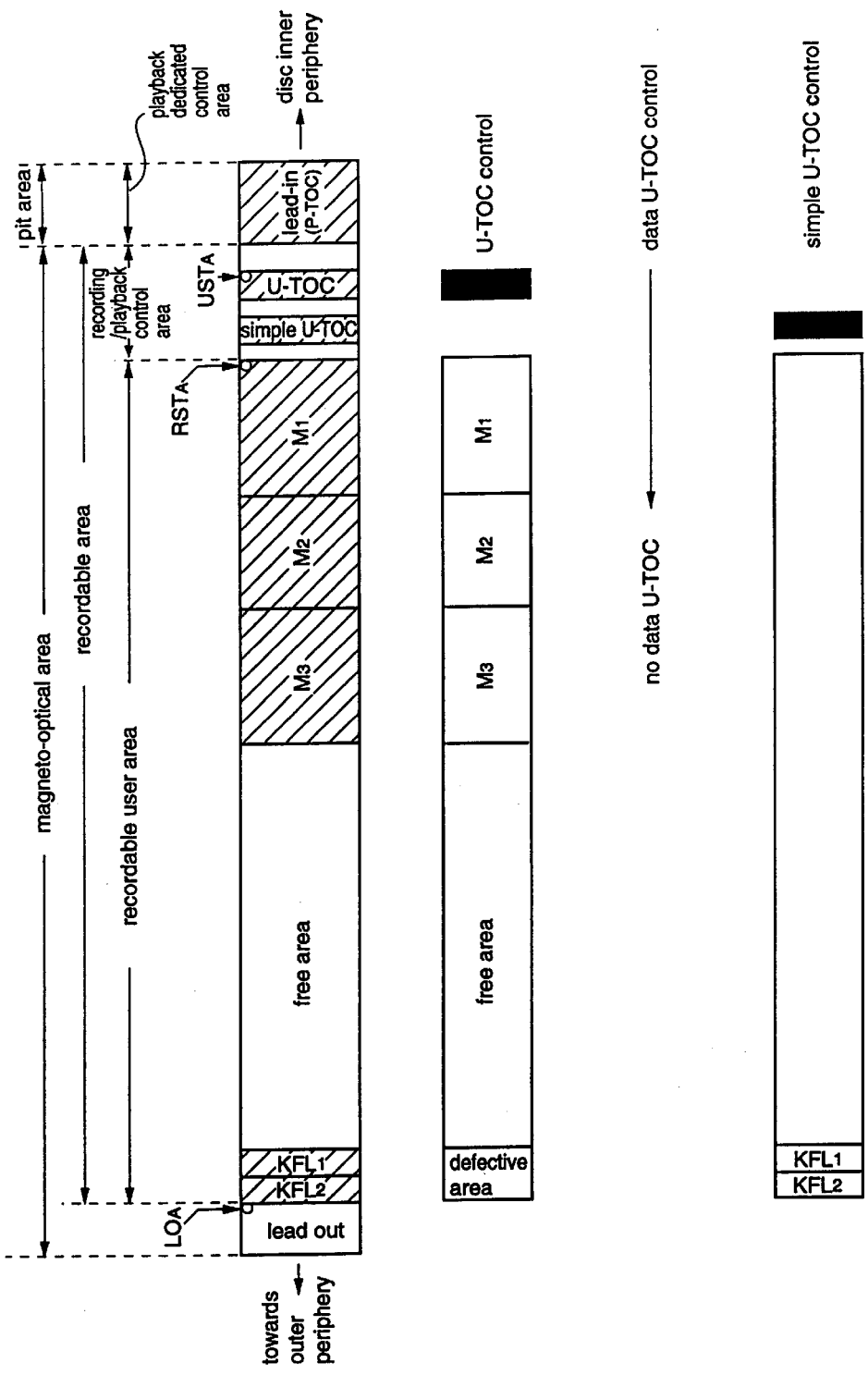

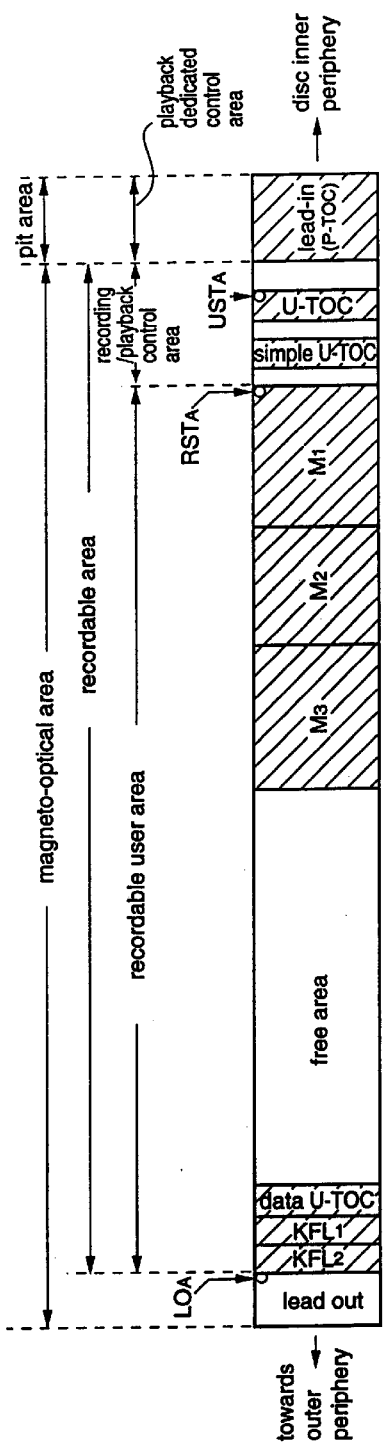
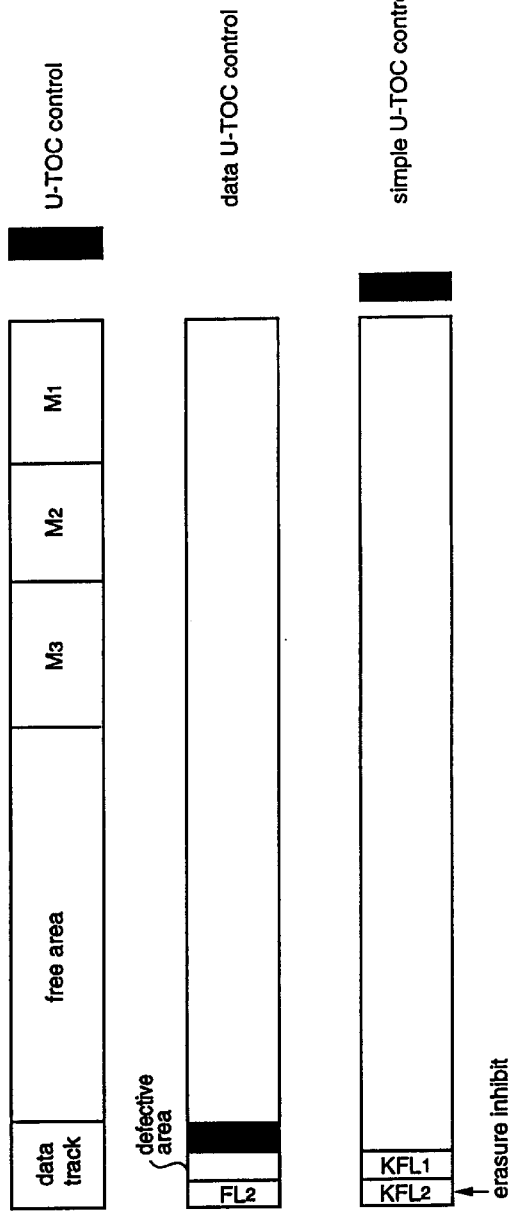
FIG.39A  FIG.39B  FIG.39C  FIG.39D

RECORDING MEDIUM CAPABLE OF RECORDING A FIRST DATA-TYPE AND A SECOND DATA-TYPE, PLAYBACK METHOD AND PLAYBACK DEVICE FOR PLAYING BACK FROM THE RECORDING MEDIUM, AND RECORDING DEVICE FOR RECORDING FIRST-TYPE DATA AND SECOND TYPE DATA ON THE RECORDING MEDIUM

This is a divisional of application Ser. No. 08/505,749, filed Jul. 21, 1995, now U.S. Pat. No. 5,737,290, which claims priority under 35 U.S.C. §119, from Japanese patent application no. 6-196162 filed on Jul. 29, 1994.

BACKGROUND OF THE INVENTION

1. Field of the Invention:

The present invention relates to a recording medium (disc) for carrying out data recording and corresponding playback method, recording method and playback device.

2. Description of Relative Art:

Magneto-optical discs have been developed for recording devices capable of recording and/or playing back audio data etc., playback devices, and as recording mediums. In particular, in recent years, optical disc devices where the user has not just been able to play back from the opto-magnetic discs, but has also been able to record audio such as music have become well known.

When using this optical disc device, in addition to the recording and/or playback of so-called audio signals, the recording and/or playback of data other than audio information may also be considered.

In this specification, so-called audio signals such as music and speech recorded on the magneto-optical disc put into digital form are referred to as "audio data", one unit of which is referred to as a "program" or "audio track". Information equipment user data for computers and the like such as characters or graphics recorded on the magneto-optical disc, which is not audio data, is then referred to as "general data", so as to be distinguished from audio data. A single recording/playback unit of this general data is then taken as a "data file".

However, the structure of the format of optical disc devices was originally for audio use and does not lend itself easily to being made capable of the kind of information search and updating required of use with general data. In particular, program control information for audio applications and data file control information for data use differ in that name data and attribute data etc. for searches is not required. In audio applications, just the address corresponding to the program number is sufficient. Data for making data transmissions to outside equipment is also not necessary. Further, the existence of a multiplicity of items small in data volume found in general data is fairly unlikely with audio data, and compatibility with the case where an extremely large number of small data files exist is not necessary with audio files. For example, control information for use with audio data to be described later is only compatible up to a maximum of 255 parts.

As described above, program control information for audio applications has been created in order to be suitable for musical applications and cannot be considered appropriate for general data use. For example, it is not appropriate to apply an optical disc device to use in the recording and playing back of general data while leaving the control method used as is.

Considering control conditions for the case of the recording of general data, it is necessary to carry out each of the various processes such as alignment using a file name valuation coefficient, substitution, file name table link modification and file allocation table maintenance with these control information editing processes in order to utilize the recorded general data effectively. However, a large amount of memory is required for these processes, power consumption is large and the speed of the editing process slows down as the number of necessary processes rises. Putting these processes into practice on, for example, compact equipment such as battery driven portable apparatus, proves to be difficult because of large power consumption and the difficulty in attaining a sufficient processing speed.

Further, simply copying and playing back data files does not give sufficient consideration to copy protection. i.e. it is a simple process to copy software provided by software manufacturers illegally onto disc without permission from the manufacturer and it is therefore preferable to carry out countermeasures accordingly.

SUMMARY OF THE INVENTION

As the present invention sets out to resolve these kinds of problems, it's object is to provide a recording medium, playback method, recording device and playback device capable of applying recording/playback systems for musical applications to data recording/playback use, capable of recording and playing back audio data and general data together, capable of preventing illegal copying and being suited to use with equipment demanding compactness and low power consumption.

Recording Medium

The present invention provides a recording medium capable of being recorded with, for example, audio programs and general data files (including character data for computer use and still image data etc.) at the same time. The recording medium is equipped with a first control region for controlling audio programs and a second control region for controlling general data files. The second control region is recorded at the physical head with respect to the general data files.

Further, the recording medium of the present invention may also be capable of being recorded with audio programs and general data files (including character data for computer use and still image data etc.) at the same time, with the recording medium then being equipped with a first control region for controlling audio programs, a second control region for controlling general data files and a third control region for controlling the general data files. The third control region and/or data files controlled by the third control region are controlled as defective regions at the first control region and the second control region. The third control region is therefore provided in such a manner that simple playback can be carried out easily.

Playback device

Still further, the present invention provides a playback device for playing back from a recording medium comprising, for example, audio programs, general data files (including character data for computer use and still image data etc.), a first control region for controlling the audio programs and a second control region for controlling general data files. The playback device comprises a determining part for playing back the first control information and determining whether or not general data files are present.

At this determining part, when determined that a general data file exists, second control information positioned at the head of the general data file is played back and the general data file is played back based on the played back second control region.

Moreover, the present invention also provides a playback device for playing back from a recording medium comprising audio programs, general data files (including character data for computer use and still image data etc.) a first control region for controlling the audio programs, a second control region for controlling general data files and a third control region for controlling general data files.

The playback device comprises a first determining part for playing back the first control information and determining whether or not the first control region is being controlled as a defective region;

a control part for controlling access of the defective part when determined that the first control region is being controlled as a defective part at the first determining part;

a second determining part for determining whether or not there is an error at the accessed defective region; and a third determining part for determining whether or not a third control region exists when the second determining part determines there to be no error at the accessed defective region. The third control region is played back when the third determining part determines the existence of a third control region and the general data file is played back based on the played back second control region.

Recording Device

The present invention also provides a recording device for recording and/or updating audio programs and/or general data from a recording medium comprising audio programs, general data files (including character data for computer use and still image data etc.), a first control region for controlling the audio programs and a second control region for controlling the general data files. The recording device comprises a recording part for recording audio programs and/or general data at a recordable region; and an updating part for updating the first control information and the second control information in such a manner that a region recorded with the general data is also controlled at the first control region while the general data is being recorded at the recordable region.

The present invention also provides a recording device for recording and/or updating audio programs and/or general data from a recording medium comprising audio programs, general data files (including character data for computer use and still image data etc.), a first control region for controlling a second control region controlling the audio programs and the general data, a second control region for controlling the general data recorded at the physical head of the general data files and a third control region for controlling general data in a simple manner. This recording device comprises a recording part for recording audio programs and/or general data at a recordable region; and updating means for, while the general data is being recorded at the recordable region, updating the first control information and/or the second control information in such a manner as to control the region recorded with the general data and the third control region as a defective region at the first control region and/or the second control region and updating control information occurring at the third control region.

The present invention further provides a recording device for recording and/or updating audio programs and/or general data on a recording medium comprising audio programs, general data files (including character data for computer use and still image data etc.), a first control region for controlling audio programs, a second control region for controlling general data recorded at the physical head of the general data files and a third control region for controlling general data in a simple manner provided approximately next to the first control region.

The recording device comprises a recording part for recording audio programs and/or general data at a recordable region; and an updating part for updating, while general data is being recorded at the recordable region, the first control information and/or the second control information in such a manner that the region recorded with the general data is controlled as a defective region at the first control region and/or the second control region and updating control information occurring at the third control region.

BRIEF DESCRIPTION OF THE DRAWINGS

FIGS. 3(a) and 3(b) are views describing the disc cluster structure of the embodiment;

FIG. 5 is a view describing P-TOC sectors of the disc of the embodiment;

FIG. 6 is a view describing U-TOC sectors of the disc of the embodiment;

FIGS. 23(a) through 23(d) are views describing disc track control conditions recorded at a simple U-TOC of the embodiment;

FIGS. 24(a) and 24(d) are views describing track control conditions after entry of data files corresponding to a simple U-TOC of the embodiment into a data U-TOC;

FIGS. 25(a) through 25(d) are views describing track control conditions of a disc recorded with a simple U-TOC of the embodiment;

FIGS. 26(a) through 26(d) are views describing track control conditions after entry of data files corresponding to a simple U-TOC of the embodiment into a data U-TOC;

FIGS. 27(a) through 27(d) are views describing track control conditions of a disc recorded with a simple U-TOC of the embodiment;

FIGS. 37(a) through 37(d) are views describing track control conditions after entry of data files corresponding to a simple U-TOC of the embodiment into a data U-TOC;

FIGS. 38(a) through 38(d) are views describing track control conditions of a disc recorded with a simple U-TOC of the embodiment;

FIGS. 39(a) through 39(d) are views describing track control conditions after entry of data files corresponding to a simple U-TOC of the embodiment into a data U-TOC;

DETAILED DESCRIPTION OF THE PREFERRED EMBODIMENTS

Embodiment

In the following, the present invention is described in the following order.

I. Structure of Recording/Playback Device
   I-1 Example of appearance
   I-2 Internal blocks
II. Disc Structure
   II-1 Cluster structure
   II-2 Track structure
   II-3 P-TOC sectors
   II-4 U-TOC sectors (first control information)
   II-5 Data U-TOC sectors (second control information)
      II-5-a Overall structure
      II-5-b Boot area
      II-5-c Volume descriptor
      II-5-d Volume-space bitmap
      II-5-e Management table
      II-5-f Directory record block
      II-5-g Extent record block
   II-6 Data sectors
III. Data File Playback Process
IV. Recording/Playback Methods Employing Simple U-TOC's (Type A)
   IV-1 Simple U-TOC sector (third control information)
   IV-2 Control conditions in the case of simple U-TOC recording
   IV-3 Data file recording process employing simple U-TOC
   IV-4 Data file playback processing employing a simple U-TOC and entry processing going to a data U-TOC
   IV-5 Copy-protected data recording employing a simple U-TOC
   IV-6 Copy-protection-compatible playback processing
V. Recording/Playback Methods Employing Simple U-TOC (type B)
   V-1 Control conditions when a simple U-TOC is recorded
   V-2 Data file recording processing employing simple U-TOC
   V-3 Data file playback processing and admission processing to data U-TOC using simple U-TOC
   V-4 Copy protected data recording employing a simple U-TOC.
   V-5 Copy-protection compatible playback processing
VI. Control of Data File Recording Position Using Simple U-TOC

I. Structure of Recording/Playback Device

I-1. Example of Appearance

Figure 1:
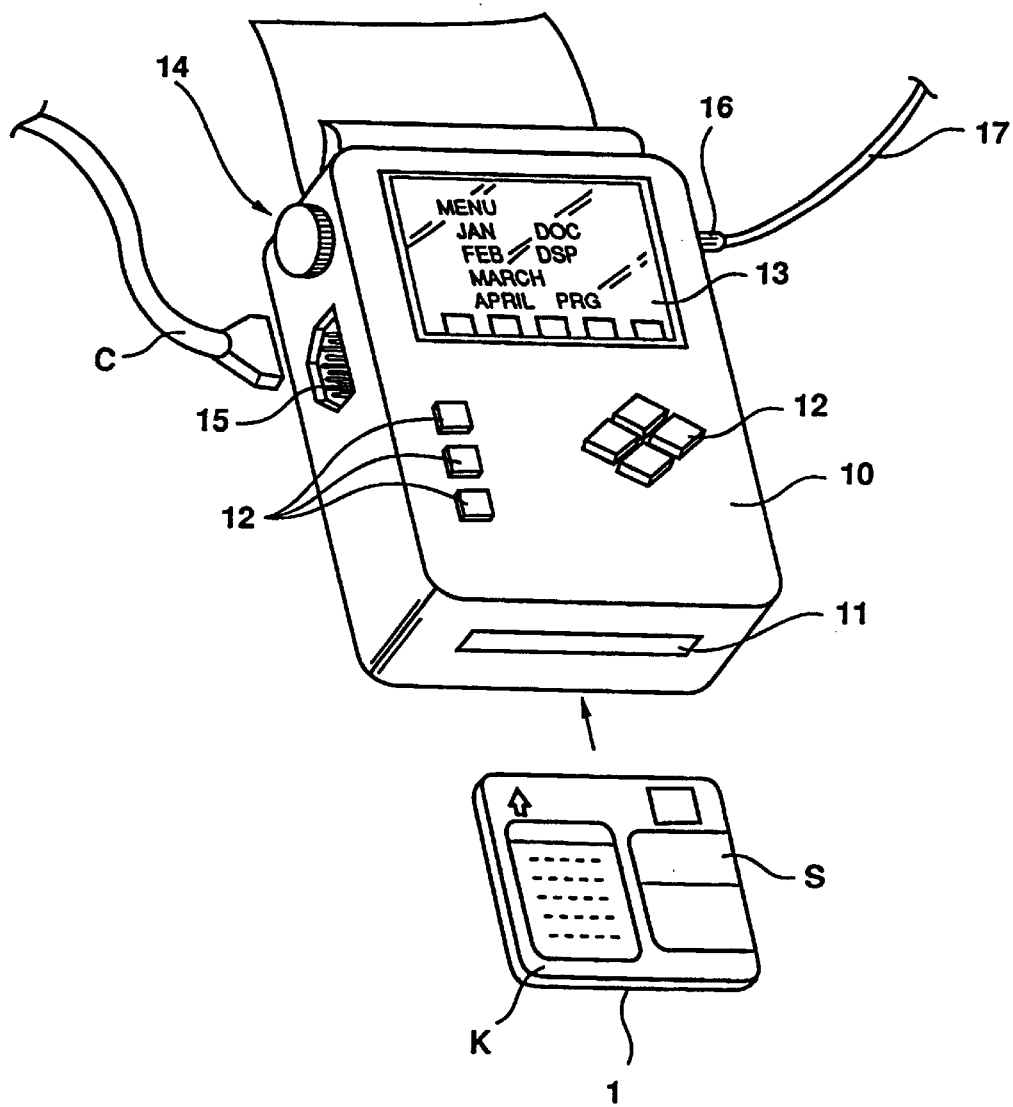
FIG. 1 is a view describing the appearance of a recording/playback device and disc of an embodiment of the present invention.

FIG. 1 is an external view of a recording/playback device and a disc comprising an embodiment.

A magneto-optical disc may be employed as the disc 1 with this disc being housed in a cartridge K as shown in FIG. 1. The disc recording surface may be visibly exposed by sliding a shutter S.

A recording/playback device 10 is provided with a disc insertion portion 11 for installing the cartridge K housing the disc 1. The shutter S is slid over by an internal mechanism not shown in the drawings by inserting the cartridge K in the disc insertion portion 11 so that the board surface of the disc 1 is exposed and recording/playback is possible.

A key input portion 12 for user operations and a display part 13 for menu information for data searching and displaying detected data are provided on the upper surface of the casing of the recording/playback device 10. A cursor shift key, enter key and data input key etc. are provided at the key input portion 12.

Further, numeral 14 represents an image scanner portion for detecting and converting into dot data image information recorded on paper so that image data can be taken as input.

Moreover, numeral 15 represents an input/output connector where data can be sent to and received from other information equipment (computers, word processors etc.) by connecting a communications cable C.

Numeral 16 indicates a terminal used for inputting and outputting analog audio signals so as to provide a line input/output for audio signals played back from the disc 1 or audio signals from other sound equipment to be recorded on the disc 1 via an audio cord 17.

I-2 Internal Blocks

Figure 2:
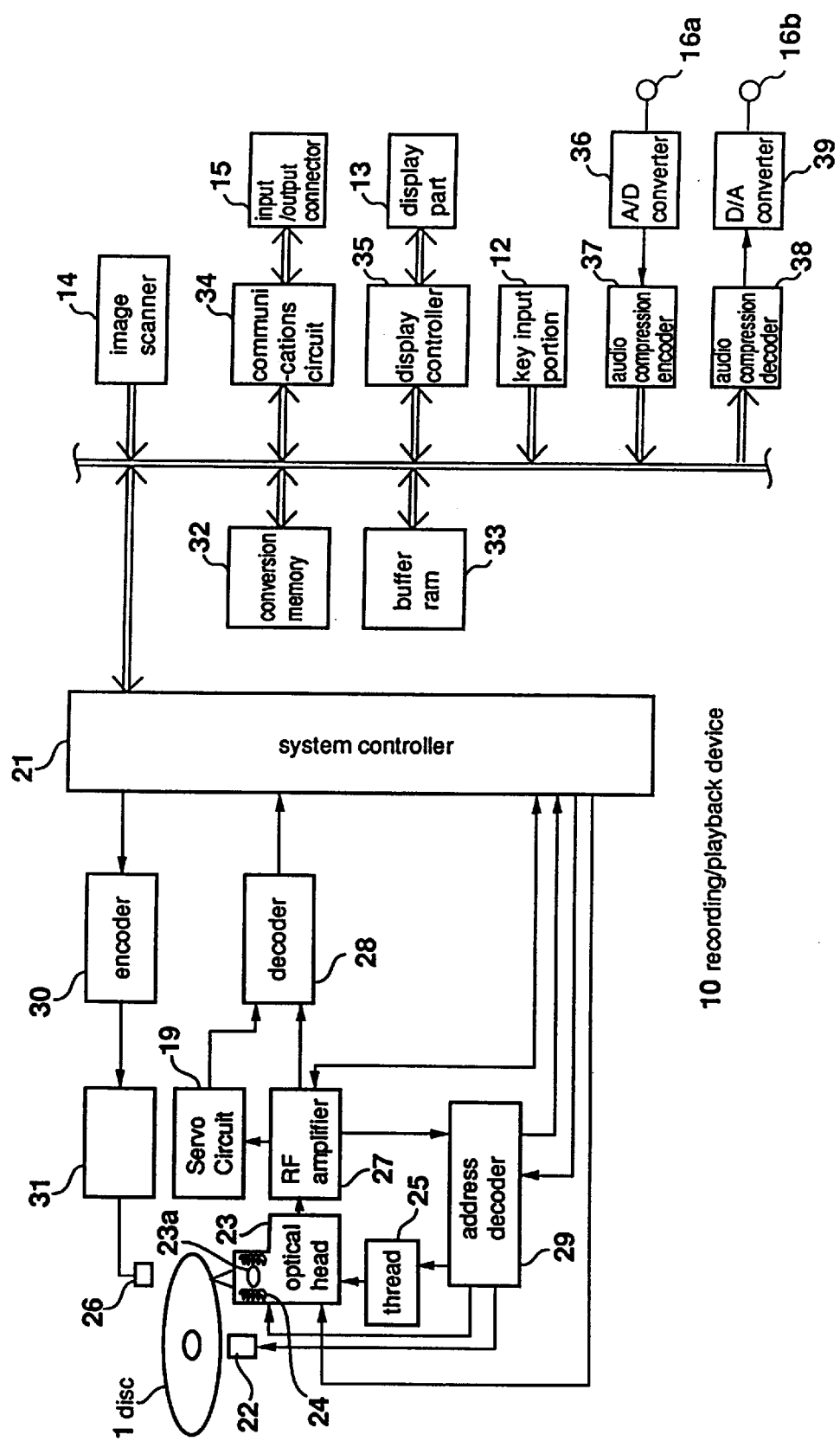
FIG. 2 is a block view of the recording/playback device of the embodiment.

The essential parts of the structure of the recording/playback device 10 are shown in FIG. 2.

In FIG. 2, the disc 1 is shown in an installed state. Numeral 21 indicates a system controller for controlling each of the various recording/playback devices and is constructed from, for example, a microcomputer.

Numeral 22 indicates a spindle motor and the installed disc 1 is rotatably driven by this spindle motor 22. Numeral 23 indicates an optical head for illuminating the disc 1 with laser light at the time of recording/playback. Laser light of a high energy level for heating a recording track up to the Curie temperature is outputted during recording and laser light of a relatively low energy level for detecting data via light reflected due to the magnetic Kerr effect is outputted at the time of playback.

At the optical head 23, there is an optical system comprising a laser diode and deviation beam splitter or object lens etc. as the laser output system, with this being loaded with a detector for detecting reflected light. The object lens 23a is supported in such a manner so as to be capable of being displaced by a twin-axial mechanism 24 in a direction across the diameter of the disc and in a direction towards and away from the disc. The entire optical head 23 can also be shifted across the diameter of the disc by a thread mechanism 25.

Further, numeral 26 indicates a magnetic head for applying a magnetic field modulated in accordance with provided information to the magneto-optical disc and is positioned opposite the optical head 23 so as to sandwich the disc 1.

Information detected from the disc 21 by the optical head 23 is provided to the RF amplifier by the playback operation. An RF playback signal, tracking error signal, focus error signal, absolute position information, address information, sub-code information and focus monitor signal etc. are generated by carrying out arithmetic processing on the information provided to the RF amplifier 27. The generated RF playback signal is then provided to the decoder 28, the tracking error signal and focus error signal are provided to the servo circuit 29 and the focus monitor signal is provided to the system controller 21.

The absolute position information obtained by decoding pregroove information recorded beforehand on the disc as address information and the address information recorded as data which are outputted from the address decoder 19 are sent to the system controller 21 via the decoder 28 to be used in various kinds of control operations.

The servo circuit 29 generates each of the various servo drive signals using the tracking error signal and focus error signal provided along with the track jump instruction, seek instruction and rotational speed detection information etc. from the system controller 21. The servo circuit 29 also controls the twin-axial mechanism 24 and the thread mechanism 25, the focusing and the tracking, and controls the spindle motor 22 to be at a CAV (Constant Angular Velocity) or a CLV (Constant Linear Velocity).

The RF playback signal is Eighteen-Fourteen Demodulated by the decoder 28 and then undergoes prescribed processing via the system controller 21 after being decoded using Cross Interleaved Reed-Solomon Decoding or Advanced Cross-Interleaved Reed-Solomon Decoding.

Further, information provided to the system controller 21 as information to be recorded on the disc 1 during the recording operation is provided to a magnetic head drive circuit 31 after having undergone encoding such as Advanced Cross-Interleaved Reed-Solomon encoding, Cross Interleaved Reed-Solomon encoding, or Eighteen-Fourteen demodulated at the encoder 30.

The magnetic head drive circuit 31 provides a magnetic head drive signal to the magnetic head 26 in accordance with data encoded at the encoder 30. A north or south magnetic field is then applied to the disc 1 from the magnetic head 26. At this time, the system controller 21 supplies a control signal so that high-power recording level laser light is outputted from the optical head 23.

Numeral 32 indicates a conversion memory for converting code data into font data and carries out font conversion processing for displaying character data etc. read out from the disc 1.

Numeral 33 indicates a buffer RAM for temporarily storing dot data captured by the image scanner 14, display data displayed using the display part 13 and signal sending and receiving data from the connector 15, and functions as temporary storage while audio data read out from the disc 1 and data files are outputted.

Any number of Pre-mastered Table Of Contents (hereinafter referred to as P-TOC), User-Table of Contents for control of the recording and playing back of audio data (hereinafter referred to as a U-TOC), Data-user Table of Contents for control of general recording and playing back of audio data (hereinafter referred to as a data U-TOC), and Table of Contents to be used in simple recording and playing back of general data to be described later (hereinafter referred to as a simple U-TOC) are recorded at the disc 1. The system controller 21 reads these control informations and decides the position information intended to be recorded and the position information intended to be data searched and played back. This processing information is then stored in a temporary buffer RAM 33.

For example, the system controller 21 reads the P-TOC and U-TOC by playing back a control information -area present at the innermost periphery of the disc while the disc 1 is being installed for pre-storing in the temporary buffer RAM 33. This is then referred to when the disc 1 is being recorded or played back.

Moreover, the U-TOC, data U-TOC and simple U-TOC are re-written in response to the recording and erasing of data. The system controller 21 carries out this re-writing with respect to the control information stored in the temporary buffer RAM 33 when there is a recording/erasing operation and also re-writes the control information area of the disc 1 at a prescribed timing in response to this re-writing operation.

Numeral 34 indicates a communication circuit for sending to and receiving data signals from external equipment via the connector 15.

Numeral 35 indicates a display controller which is a control circuit for displaying display data from the system controller 21 at the display part 13 i.e. search menu data displaying and the displaying of data read from the disc 1.

The recording/playback device 10 is capable of carrying out the recording and playback operations for each of the various general data discs 1 with the above construction.

While audio data from the disc 1 is being played back and outputted as an audio signal, a RF playback signal read out from the disc 1 as an audio signal is written into the temporary buffer RAM 33 by the system controller 21 after having undergone decoding such as Eighteen-Fourteen demodulation or Cross Interleaved Reed-Solomon Decoding etc. at the decoder 28. The reading of audio data from the disc 1 by the optical head 23 and playback audio data transfer from the optical head 23 to the temporary buffer RAM 33 is carried out intermittently at 1.41 Mbits/sec.

Data written into the temporary buffer RAM 33 is read-out during playback audio data transfer at 0.3 Mbits/sec and provided to an audio compression decoder 38. In this recording/playback system, audio signals are recorded by carrying out data compression using digital data steps. For example, two channel, sixteen bit data sampled at a frequency of 44.1 Kbits (1.4 Mbits/sec) is compressed to 0.3 Mbits/sec., i.e. approximately ⅕. The decoding process therefore becomes the reverse of this compression process during playback.

When processing such as decoding of audio compression processing has been carried out on the playback signal at the audio compression decoder 38, this signal is converted to an analog signal at a digital/analog converter 39 and a line output is given from a terminal 16b via a prescribed amplifier circuit or the cord 17 so as to provide a playback output. This output is provided as, for example, left channel and right channel audio signals.

During the recording of audio signals on the disc 1, an audio signal provided to the terminal 16a from a line input system using the cord 17 or a microphone system not shown in the drawings is sent to an audio compression encoder 37 after having been quantized into 16 bit digital data by an A/D converter 36 at a sampling frequency of 44.1 Kbits and the aforementioned audio compression encoding is carried out. Recording data compressed by the encoder 34 is written into the temporary buffer RAM 33 by the system controller 21, read-out at a prescribed speed and sent to the encoder 30. The encoder 30 then sends this data to the magnetic head drive circuit 31 after having carried out encoding such as Cross Interleaved Reed-Solomon Decoding or Eighteen-Fourteen demodulation.

The magnetic head drive circuit 31 sends a magnetic head drive signal to the magnetic head 26 in response to the encoded recording audio data in the same way as for usual data recording. i.e. the magnetic head 26 is used to apply a north or south magnetic field to the disc 1. At this time, the system controller 21 also provides a control signal so that recording level laser light is outputted with respect to the optical head 23.

The playback operation has been described for the case where the disc 1 is a magneto-optical disc. However, playback is also possible with an optical disc where data is recorded using pit shapes in the same way as for a compact disc i.e. with optical disc devices. In this case, the RF playback signal is extracted in response to the fluctuations in the level of reflected light due to the presence or absence of pits in the same way as compact disc players, rather than by using the magnetic Kerr effect. A magnetic recording operation is carried out with respect to the optical disc and the magneto-optical disc pit data area.

As described above, the TOC information occurring on the disc 1 is read into the temporary buffer RAM 33. However, with regards to types of disc 1 which are compatible with the recording/playback device of this embodiment, there are pre-mastered type discs pre-recorded with programs, discs where data is re-writable and the user can record audio data and general data to be described later, and hybrid discs provided with a Read-Only Memory area pre-recorded with data files and programs etc. and a recordable opto-magnetic area. With these discs, data for controlling areas already recorded with programs etc. and recordable areas is recorded as TOC information in accordance with the disc type.

While audio data is being recorded, recordable areas are searched out from the U-TOC and recorded with audio data. When a program is played back from a pre-mastered disc, program information is read from the P-TOC, the program area is accessed and the playback operation is carried out. When a program is played back from a magneto-optical disc, program control information is read from the U-TOC, the program area is accessed and the playback operation is carried out.

On the other hand, with regards to the operation for general data recording and playing back, data U-TOC information is used as the control information.

Even with magneto-optical discs, the P-TOC is recorded in ROM as pit data.

II. Disc Structure

II-1 Cluster Structure

With data recording in magneto-optical disc systems, recording is carried out on the magneto-optical disc 1 using units known as clusters. One cluster corresponds to a portion equal to two to three track revolutions. This cluster is continuous with respect to time and one program is recorded as a data file.

As shown in FIG. 3(b), one cluster comprises a 4 sector sub-data region and a 32 sector main data region, with one sector having 2352 bits and address information being recorded every sector.

On each sector, a 2048 byte region is used for actual recording of data, with the remaining bytes being used for headers and error correction codes depending on synchronization patterns and addresses etc.

The 4 sector sub-data region is used for sub-data comprising one sector or as a linking area comprising three sectors and the recording of TOC data, audio data and general data etc. is carried out in the 32-sector main data region.

II-2 Track Structure

Here, the track structure occurring on the disc 1, the relationship between the positions of the P-TOC, U-TOC and data U-TOC, and the control mode are described.

Figures 4A, 4B, 4C:
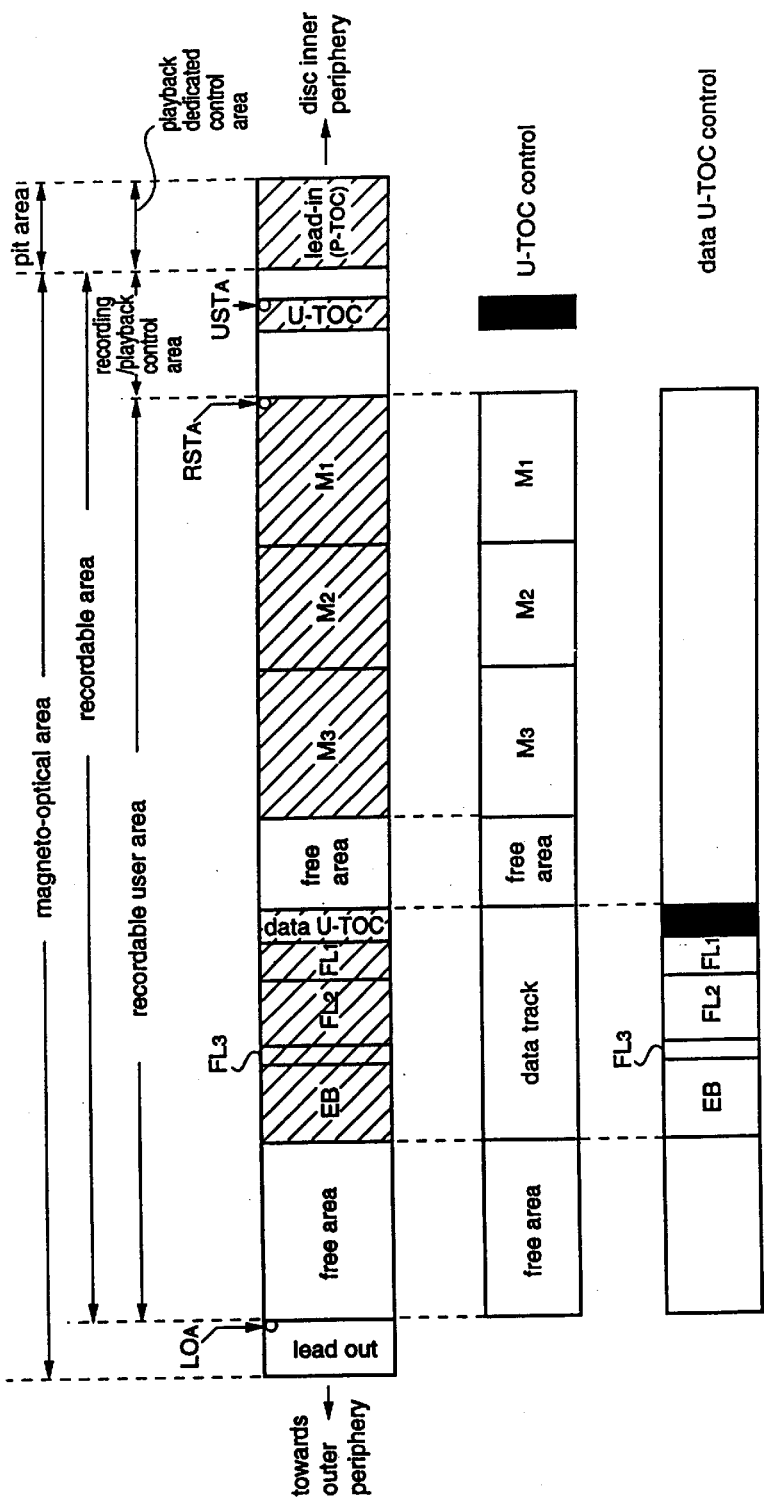
FIGS. 4(a) through 4(c) are views describing the control conditions of the disc of this embodiment recorded with a U-TOC and a data U-TOC.

A magneto-optical disc is divided up into a pit area recorded with data using embossed pits as shown in the pit area of the enlarged view FIG. 4(a) and a magneto-optical area already provided with grooves as a magneto-optical area.

A P-TOC is recorded at the pit area with a P-TOC sector, to be described later, being repeatedly recorded.

The magneto-optical area continues from the pit area at the innermost periphery to the read-out area at the outermost periphery of the disc with a recordable area continuing from the position of the pit area to directly before the read-out area.

Within the recordable area, the leading area is taken as a recording/playback control area and is provided as a U-TOC region and as a laser power calibration area.

The U-TOC is recorded as three continuous clusters at a prescribed position in the recording/playback control area, with the addresses of the clusters at which the U-TOC is recorded within the recording/playback area being recorded at the P-TOC.

An area following the recording/playback control area is taken for the recordable user area recorded with actual audio data and general data.

Audio tracks i.e. programs such as shown in FIG. 4(a) by, for example, M1, M2 and M3 and data files such as shown by FL1, FL2 and FL3 are recorded at the recordable user area. A data U-TOC for data file control is recorded at an area of the innermost side taken for the data file. In this example, the data U-TOC is recorded directly before the data file FL1.

Portions of the recordable user area which are not recorded with programs or data files are taken as free areas. This is to say that recordable regions are controlled as areas capable of being recorded from now on with programs or data files.

For example, control is carried out as shown in FIG. 4(b) at the U-TOC with respect to a disc recorded as shown in FIG. 4(a).

The start address and end address is controlled for each of the audio tracks M1, M2 and M3, with the free area being controlled in the same way.

This is to say that the area recorded with the data files FL1, FL2 and FL3 and the data U-TOC are handled together as a single data track. Further, "EB" shows areas with the data track controlled by the U-TOC not recorded within actual data files.

On the other hand, the data U-TOC controls each of the data files FL1, FL2 and FL3 and the recordable block EB within the data track, as shown in FIG. 4(c).

When an audio track is played back by the recording/playback device, the start address and end address are determined from the U-TOC and playback is carried out. Further, when a data file is played back, the data U-TOC is accessed based on U-TOC information and the necessary data file is accessed using this data U-TOC.

II-3 P-TOC Sector Next, a description is given of the format of the P-TOC of the disc 1.

P-TOC information is used for designation of areas such as recordable user areas of disc and ROM area control and in the case of pre-mastered discs or hybrid discs, for controlling audio tracks and data tracks recorded in ROM.

A P-TOC format is shown in FIG. 5.

FIG. 5 shows the initial sector (sector 0) of P-TOC information repeatedly recorded at the dedicated playback control region shown in FIG. 4.

Sectors 0 to 7 are prepared as P-TOC sectors but sector 1 onwards are optional.

The P-TOC sector data region comprises, for example, a 4 byte times 588, i.e. a 2352 byte data region, with a synchronization pattern consisting of all zeros or all ones being recorded at the leading position.

Upper and lower 2 byte cluster addresses and a one-byte sector address are recorded as the sector address, with one byte "02h" added to form a header.

The numerical value "h" attached in this specification is expressed in so-called hexadecimal form.

Moreover, an identification code using ASCII code corresponding to the letters "MINX" is attached at a prescribed address position of the header. This "MINX" is for identifying the presence of a P-TOC region on discs recorded with general data.

Further, the disc type (Disc types and recording level (Rec power), the number of the first track recorded (First TNO) and the last track number (Last TNO) are indicated.

The disc type is a code recorded to identify whether the disc is a read-only pre-mastered disc, a recordable magneto-optical disc or a hybrid disc.

The read out start address LOA is shown by the read-out area start address shown in FIG. 4.

The sectors being used (used sectors) is one byte where each one bit corresponds to one of the P-TOC sectors 0 to 7 and indicates whether or not each sector is being used.

The power calibration start address PCA is the power calibration start address provided within the recording/playback control area.

The U-TOC start address USTA is the address of the start position of the U-TOC recorded within the recording/playback area.

Further, a recordable user area start address RSTA is recorded.

A corresponding table indication data area having table pointers (P-TN01 to P-TN0255) corresponding to parts tables of a control table to be described later is prepared for each track recorded.

A control table provided with 255 parts tables (01h) to (FFh) is prepared at a region continuing on from the corresponding table indication data area. A start address which becomes the start point of a certain part and an end address which becomes the end point and accompanying parts mode information (track mode) are recorded at the respective parts tables.

The parts are track portions on the disc recorded with physically continuous strings of data.

The track mode information of each parts table records information as to whether or not these parts are set up to be overwrite protected or data copy protected, whether or not information is audio information, and information regarding mono/stereo classification.

Each parts table (01h) to (FFh) of the control table shows the parts contents in accordance with the table pointer (P-TN01 to P-TN0255) of the corresponding table indication data area, i.e., (01h) is recorded in the parts table as the table pointer P-TN01 of the first track. In reality, a numerical value capable of indicating a certain parts table at a byte position within the TOC sector 0 using a prescribed arithmetic operation is listed at the table pointer.

In this case, the start address of the parts table (01h) becomes the start address of the first track recording position and in the same way, the end address becomes the address of the end position of the first track. The track mode information then becomes the information regarding this first track.

Similarly, with regards to the second track, this start address, end address and track mode information is recorded at the parts table (02h) indicated by the table pointer P-TNO2.

Control is possible thereafter up to the 255th track on the TOC because table pointers up to P-TN0255 have been prepared in the same way.

A prescribed program may also be accessed and played back for example, at the time of playback by forming the TOC sector 0 in this way.

However, so-called pre-mastered tracks are the only tracks controlled using this P-TOC and it follows that magneto-optical discs not recorded with ROM type audio tracks or data tracks do not use the aforementioned corresponding table indication data area and control table and each of the bytes are therefore all made to be "00h".

II-4 U-TOC Sector (First Control Information)

FIG. 6 shows the format of the first sector (sector 0) of the U-TOC. This U-TOC sector is a data region recorded with control information for a program-recordable free area.

Sectors 0 to 7 are also prepared for the U-TOC sector but sectors 1 onwards are optional.

For example, while a certain program or data file is being recorded on the disc 1, the recording/playback device 10 searches out free areas on the disc from the U-TOC and carries out recording. Further, during playback, the recorded area or data track of the program to be played back is determined from the U-TOC information, this area is accessed, and the playback operation is carried out.

First, as shown in FIG. 6, a header indicating the synchronization pattern and address is provided at the U-TOC in the same way as for the P-TOC sector.

Then, a maker code, model code, track number for the first track (first TNO), track number for the last track (last TNO), the sectors being used (used sectors), the disc serial number and the disc ID are recorded at a prescribed address position.

Each bit of one byte of the sectors being used corresponds to one of the U-TOC sectors 0 to 7 and indicates whether or not each of the sectors is being used.

A region recorded with each of the various table points, i.e. a Pointer for defective area P-DFA, a Pointer for Empty Slot P-EMPTY, a Pointer for Free Area P-FRA, and P-TNO1 to P-TNO255, is prepared as a corresponding table indication data area for controlling user-recorded audio tracks and data tracks recorded with data files and free areas corresponding to control areas to be described later.

Then, 255 parts tables (01h) to (FFh) are provided as control tables corresponding to the table pointers (P-DFA to P-TN0255). A start address becoming the start point of certain parts, an end address becoming the end point and corresponding parts mode information (track mode) are recorded in the respective parts tables in the same way as for P-TOC sector 0 in FIG. 5. Further, in the case of this U-TOC sector 0, there are cases where parts shown in each parts table are linked with other parts. Link information is therefore recorded showing a parts table recorded with start addresses and end addresses of linked parts.

In the case of magneto-optical disc systems, even if data for, for example, a single program, is recorded discontinuously divided up into a number of parts, the playback operation will not be obstructed because playback will be carried out while accessing between the parts. Compositions etc. recorded by the user can also be recorded divided up between a plurality of parts with the object being the efficiency of use of the recordable area etc. The link information is provided for this reason, with it being possible to link parts tables by designating the height position on the U-TOC of parts tables to be linked using, for example, the numbers (01h) to (FFh) given to each parts table.

The link information for the kind of P-TOC sector 0 in FIG. 5 is all made to be (00h) because parts division does not usually exist for pre-recorded programs or data files.

One parts table expresses one part at the control table of the U-TOC sector 0. The position of each part of a program formed from, for example, 3 linked parts is then controlled by 3 parts tables linked by link information.

The contents of the parts of each parts table (01h) to (FFh) in the control table of the U-TOC sector 0 are expressed as follows depending on the table pointers (P-DFA, P-EMPTY, PFRA and P-TNO1 to P-TN0255) occurring in the corresponding table indication data area.

The table pointer P-DFA (Pointer for Defective Area) indicates the defective regions on the disc 1. The leading parts table of a single parts table or plurality of linked parts tables is designated for parts comprising a region being defective due to flaws or the like. i.e. when a defective part exists, one of (01h) to (FFh) is designated at the table pointer P-DFA and the start and end address of the defective part are recorded at the designated parts table. When other defective parts exist, other parts tables may be designated as parts table link information and other defective parts may be searched. When there are no other defective parts, for example, "(00h)" is recorded at the link information and there are taken to be no links.

The table pointer P-EMPTY (Pointer for Empty Slot) shows the leading parts table of one or a plurality of parts tables not-yet being used in the control table. When a parts table not-yet being used exists, any one of slot numbers (01h) to (FFh) is recorded as the table pointer P-EMPTY. When a plurality of yet to be used parts tables exist, parts tables are designated sequentially using link information from the parts table designated by the table pointer P-EMPTY. All of the yet to be used parts tables are then linked on the control table.

The table pointer P-FRA (Pointer for Free Area) indicates free areas on the disc 1 which may be written with data and designates a leading parts table of one or a plurality of parts tables indicating parts comprised of free areas. i.e. when a free area exists, one of (01h) to (FFh) are recorded at the table pointer P-FRA. The start and end address of the part at the free area are recorded at the parts table designated by the table pointer. Further, when there is a plurality of these kinds of parts present, i.e. when there is a plurality of parts tables, sequential designation until the parts table for which the link information is "(00h)" is carried out using the link information.

Figure 7:
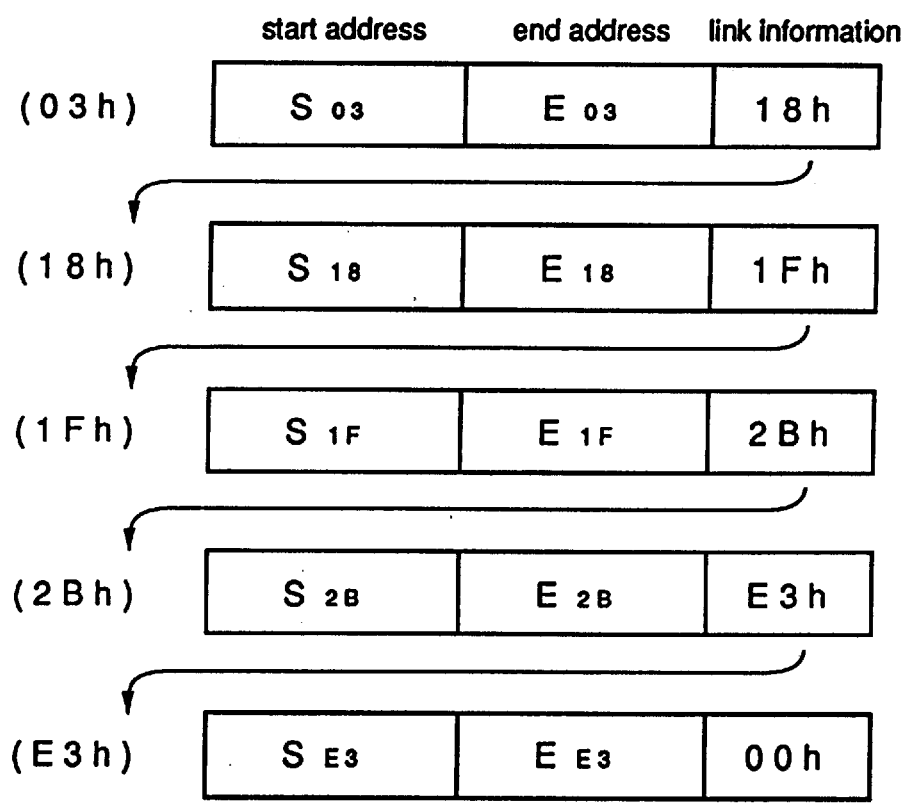
FIG. 7 is a view describing U-TOC sector link conditions for the disc of the embodiment.

The parts control conditions made up of the free area are shown schematically using the parts table in FIG. 7. These are shown as conditions where, when the parts (03h)(18h)(1Fh)(2Bh)(E3h) are taken to be a free area, this state is expressed by the link of the parts table (03h)(18h)(1Fh)(2Bh)(E3h) continuing at the table pointer P-FRA.

This is also the case for the aforementioned defective regions and the control conditions of the yet to be used parts tables.

However, in the case of virgin discs where programs and data files are not recorded at all, or a magneto-optical disc with no defects at all, the parts table (01h) is designated by the table pointer P-FRA. In this case, the remaining parts tables (02h) to (FFh) are not used. Linking is therefore carried out in this case up to parts table (FFh) by designating the parts table (02h) using the table pointer P-EMPTY and designating the parts table (03h) as link information of the parts table (02h), and so on. The link information of the parts table (FFh) is made to be "(00h)" in this case, showing that there are no links thereafter.

With regards to the parts table (01h) at this time, the value of the recordable user area start address (RSTA) is recorded as the start address and the value of the address directly before the read-out start address (LOA-1) is recorded as the end address.

The table pointers P-TNO1 to P-TN0255 indicate user-recorded programs on the disc 1. For example, a part indicates one or a plurality of parts recorded with data of a first program which is leading with respect to time using a table pointer P-TNO1.

For example, when a program taken as a first program is recorded at a single part on the disc 1, the recording region of this first program is designated by the start and end address recorded at the parts table designated by the table pointer P-TNO1.

Further, when, for example, a program taken as the second numbered program is recorded discretely at a plurality of parts on the disc, each of the parts are designated sequentially with respect to time in order to show the recording position of this program. Linking is then carried out until the parts table for which the link information becomes "(00h)" from the parts table designated by table pointer P-TNO2, by sequentially designating other parts tables with respect to time using the link information (with same conditions as for FIG. 7). In this way, by sequentially designating an entire part recorded with data making up, for example, 2 programs, during playback of the second track or while overwriting of the region of this second track is being carried out, musical information can be accessed by the optical head 23 and the magnetic head 26 and sequentially read-out from discrete parts so that recording which effectively uses the recording area is possible using the data for the U-TOC sector 0.

Moreover, in this embodiment, the disc 1 is also used in data recording applications to be described later (dedicated data is also possible). However, this U-TOC carries out control in the same way as for programs, even when the data track is used in data applications.

Because a data track is usually comprised of a plurality of data files, for example, parts recorded with general data on the disc are included in their entirety within a single data track.

On a single disc, a unit including the entirety of parts recorded with general data is referred to as a volume.

In the case where parts recorded with general data on a magneto-optical disc are all linked to give a single data track, the entirety of this track becomes a single volume.

In the case of a hybrid disc, a data track can also be formed at the pit area and there are cases where two data tracks exist in the pit area and the recordable user area.

For example, if a fourth program exists as a data track as shown in FIG. 4-b (no fourth track in FIGS.), this region is controlled using table pointer P-TN04.

Namely, a start address and an end address of a data track are indicated by a parts table shown by, for example, a table pointer P-TN04. Further, when a data track is divided up into a plurality of parts, a parts table showing the start address and end address of each of the parts is linked.

In this case, it can be determined that the parts indicated by the parts table are constructed from data tracks rather than audio tracks from the track mode information.

The track mode is provided by a single byte (8 bits d1 to d8) for each of the respective parts tables (01h) to (FFh), with each bit expressing each of the various mode conditions in the following way.

For example, bit d1 indicates whether this part is recordable or non-recordable, bit d2 indicates whether this part is copyright protected, bit d3 indicates whether this part is an original or a copied recording of a second generation or more, bit d4 indicates whether this part is audio data or general data, bits d5 and d6 indicate whether or not this part is normal audio, bit d7 indicates whether this part is mono or stereo audio and bit d8 indicates the mode with respect to a part data enhancement process.

Therefore, when a part is controlled as a general data area, if bit d4 of the track mode in the corresponding parts table is taken to be, for example, "1", the part is identified as a data track. If the fifth track mode bit d4 is, for example, "0", audio data is identified.

Now, control is carried out in the same way as for the aforementioned case of a pre-mastered program at the P-TOC when general data is recorded in ROM form on the disc as pre-mastered pits, but in this case bit d4 of the track mode occurring on the parts table is taken to be "1" and the part is determined to be a pre-mastered program.

II-5 Data U-TOC Sectors (Second Control Information)

II-5-a Overall structure

The U-TOC only controls parts taken as data tracks, with control of the various data files within the data track being carried out by the data U-TOC.

Figure 8:
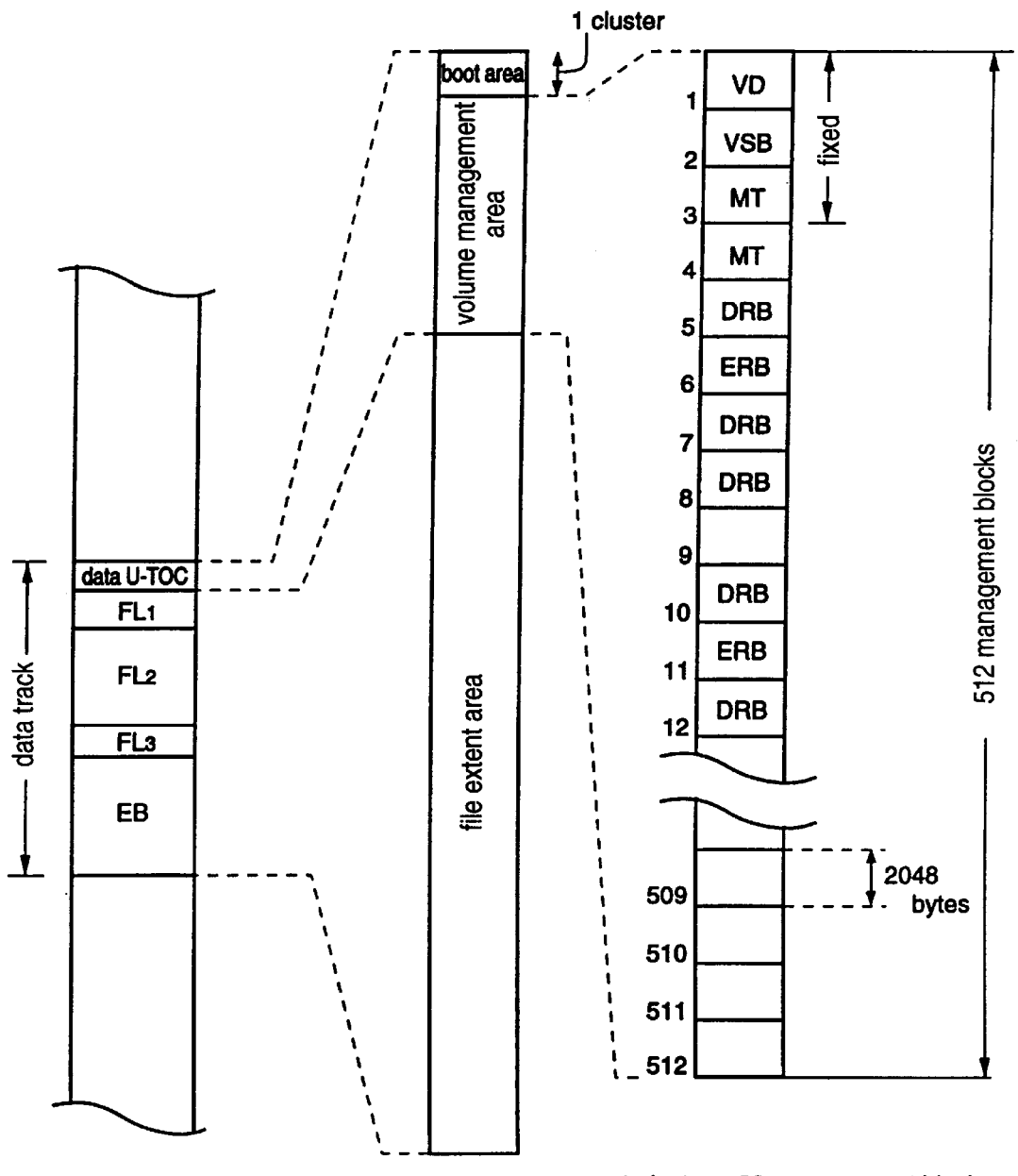
FIGS. 8(a) through 8(c) are views describing a data track of the disc of the embodiment.

FIG. 8 shows an example structure of the data track. As shown in FIG. 8(a), a U-TOC is recorded in a position physically at the head of the data track. i.e. the data U-TOC is recorded at the position within the data track which is close to the inner periphery of the disc. When the data track is split-up into a plurality of parts, the data U-TOC is provided at the head of the part positioned closest to the inner periphery of the disc.

This U-TOC comprises a single cluster boot area and a 16 cluster volume management boot area, as shown in FIG. 8(b).

As can be understood from FIG. 8(b), the area continuing on from the data U-TOC is taken as a file extent area. Actual data files FL1 to FL3 and the like are recorded at this file extent area, as shown in FIG. 8(a). The recording of data files may also be carried out at the yet to be recorded block EB.

The volume management area comprises 512 management blocks, as shown in FIG. 8(c). The data region for one management block is taken to be 2048 bytes.

The data in these management blocks then becomes control information for the recording and playing back of actual data files.

Each management block is given a block number from 1 to 512. The management block of block number 1 is then used as a volume descriptor VD. Further, the management block of block number 2 is used as a Volume Space Bitmap VSB and the management block of block number 3 is used as a Management Table MT.

The conditions of use of the management blocks of block numbers 1 to 3 are as stipulated above. The management blocks of file number 4 onwards are used in accordance with the conditions of use of the file extent area etc.

This is to say that they may be used as a management table MT, directory record block DRB and an extent record block ERB.

II-5-b Boot area

A boot area is a region indicating program position etc. when a computer program or the like exists.

Figure 9:
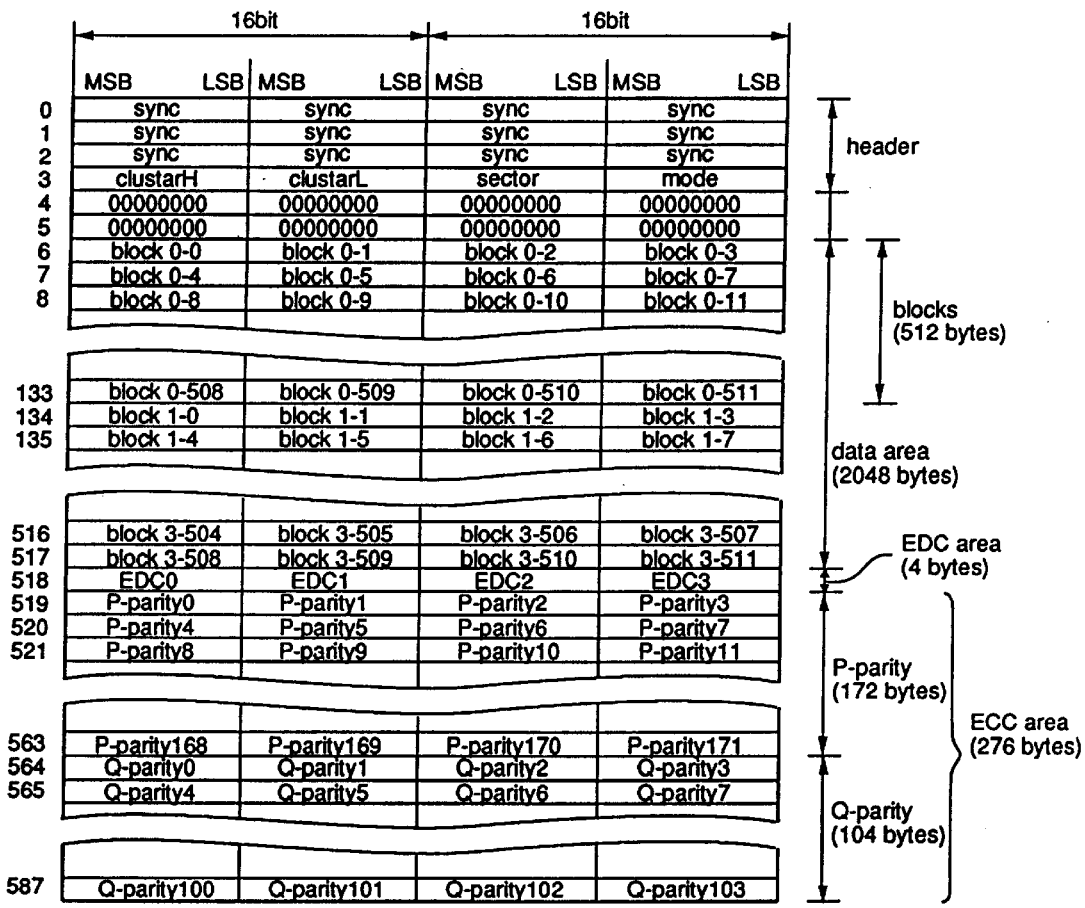
FIG. 9 is a view describing the boot area occurring at the data U-TOC of the disc of the embodiment.
Figure 10:
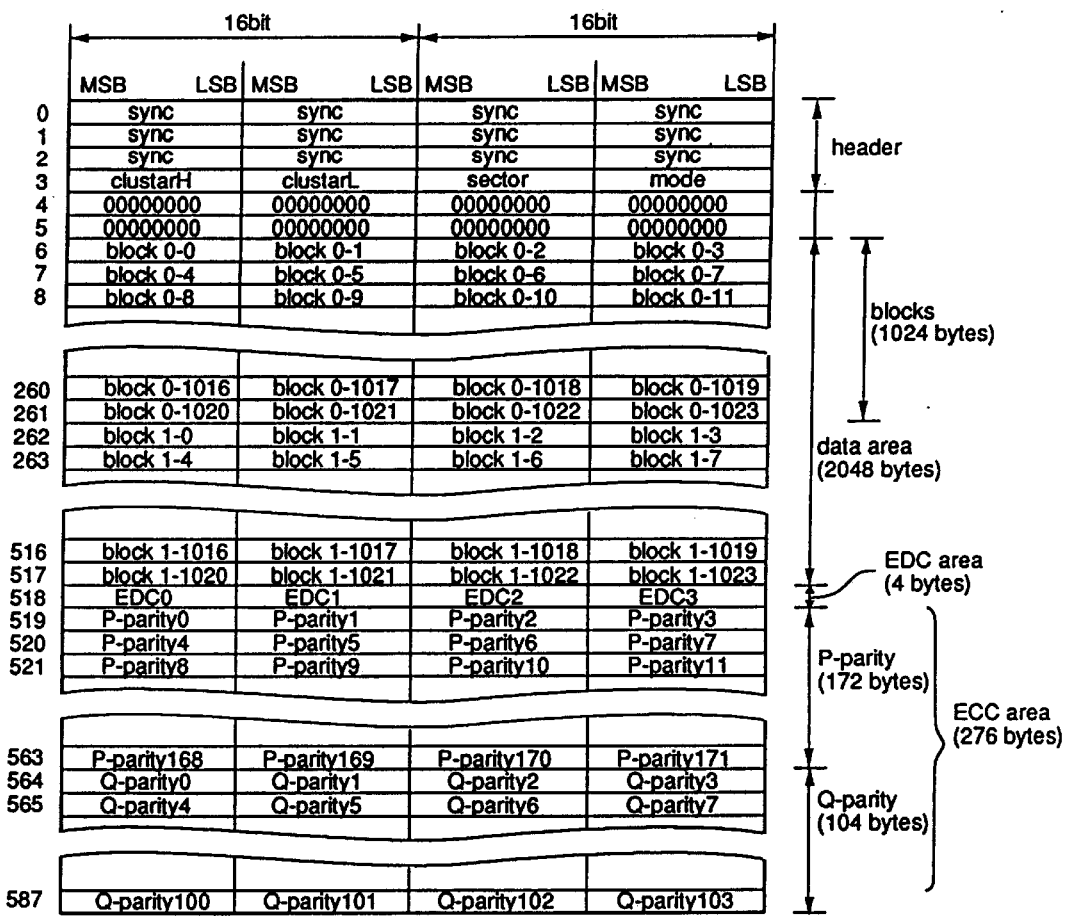
FIG. 10 is a view describing the boot area occurring at the data U-TOC of the disc of the embodiment.

The sector structure of the boot area is shown in FIG. 9 and FIG. 10.

In the boot area sector of FIG. 9, 4 blocks of data of 512 bytes each are recorded in a 2048 byte data area following a header recorded with a synchronization pattern and address. This is to say that, for example, block 0 of blocks 0 to 3 comprises block data 0-0 to block data 0-511.

Four bytes of EDC data EDC0 to EDC3 are recorded after the data area recorded with block data. Next, 172 bytes of P-parity, i.e. P-parity 0 to P-parity 171, and 104 bytes of Q parity i.e. Q-parity 0 to Q-parity 103 are recorded as an ECC (Error Correction Code) area.

On the other hand, as shown in the type of case in FIG. 10, two blocks of 1024 byte data are recorded at a 2048 byte data area. i.e. with a block 0 and a block 1, block 0, for example, is comprised of block data 0-0 to block data 0-1023.

Other aspects are the same as for FIG. 9.

II-5-c Volume descriptor

The leading management block of the volume management area is used as a volume descriptor VD.

This volume descriptor carries out the basic control of the data tracks (volume) on the disc.

Figure 11:
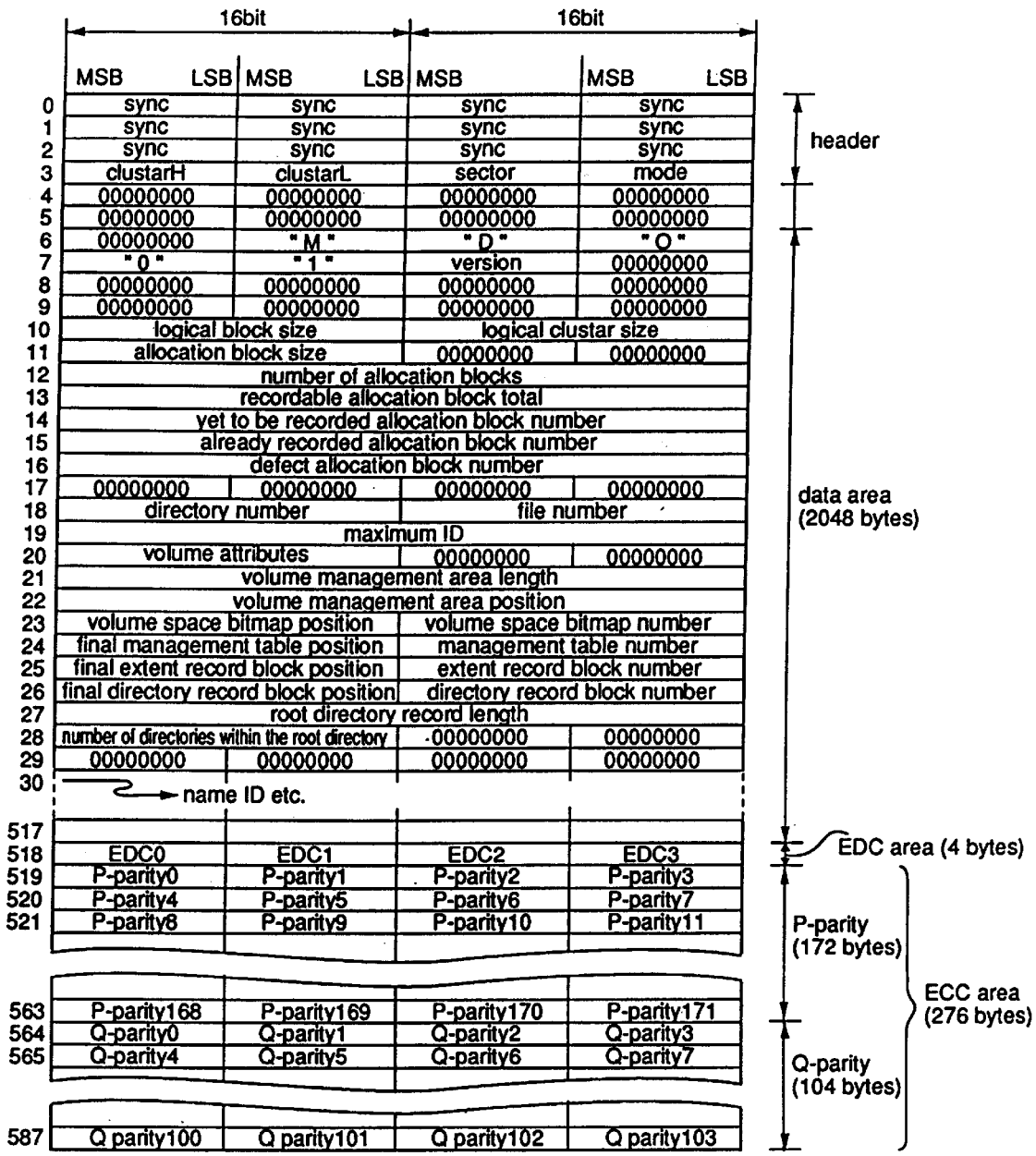
FIG. 11 is a view describing a volume descriptor occurring at the data U-TOC of the disc of the embodiment.

FIG. 11 shows the sector structure of the volume descriptor VD. At this sector, each of the various items of control information are recorded in the 2048 bytes making up the data area after a header recorded with a synchronization pattern and address.

First, a code "MD001" is recorded from the second byte to the sixth byte of the data area using, for example, an ASCII code as a volume descriptor identifier.

Next, a system version ID is recorded.

After this, a logical block size, logical cluster size and allocation block size are recorded.

A logical block corresponds to the actual data area within a sector of a data track with the data area being set up to be 2048 of the 2352 bytes within a sector of the data track. The number "2048" is therefore recorded as the logical block size byte length. A logical block is the smallest data byte unit occurring in recording/playback.

Further, the logical cluster size indicates the number of logical blocks in a logical cluster. A logical cluster is a cluster recorded with actual control information and data. One cluster is taken to be 36 sectors, of which 32 sectors (32 logical blocks) are used for recording data. The number "32" is therefore indicated as the logical cluster size.

The logical block number of the allocation block is shown as the allocation block size. An allocation block is shown in the same data units as the logical cluster and is an area of the data track actually recorded with control information and data files. For example, the 32 sector region taken as the logical cluster occurring in the volume management area and file extent area shown in FIG. 8(b) is taken to be one application block.

Next, the Number of Allocation Blocks is recorded, with this being the total number of application blocks within the volume. In the case of a hybrid disc, this includes the application block number for the pit area.

Further, the number of allocation blocks at the recordable area is recorded as the recordable application block total. This is zero in the case of pre-mastered, read only, general data discs.

Further, the number of allocation blocks not yet recorded of the recordable allocation blocks within the volume is recorded as the number of yet to be recorded allocation blocks.

Moreover, the number of allocation blocks which have already been recorded of the recordable allocation blocks within the volume is recorded as the number of already-recorded allocation blocks.

Still further, the number of allocation blocks with faults such as flaws is recorded as the defect allocation block number.

Next, the number of directories within the volume and the number of data files within the volume are recorded.

Then, the maximum ID value is recorded. The ID numbers are generated and assigned in sequence with respect to the directories and the data files, so as to give the maximum value.

Next, the volume attributes are recorded. Here, whether or not the volume management area is recorded in mirror mode, whether or not an invisible file is present, the presence or absence of write protect, whether or not back-up is necessary and whether short location or long location is used is recorded.

After this, the byte length is recorded as the length of the volume management area and the first allocation block number of the volume management area is also recorded as the volume management position.

Then, in the same way as for this volume descriptor, the respective first block positions and block numbers of other control blocks formed using management blocks within the volume management area i.e. the volume space bitmap VSB, the management table MT, the extent record block ERB and the directory record block DRB, are recorded.

Next, the root director byte length and the number of directories within the root directory are recorded.

Further, in FIG. 11, these are shown as each of the various ID's etc. However, in the following, each of the various ID's and character set codes etc. are recorded within the data area.

Namely, the boot system ID, volume ID and accompanying character codes, publisher ID and accompanying character set codes, data prepare ID and accompanying character set codes, and application ID and accompanying character set codes are recorded.

The time of volume creation, time of volume updating, expiration time and validity time are also recorded. Bytes 1024 to 2047 of the data area are then taken as a system extension area.

A 4 byte EDC area and a 276 byte ECC area are provided after the data area, with 172 bytes of P parity and 104 bytes of Q parity then being recorded at the ECC area.

II-5-d Volume-space bitmap The management block of block number 2 of the block management area is used as the volume space bitmap VSB.

This volume space bitmap VSB displays the type of allocation for the entire data track.

Figure 12:
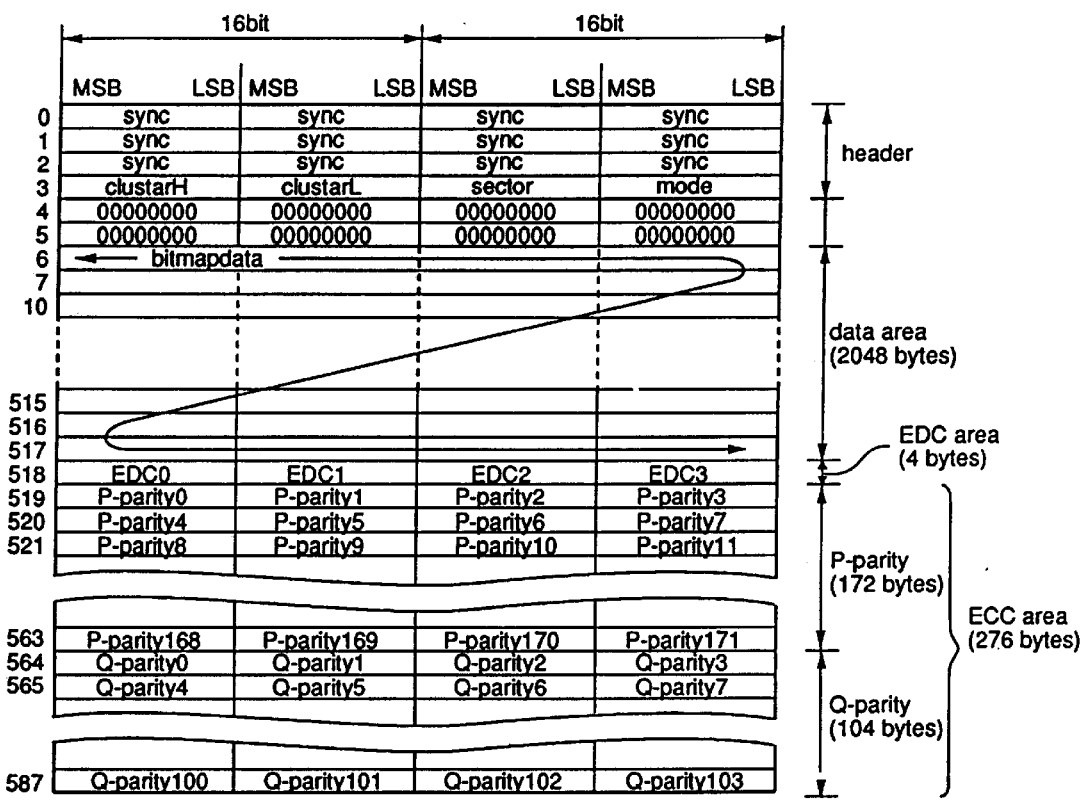
FIG. 12 is a view describing a volume space bitmap occurring at the data U-TOC of the disc of the embodiment.

FIG. 12 is a view showing the sector structure of the volume space bitmap VSB. A type is shown for this sector where, in a 2048 byte data area following a header recorded with a synchronization pattern and an address, two bits are allocated to every one allocation block. An EDC area and an ECC area are also provided for the sectors of this volume space bitmap VSB after the data area.

Figures 13A, 13B:
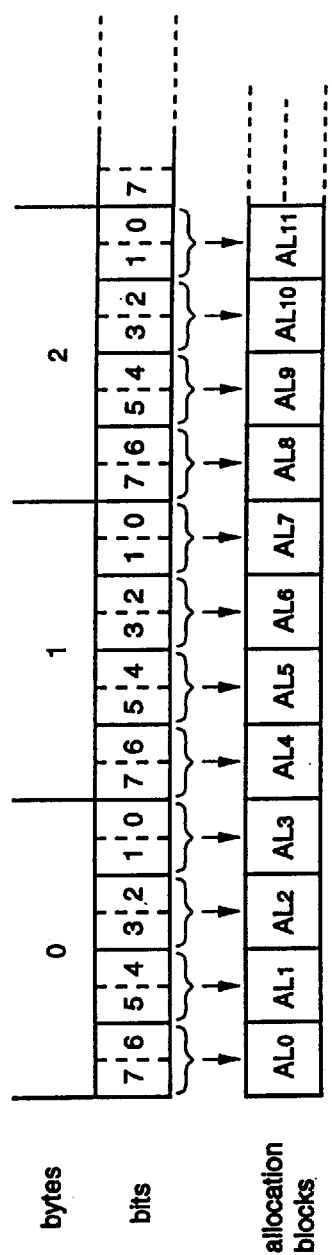
FIGS. 13(a) and 13(b) are views describing data recorded at a volume space bitmap occurring at the data U-TOC of the disc of the embodiment.

The contents of the data area are shown in FIG. 13(a).

Allocation numbers are assigned in ascending order from the number 0 to the allocation blocks of the data track. The bits 7 and 6 of the first byte of the data area for the volume space bitmap VSB are allotted to the allocation block AL0 of number 0, with two bits at a time thereafter being allotted to the application blocks AL1, Al2, and so on.

Therefore, at the data area of the volume space bitmap VSB, information can be recorded at allocation blocks AL0 to AL8191, and sufficient compatibility with all of the allocation blocks can therefore be achieved.

The two bits of information are as shown in FIG. 13(b). i.e. yet to be recorded allocation blocks are made to be "00", already recorded allocation blocks are "01", defective allocation blocks are "10" and not-yet defined allocation blocks are "11".

Portions remaining in the data area, i.e. bits for which a corresponding allocation block does not exist, are made to be "11".

II-5-e Management table

The management block of block number 3 in the volume management area is used as a management table MT and management blocks of block number 4 onwards are also used as management tables.

The management table MT shows the conditions of use of each of the management blocks occurring in the volume management area.

Figure 14:
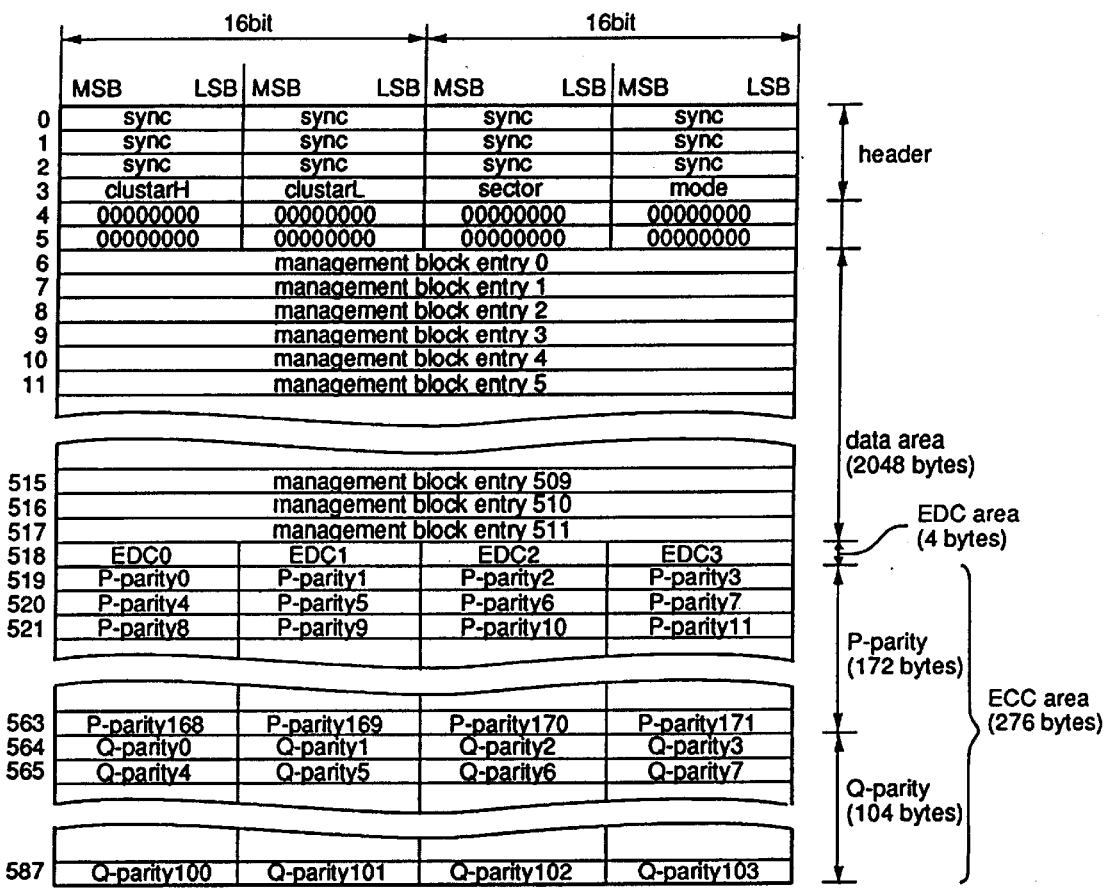
FIG. 14 is a view describing a management table occurring at the data U-TOC of the disc of the embodiment.

FIG. 14 shows the sector structure of the management table MT. At this sector, control of each management block is carried out with 4 bytes at a time being allotted to one management block of 2048 bytes comprising a data area following a header recorded with a synchronization pattern and an address, i.e., the use of the contents of 512 management blocks occurring at the volume management area are shown by management block entry 0 to management block entry 2048.

An EDC area and an ECC area are then provided after the data area.

Figure 15:
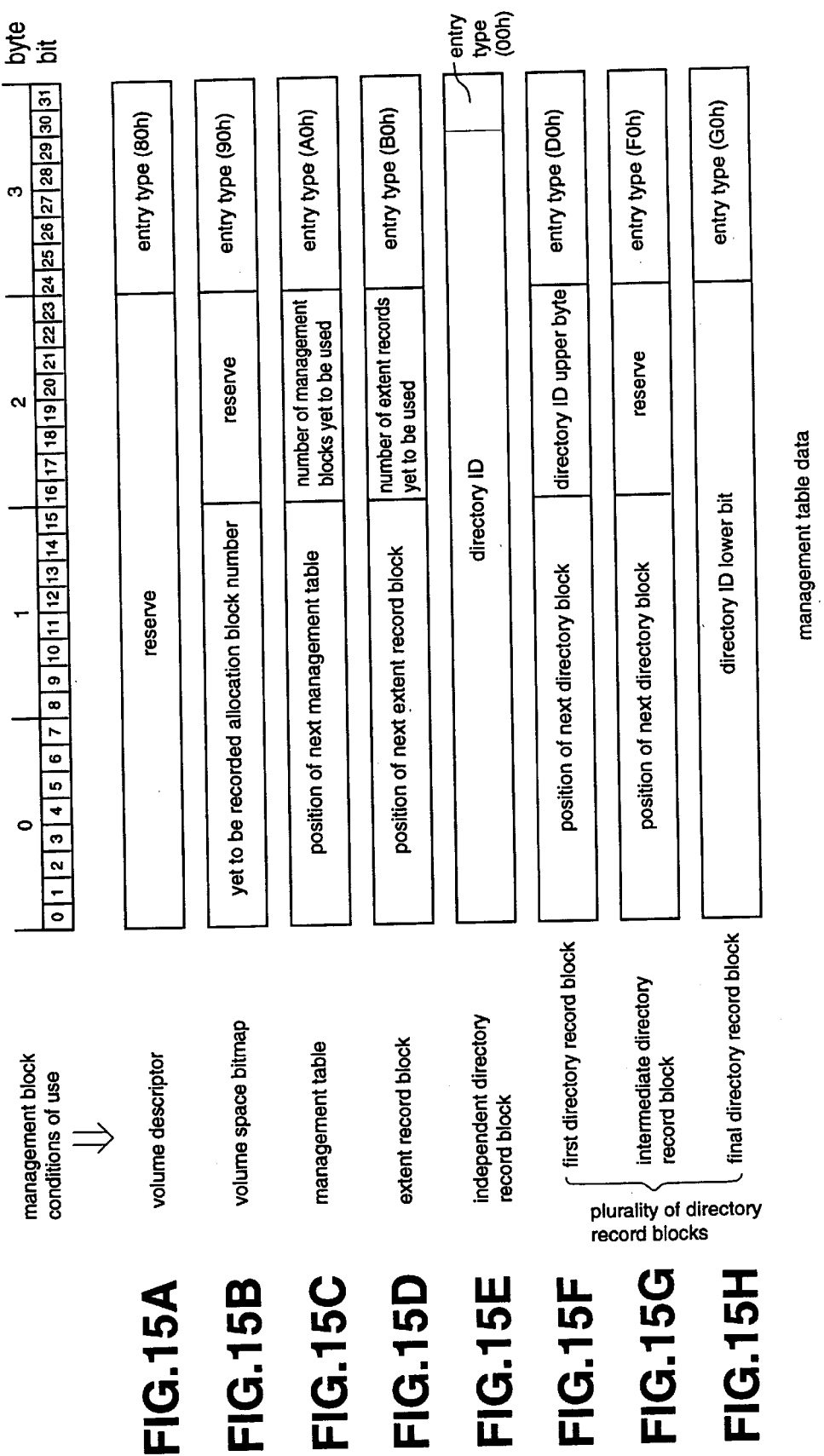
FIGS. 15(a) through 15(h) are views describing data recorded at a management table occurring at the data U-TOC of the disc of the embodiment.

The four byte data contents of management block entry 0 to management block entry 511, respectively, are shown in FIG. 15.

The first management block, management block 0, is used as a volume descriptor as described above.

In this case, at management block entry 0, "80h" is recorded as an entry type at the fourth byte as shown in FIG. 15(*a*) in order to indicate the presence of a volume descriptor at the management block 0.

Further, the second management block, management block 1, is used as a volume space bitmap as described above.

In this case, at management block entry 1, "90h" is recorded as the entry type at the fourth byte as shown in FIG. 15(*b*) so as to indicate the presence of a volume descriptor at the management block 1. The first and second bytes are recorded with the number of not-yet recorded allocation blocks.

The first and second bytes of the entry corresponding to the management block taken as the management table are recorded with the position of the next management table, as shown in FIG. 15(*c*) and the number of management blocks not yet used is recorded in the third byte. Then, "A0h" is recorded as the entry type at the fourth byte in order to indicate that a management block is present at the management table.

The first and second bytes of the entry corresponding to the management block taken as the extent record block are recorded with the position of the next extent record block as shown in FIG. 15(*d*) and the third byte is recorded with the number of extent record blocks not yet being used. Then, "B0h" is recorded as the entry type at the fourth byte so as to show that the management block is an extent record block.

The directory of the directory record block is completed using a directory record recorded using the first management block, and if used independently, a directory code including a first directory may be recorded divided up into a plurality of management blocks i.e. a plurality of directory record blocks.

In the case where a certain management block is taken to be an independent directory record block, a directory ID from 0 to 29 bits is recorded at the entry corresponding to certain management block as shown in FIG. 15(*e*) and the final two bits are taken as the entry type and made to be "00".

Further, in the case where a certain management block is taken to be the first directory record block of a plurality of directory record blocks, the position of the next directory record block is recorded at the first and second bytes of the entry corresponding to this management block as shown in FIG. 15(*f*) and the upper byte of the directory ID is recorded at the third byte. Then, "D0h" is recorded as the entry type at the fourth byte to show that this management block is a first directory record block.

In the case where a certain management block is taken as an intermediate, i.e. not first or final directory code block of a plurality of directory code blocks, the position of the next directory code block is recorded at the first and second bytes of the entry corresponding to this management block, as shown in FIG. 15(*g*). Then, "E0h" is recorded as the entry type at the fourth byte to show that this management block is an intermediate directory code block.

If a certain management block is the final directory record block of a plurality of directory record blocks, the lower byte of the directory ID is recorded at the first, second, and third bytes of the entry corresponding to this management block, as shown in FIG. 15(*h*). Then, "E0h" is recorded as the entry type at the fourth byte to show that this management block is the final directory record block.

II-5-f Directory record block

The management block of block number 4, onwards, in the volume management area is used as the directory record block DRB.

One or a plurality of directory records are recorded at this directory record block DRB.

As the directory records, there is a directory record for constructing the directory and a directory record for designating a position etc. corresponding to a certain data file.

Figure 16:
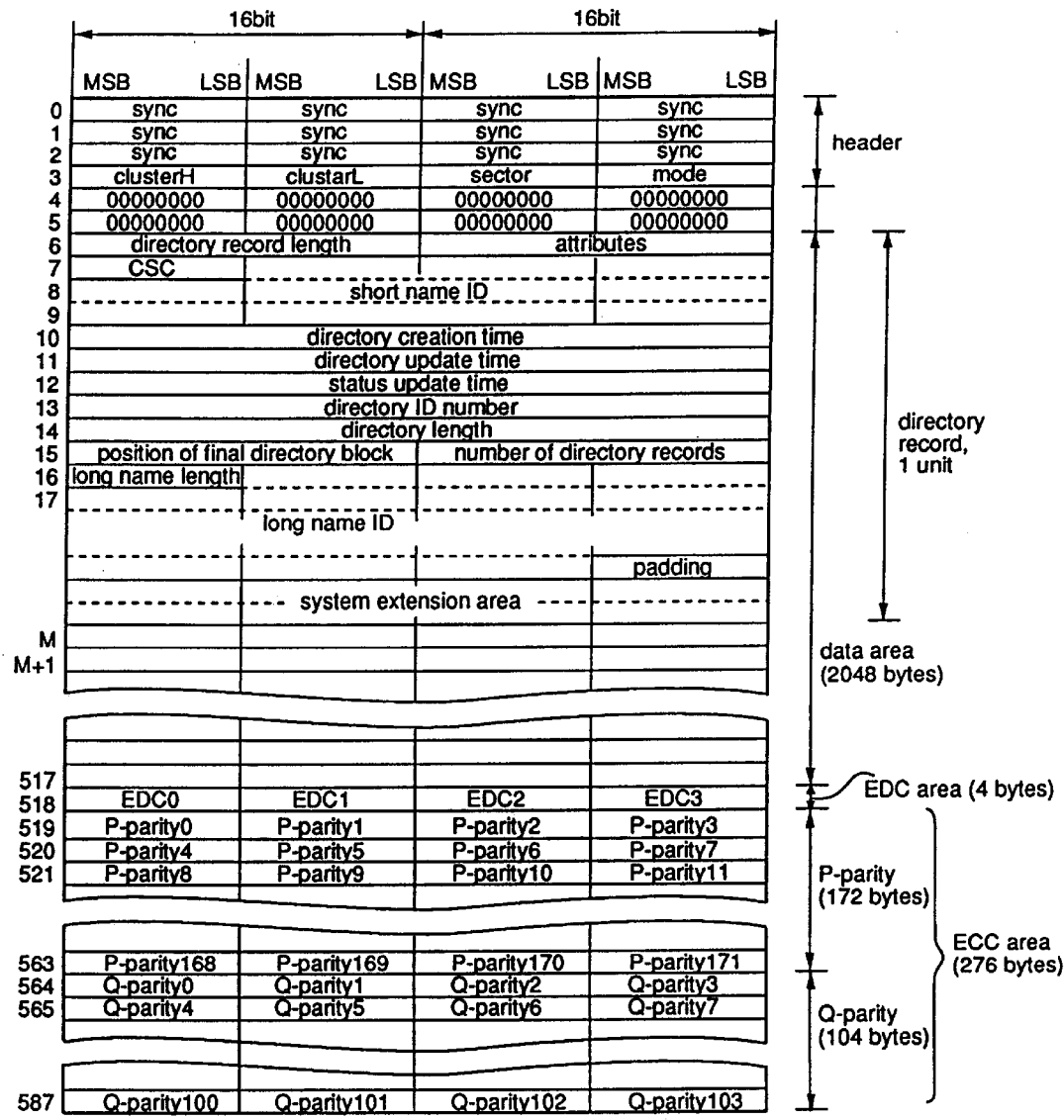
FIG. 16 is a view describing a directory record block occurring at the data U-TOC of the disc of the embodiment.

FIG. 16 is a view showing the sector structure of the directory record block recorded with directory code for making up the directory. At this sector, one or a plurality of directory records are recorded at 2048 bytes comprising a data area after a header recorded with a synchronization pattern and an address.

First, the directory length is indicated as one unit of the directory record. The byte length of this directory record is indicated in accordance with the directory record length in order to make the length of one unit of directory code variable.

Next, the directory attributes are recorded. In this way, each of the various attributes, such as whether the directory record is for a directory, whether the directory including this directory record is an invisible directory, or whether the directory is a system directory are indicated.

Then, a character set code and short name ID are recorded. The character set code indicates the character classification of the short name ID.

The short name ID is an ID recorded using 11 bytes.

Next, the time of directory generation and the time of directory update are recorded, with this directory record update time being listed as a status update time.

The directory ID number and directory length are also indicated.

The position of the directory record block recorded with the first directory code of the directory including this directory record is listed as the directory position.

Further, the number of directory records of the directory including this directory record is recorded as the directory record number.

Next, a long name ID length is listed and a long name ID depending on this length is recorded. i.e. the long name ID is of a variable length. Also, there are cases where a long name ID is not recorded and at these times the long name ID length is made to be "00h".

The number "00h" is recorded as padding to fill-in the byte only when the long name ID length is an even number of bytes.

The byte following the long name ID is utilized as a system extension area.

One unit of a directory record corresponding to a directory has this kind of structure and a plurality of these kinds of directory records is provided within the 2048 byte data area.

An EDC area and ECC area are provided after the data area.

Figure 17:
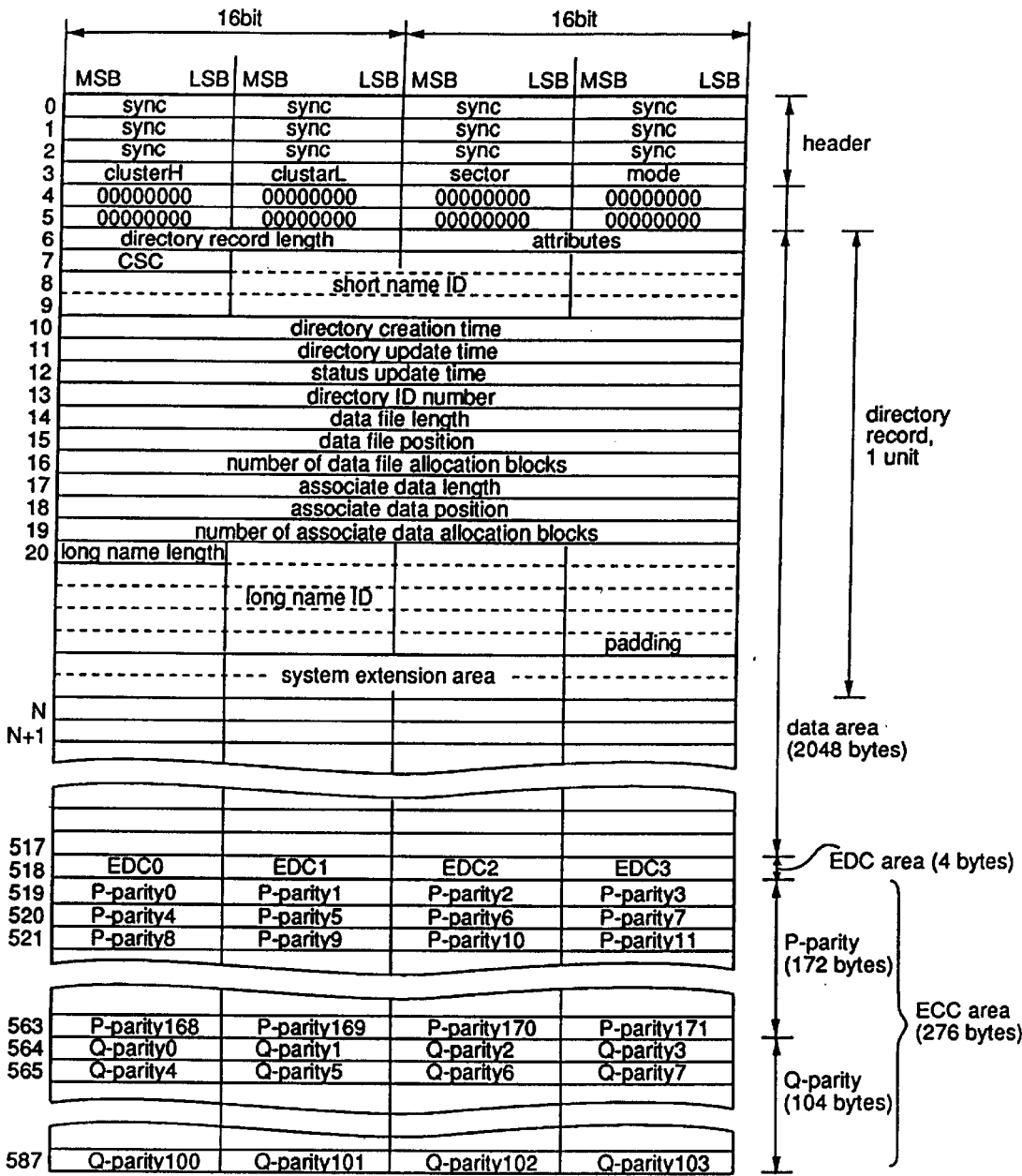
FIG. 17 is a view describing a directory record block occurring at the data U-TOC of the disc of the embodiment.

FIG. 17 shows the sector structure of a directory record block DRB recorded with a directory record corresponding to a certain data file.

This position etc. is shown directly by the directory record of this sector only when the data file comprises a single file unit.

When the data file comprises a plurality of file units, this data file position etc. is not directly indicated by the directory code but is instead indicated by an external record block as is described later.

At this sector, one or a plurality of directory records corresponding to the respective data files are recorded at 2048 bytes comprising a data area after a header recorded with a synchronization pattern and an address.

One unit of the directory record first shows the directory record length and is then recorded with attributes, in the same way as the directory record of FIG. 16. Each of the various attributes such as this directory record not corresponding to a directory, whether the corresponding data file is an invisible file, whether a system file is present, or whether this data file position is designated by an extent record, are indicated by these attributes.

Next, in the same way as for the directory code of FIG. 16, the character set code, short name ID, directory creation time, directory update time and status update time are recorded.

Next, the data file ID number and data file length are shown.

Further, the data file position is shown, after which the number of allocation blocks being used in this data file is recorded.

An associate data length, associate data position and associate data allocation block number are listed.

After this, a variable length long name ID length is listed and a long name ID is recorded depending on this length. The long name ID is made to be "00h" when a long name ID is not recorded.

Further, "00h" is recorded as padding for filling out the bytes when the long name ID number is an even number of bytes.

The byte after the long name ID is utilized as a system extension area.

One unit of a directory record corresponding to a data file has this kind of structure and a plurality of these kinds of directory records is provided within the 2048 byte data area.

An EDC area and ECC area are provided after the data area.

II-5-g Extent record block

The management blocks of block number 4 onwards in the management area are used as extent record blocks.

One or a plurality of extent records are recorded at an extent record block.

Two kinds of data, an extent record index and an extent descriptor, may be recorded as an extent record.

AN extent descriptor is information for showing the position of the file unit comprising the data file. The showing of the position of the data file by the directory record is only for the case where a data file is constructed from a single file unit. In the case where a data file is constructed from a plurality of file units, the position of each file unit is designated by an extent descriptor.

An extent record index is information indicating the position of other extent records and can be used to form extent records of a tree-structure.

A 16 bit address short location method and a 32 bit address long location method exist as methods of showing the position of file units with extent records. The aforementioned volume descriptor indicates which has been adopted.

Figure 18:
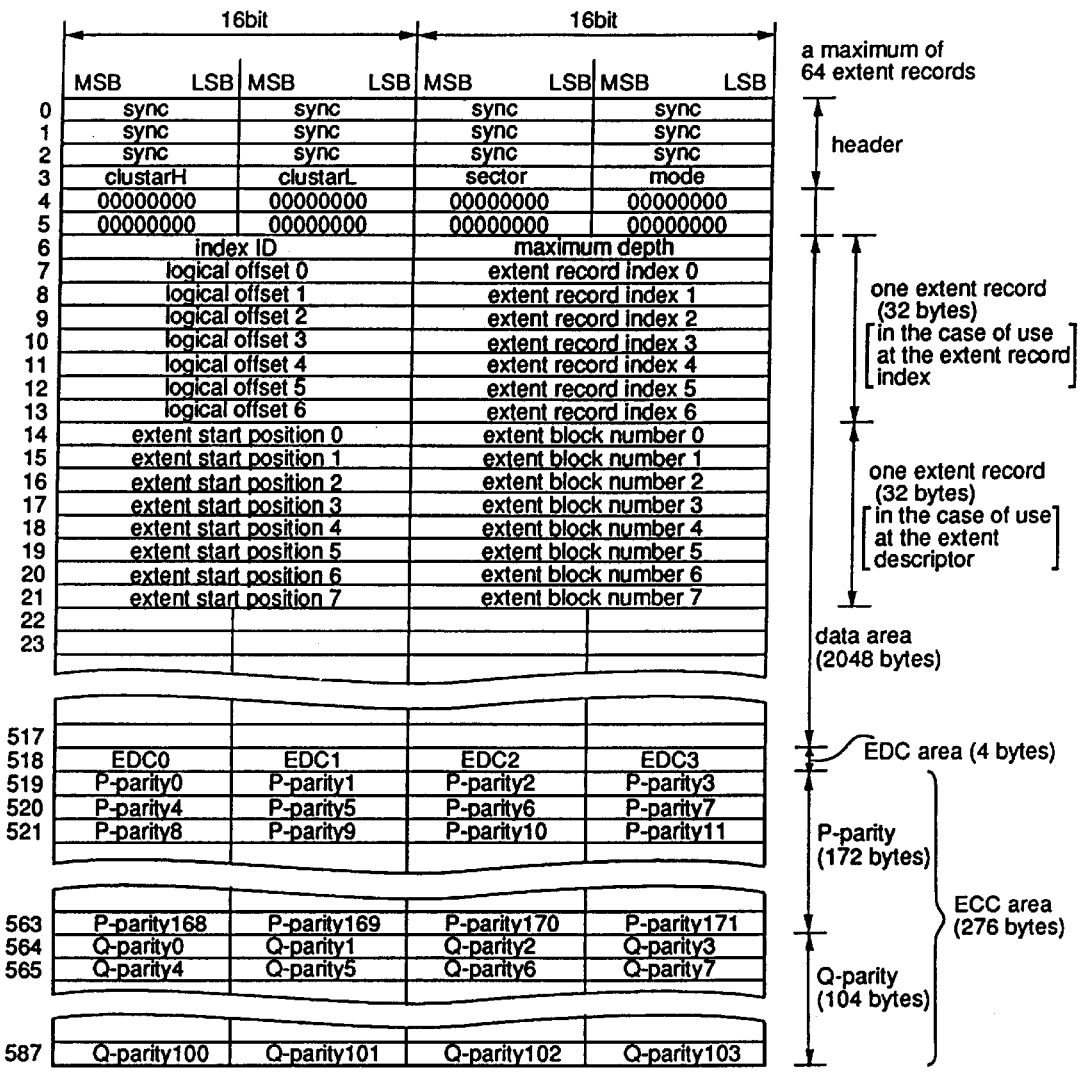
FIG. 18 is a view describing an extent record block occurring at the data U-TOC of the disc of the embodiment.

FIG. 18 shows the sector structure of a short location extent record block DRB.

At this sector, one or a plurality of extent records are recorded at 2048 bytes comprising a data area after a header recorded with a synchronization pattern and an address. One extent record comprises 32 bytes.

In FIG. 18, an example is given where an extent area including an extent record index is recorded as a first 32 byte extent record of the data area.

First, an index ID is recorded at an extent record recorded with an extent record index. This index ID is made to be "FFFFh" and shows that this index record includes an index record index.

Next, the maximum depth is recorded. An extent record tree structure is constructed using the extent record index but a sub-tree hierarchy designated from this extent record is shown by the maximum depth.

If the extent record index designates an extent record including an extent descriptor i.e. the lowest level, the maximum depth is taken to be "0000h".

After this, a maximum of 7 extent record indexes may be recorded. i.e. an extent record index 0 to extent record index 7, and a logical offset 0 to a logical offset 7. Another extent record index is shown for each of the extent record indexes 0 to 7 and corresponding extent record logical positions are shown as the logical offsets. An extent record index is data showing which allocation table is within the management block area.

An extent record index shows an extent entry number and a management block number.

An extent record index designated by an extent record including an extent record index and an extent record index designated by an extent record including an extent descriptor may not exist together within a single extent record.

In the example in FIG. 18, an extent record including an extent descriptor is recorded as the second extent code in the data area. A maximum of 8 extent descriptors may be recorded within a single extent record. i.e. extent start position 0 to extent start position 7 and extent block number 0 to extent block number 7.

The start position of the file unit is recorded as the extent start position X. i.e. the first allocation block number is listed for the file unit. The number of allocation blocks comprising this file unit is also recorded as the extent block number x.

As shown above, the extent record can be recorded with a maximum of 7 extent record indexes or 8 extent descriptors.

A maximum of 64 of these kinds of express codes can be provided within a 2048 byte area.

Figure 19:
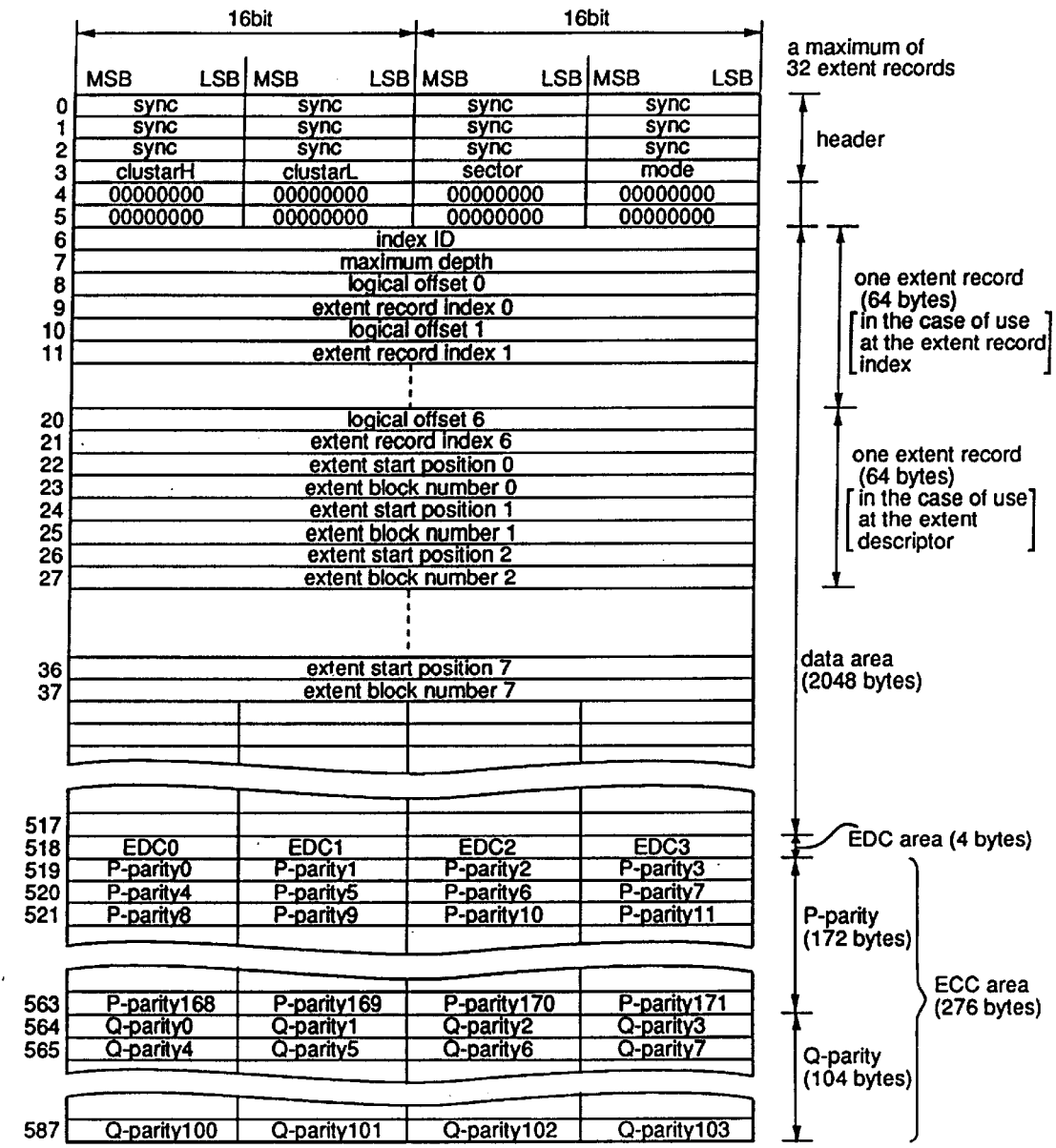
FIG. 19 is a view describing an extent record block occurring at the data U-TOC of the disc of the embodiment.

The sector structure of a long location extent record block DRB is shown in FIG. 19.

The data contents are essentially the same as in the case of short locations and an overlapping of descriptions will be avoided. However, with short locations, each item of data is recorded using 2 bytes, while with long locations, each item of data is recorded using 4 bytes.

In this case, the extent record may be recorded with a maximum of 7 external record indexes or 8 extent descriptors.

With long locations, one extent record comprises 64 bytes and a maximum of 32 extent areas can therefore be provided within a 2048 byte data area.

An EDC area and an ECC area are provided after the data area in the same way.

II-6 Data sectors

Next, the sector structure of a file extent area recorded with a data file is described.

Figure 20:
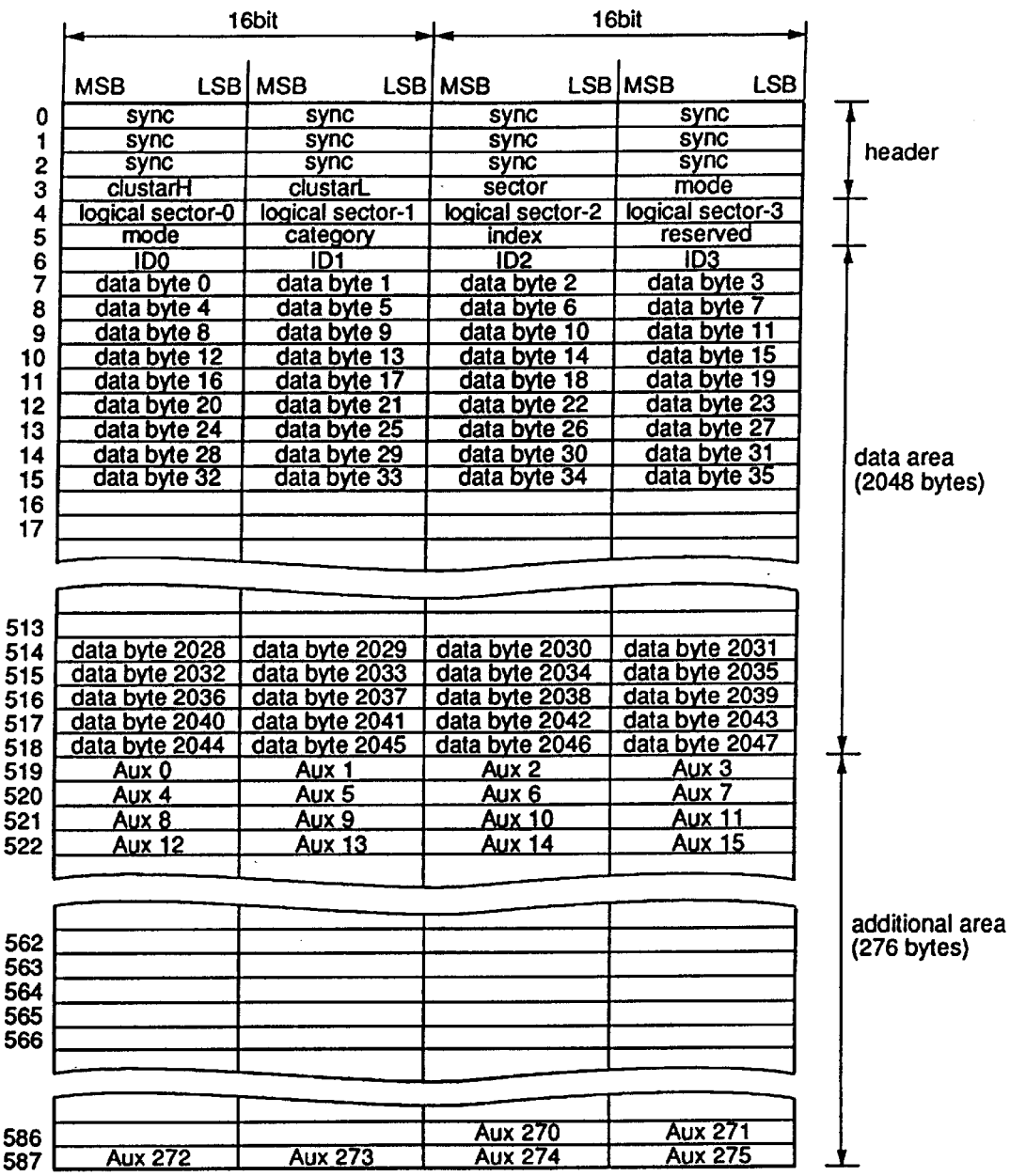
FIG. 20 is a view describing a data sector of the disc of the embodiment.

FIG. 20 shows a sector format for data use.

The leading 12 bytes of a 4 by 588, 2352 byte sector are recorded with a synchronization pattern, which is followed by a cluster address (Cluster H, Cluster L), a sector address (sector) and mode information.

Next, an address area (logical sector 0 to logical sector 3) is provided for the application side. This is followed by information showing the error correction mode (mode), category information (category) showing data file attributes, and index information (index) showing data file parameters. The index information may be decided (to be described later) using, for example, specific category information and applications and when the index information is "00h", the data recording contents (i.e. the volume) are shown to be zero. Information showing-the error correction mode (Mode) and category information (Category) showing data file attributes will be described later.

Four bytes ID0 to ID3 are added as a system ID.

Actual file data is recorded at the 2048 byte data area shown as Data Byte 0 to Data Byte 2047.

The 276 bytes following the data area are taken as an additional area (Aux0 to Aux27). This additional area may be used as an IDC area and an ECC area, as with the aforementioned management block sector.

The conditions of use of this additional area are shown by information (Mode) i.e. the error correction mode, shown at the 21st byte of this sector.

For example, when the mode=00h in particular, an area for error detection and correction data is not added. i.e. the additional area (Aux 0 to Aux 275) after the 4 by 519 bytes is left un-defined.

In this case, with regards to the information played back from the disc, error detection and correction may be carried out only using Cross Interleaved Reed-Solomon code at the decoder 28 of the recording/playback device shown in FIG. 2, or, in particular, error processing using an item having a more than sufficient error correction performance well known in Cross Interleaved Reed-Solomon coding would also present no problems.

Four bytes of error correction parity are added as error detection and correction data when the Mode="01h". i.e. four bytes of parity (ECD 0 to ECD 3) are added after the 2048 byte data area. In this way, a not-yet defined additional area becomes the 272 bytes shown by (Aux 4 to Aux 275).

The polynomial generated with respect to the parity $p(X)=(x^{16}+x^{15}+x^2+1)\times(x^{16}+x^2+x+1)$ In this case, with regards to information played back from the disc, the error correction results from the decoder 28 shown in the recording/playback apparatus of FIG. 2 are not used and error correction is carried out only using the data signal output from the decoder 28.

When Mode="02h" the whole of the additional area is used for error detection and error correction data. i.e. 172 bytes of P-parity (P-parity 0 to P-parity 171) are added after the 2048 byte data area, followed by 104 bytes of Q parity (Q parity 0 to Q parity 103). In this way, an error correction performance of about 80 bytes can be achieved.

This P-Parity and Q-Parity comprises multiplicative Reed-Solomon code defined using a Galois Field ($2^8$). This error correction is the same as error correction adopted for CD ROMS.

Next, the defining of the category information (Category) provided at the 22nd byte of the sector is described.

When the . . . category information (Category)="00h":

An indication that the sector is an open sector, not recorded with data, is given, regardless of the data area conditions. It is therefore preferable to re-write this category information (Category) with "00h" if the sector contents are erased.

When the . . . category information (Category)="01h":

An indication is given that binary data is recorded in this sector, with no restrictions on the data classification. This kind of sector is provided as a way of moving bytes recorded at the data area over to the application (software) side as is as digital data. When the category information is "01h", it is shown that a data region is secured at only a size of a numerical value recorded at the "index" byte as the following index information times 128. Because the data area is 2048 bytes, the index information (Index) becomes a value within "00h" to "10h".

When the . . . category information (Category)="10h" to "1Fh":

This sector shows that document data (Document) is recorded.

In this case also, it is shown that a data region of a size 128 bytes times a numerical value recorded in the byte (Index) is maintained, in the same way as the following index information.

When the . . . category information (Category)="20h" to "2Fh":

This sector indicates that a single dot image, i.e. a single image file, has been recorded as black and white dot data. In this case also, an indication is given that a data region of size 128 bytes times a numerical value recorded in the byte "index" is maintained, in the same way as for the following index information.

When the . . . category information (Category)="30h" to "3Fh".

This sector indicates the recording of a multiple dot image, i.e. a plurality of image files, recorded as black and white dot data. In this case also, an indication is given that a data region of size 128 bytes times a numerical value recorded in the byte "index" is maintained, in the same way as for the following index information.

III. Data file playback process The playing back of data files using the recording/playback device of FIG. 2 from a disc of the above structure will be described using FIG. 2, 4 and 21.

Figure 21:
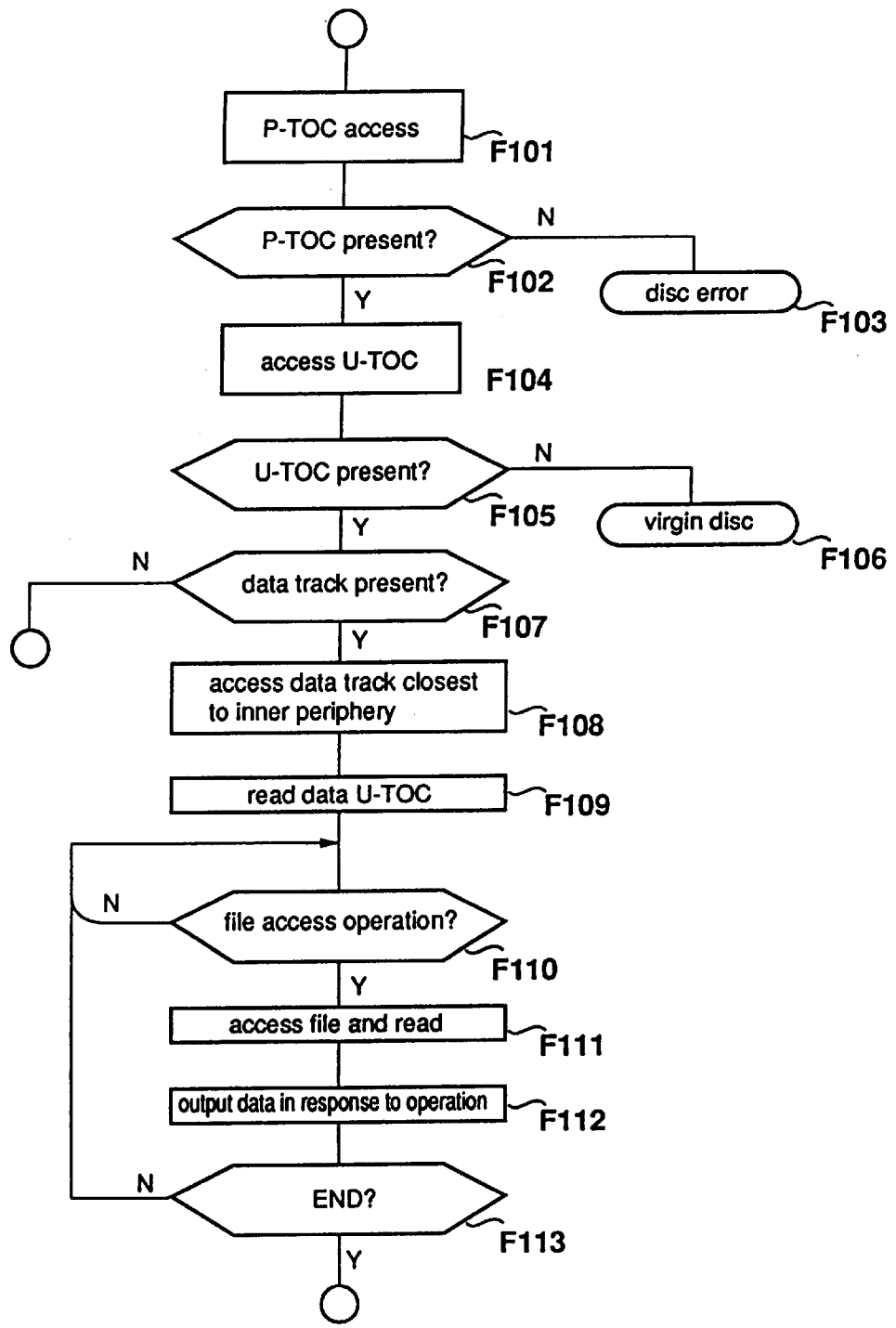
FIG. 21 is a flowchart of a data playback process corresponding to a data U-TOC of the embodiment.

FIG. 21 shows the process for playing back data files at the system controller 21.

In order to play back a data file, with respect to the disc 1, the system controller 21 first accesses the read-in area with the optical head 23 and reads in the P-TOC. If a P-TOC is not read-in, it is determined that the disc is not an appropriate disc or that a disc has not been installed during the playback operation. The process then moves from step F102 to F103 and it is taken that a disc error has occurred.

If a P-TOC is read-in, an access is carried out based on the U-TOC starter address in the P-TOC and the U-TOC in the recording/playback control area is read (F104).

If a U-TOC is not read, i.e. if a U-TOC is not recorded, it is determined that this disc is a virgin disc (F105–F106).

If a U-TOC is read, the system controller 21 confirms the presence or absence of a data track as a track for controlling this U-TOC. i.e. the existence or absence of parts can be confirmed by the presence of bit d4="1" as the parts table track mode information (F107).

If absent, i.e. if this disc is not recorded with a data file, the data file playback process is ended (F107-No).

In the case of playing back an audio track, at this point in time, the optical head 23 accesses the required audio track from the U-TOC data, and reads out data. An audio signal is then outputted from the output terminal 16*b* via the RF amplifier 27, decoder 28, temporary buffer RAM 33, audio compression decoder 38 and digital/analog converter 39.

When a data track exists, step F108 is gone onto, and first the part including the smallest address is searched and accessed from the U-TOC from amongst the parts comprising the data track i.e., the potion being the furthest towards the inner periphery within the data track is accessed by the optical head 23.

As mentioned above, the data U-TOC for controlling the data track is positioned at an area within the data track being the furthest towards the inner periphery.

This portion is then accessed and the data U-TOC is read (F109). i.e. the management block using the volume management area starting from the volume descriptor for which the system ID is made to be "MD00" is read.

The data file can then be played back by reading the data U-TOC. A position indicated by the directory record to the extent record is then accessed in accordance with each of the various operations for playing back the data file i.e. the operations for designating the file to be played back (F110). This data file is read, and then taken in by the temporary buffer RAM 33 (F111).

Outputting is then carried out under output conditions in accordance with the operations etc. (F112). For example, outputting is carried out to the display part 13 via the display controller 35 or from the connector 15 to other equipment via the communications circuit 34.

In the case where there are playback operations for other data files, steps F113 to F110 are returned to and the process is repeated.

As described above, in the case of playing back a data file, the U-TOC is searched from the P-TOC and the data U-TOC is searched from the U-TOC, with playing back then being carried out in accordance with the directory structure within the aforementioned data U-TOC (volume management area).

IV. Recording/Playback Methods Employing Simple U-TOC's (Type A)

Control of data file recording processing employing the kind of data U-TOC's described above can be achieved in accordance with complicated directory structures within the aforementioned data U-TOC's. By using this data U-TOC, hierarchically structured data files can be formed, complicated operation may be carried out and high performance can be achieved in data recording/playback equipment. However, recording/playback devices with a large amount of memory are required for data U-TOC editing such as, for example, altering the structure of file links and file sorts, and the electrical power consumption is large.

Therefore, when it is desired that the recording/playback device be portable and compact, it is a disadvantage to use the data U-TOC as is.

So, in this embodiment, in addition to the method for recording and playing back files using the data U-TOC, there is also a recording/playback method suitable for compact equipment, employing a simple U-TOC, separate from the data U-TOC, for carrying out simple data file control.

This recording/playback method may be applied to the recording/playback device in FIG. 2 and can also be adopted for compact, portable recording/playback devices similar in structure. With compact, portable recording playback devices, the memory and power consumption can be reduced by using the simple U-TOC to carry out recording and playing back, only.

For example, this would be suitable for portable still cameras where photographed still image data is stored on a disc.

There are two methods which may be considered as recording/playback methods employing a simple U-TOC and these shall be described as type A and type B. Type A is a type where a simple U-TOC is recorded in a recordable user area and type B is a type where a simple U-TOC is recorded in a recording/playback control area.

First, type A will be described.

IV-1 Simple U-TOC Sector (Third Control Information)

First, the structure of a simple U-TOC sector is described. This is common for both type A and type B.

This simple U-TOC has a simple directory for the data files.

Figure 22:
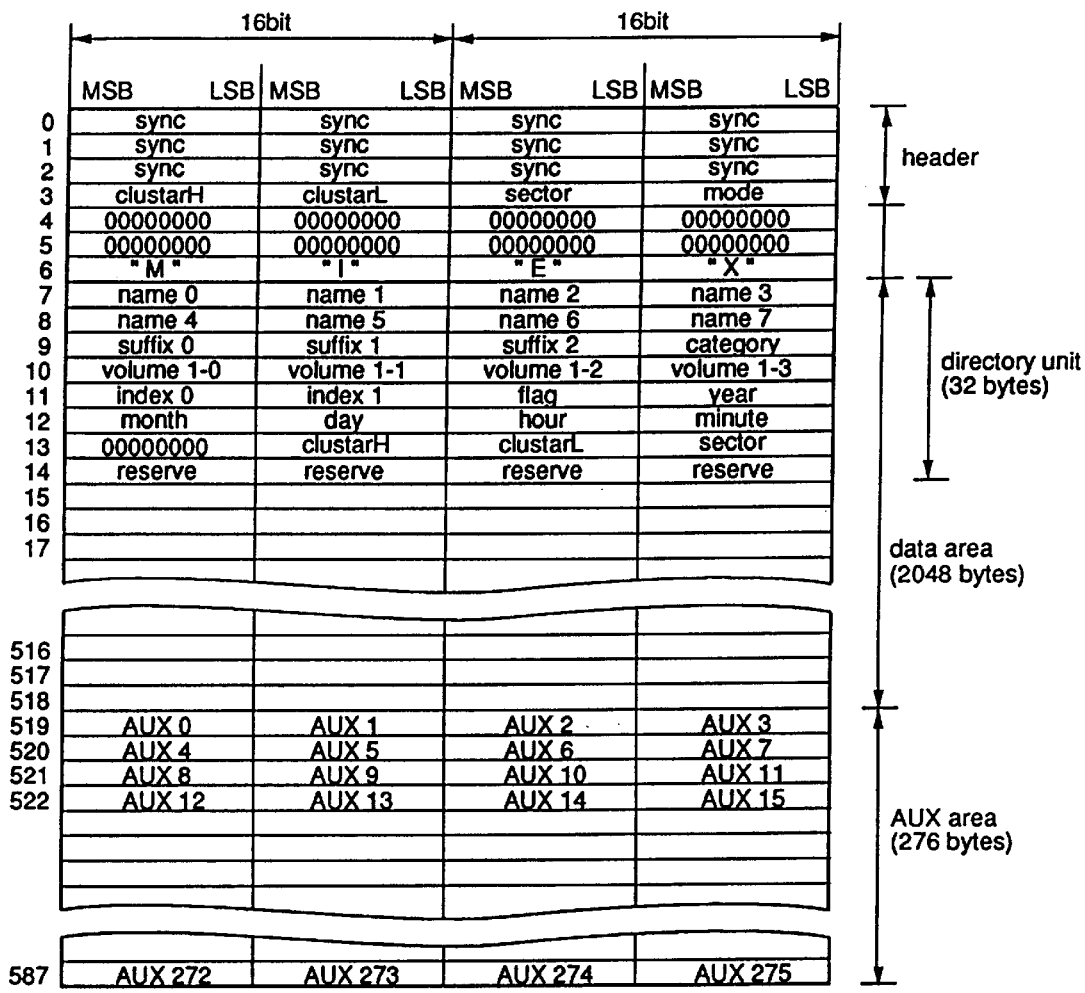
FIG. 22 is a view describing a simple U-TOC sector of the disc of the embodiment.

The structure of a simple U-TOC sector is shown in FIG. 22.

With this sector, a system ID is recorded from a prescribed byte position continuing on from a header comprising a synchronization pattern, a cluster address (cluster H, cluster L), a sector address (sector) and a mode (mode).

A code known as "MIEX" is recorded as the system ID using ASCII code. This "MIEX" shows that this sector is being used as a simple U-TOC.

Sixty-four directory units are recorded at a 2048 byte data area, with one unit comprising 32 bytes.

A 32 byte directory unit is provided so as to correspond to a certain data file.

A data file name is recorded at the leading eight bytes (Name 0 to Name 7) of the directory unit. After this, three bytes (Suffix 0 to Suffix 2) are allotted for the recording of suffixes.

For example, the name and suffix of this directory unit can be used while a data file recorded at the recordable user area under conditions controlled by this simple U-TOC is searched.

After this, one byte is provided for category information (Category). This category information (Category) displays data file attributes corresponding to the directory unit and is the same category information as described previously within the data sector format using FIG. 20.

Next, two bytes of volume information (Volume-0, Volume 1) show the number of allocation blocks (clusters) used by the data files indicated by this directory. i.e. the number of allocation blocks it is necessary to access to carry out data file playback is shown.

The following two bytes of index information (Index 0 and Index 1) are used when there is a heading sector as reference information of this data file within the same cluster as this simple U-TOC cluster. The sector number of this heading sector is recorded as index information (Index 0) and the parts number within the sector of this heading sector is recorded as index information (Index 1).

When there is no heading sector, the index information (Index 0) is taken to be "00h".

An erasure prevention flag (flag) is recorded at the next byte.

When the erasure prevention flag (flag)="00h", the data file corresponding to this data unit is erasable and when the erasure prevention flag (flag)="01h", the data file corresponding to this directory unit is not erasable.

The next 5 bytes are recorded with information about the time the data file corresponding to the directory unit was last updated. i.e. year, month, day, hour and minute information is recorded in each byte as (Year), (Month), (Day), (Hour) and (Minutes) respectively.

Next, the corresponding data file address is recorded. i.e. a two-byte cluster address (Cluster H) and (Cluster L) and a one byte sector address (Sector) is shown.

A directory unit is formed using the above structure and functions as search information for each data file.

IV-2 Control Conditions in the Case of Simple U-TOC Recording

Examples of control conditions in cases of the recording of a simple U-TOC for type-A recordings within the recordable user area are shown in FIG. 23, 25 and 27.

FIG. 23, 25 and 27 show the track conditions when control of the recording of a data file is carried out by a simple U-TOC. i.e. the conditions for recording a data file on the disc using a recording device equipped with a data file recording function using a simple U-TOC. A description is given in the following with regards to this recording method.

Now, in each of the examples explained here, three types of control conditions capable of execution are shown. There are control conditions where it is preferable to use a certain part of the free area with regards to the recording position of the simple U-TOC and data files KFL1 and KFL2 controlled by the simple U-TOC. There are also control conditions where the recording position of data files KFL1 and KFL2 does not influence the specific classification of the control conditions. The setting up of the recording position for both type A and a type B to be described later, are described together afterwards.

First, in the example in FIG. 23, a simple U-TOC and a region recorded with a data file controlled by the simple U-TOC are controlled as a defective area by both a U-TOC and a data U-TOC.

As shown in FIG. 23(a), data files KFL1 and KFL2 controlled by a simple U-TOC positioned physically separate with respect to audio tracks M1, M2 and M3, a data U-TOC present at the data track, data files FL1, FL2 and FL3 and a yet to be recorded block EB and a simple U-TOC are recorded.

In this case, the audio tracks M1, M2 and M3 are controlled at the U-TOC, as shown in FIG. 23(b), and the data U-TOC, data files FL1, FL2 and FL3 and the yet to be recorded block EB are controlled collectively as a data track.

The region recorded with the simple U-TOC and data files KFL1 and KFL2 is controlled as a defective area on the U-TOC indicated by the table pointer P-DFA. i.e. the region with the simple U-TOC and data files KFl1 and KFL2 is regarded as invalid by the recording/playback operation.

Further, control of the data files FL1, FL2 and FL3 and the yet to be recorded block EB is carried out at the data U-TOC, as shown in FIG. 23(c).

The region recorded with the simple U-TOC and the data files KFL1 and KFL2 is also controlled on the data U-TOC as a defective area. This is to say that this region is not taken as a data track controlled using a data U-TOC but an allocation block including this region is shown on the volume space bitmap as a defect allocation block.

The region for the simple U-TOC and data files KFL1 and KFL2 can also be regarded on the data U-TOC as an invalid region with regards to the recording/playback operation.

With regards to this simple U-TOC, the data files KFL1 and KFL2 are controlled as valid data files, as shown in FIG. 23(d).

The data files KFL1 and KFL2 can therefore only be played back by a playback device having a function to be described later for accessing a simple U-TOC.

Moreover, data files KFL1 and KFL2 controlled by this kind of simple U-TOC are included under the control of the data U-TOC and may therefore also be played back by playback operations employing the data U-TOC.

The conditions for the including of the data file KFL2 from the conditions in FIG. 23 under the control of the data U-TOC are shown in FIGS. 24(a) to (d).

In this case, as shown in FIG. 24(b), the area of the data file KFL2 is updated as a part, with one area taken as a data track.

Then, at the data U-TOC, as shown in FIG. 24(c), an area corresponding to the data file KFL2 of a portion which up until now had been taken as a defective area is controlled as a new data file FL4.

The control conditions at the simple U-TOC basically do not change from those shown in FIG. 24(d) but the data file KFL2 is erasure inhibited. i.e. with respect to the directory unit of the structure shown in FIG. 22, the erasure prevention flag (flag) of the directory unit corresponding to the data file KFL2 is taken to be "01h".

Erasure may be prevented by recording or editing operations using the simple U-TOC when the data file KFL2 is included under the control of the data U-TOC as the data file FL4.

This is to say that if the data file KFL2 is erased or overwritten by recording or editing employing the simple U-TOC, control for the data file FL4 in the data U-TOC, by the data U-TOC, actually ceases to exist. The data file KFL2 is therefore made to be an erasure inhibited file as a means of preventing this.

Therefore, when it is wished to erase this, this erasure is carried out under the control of the data U-TOC.

In the example in FIG. 23, a region recorded with a simple U-TOC and a data file controlled by the simple U-TOC are controlled as defective areas by both a U-TOC and a data U-TOC. However, control may also be carried out with just the U-TOC being taken as a defective area with the data U-TOC being outside the data track and not being controlled.

Next, in the example in FIGS. 25(a) through 25(d), a region recorded with a simple U-TOC and a data file controlled by a simple U-TOC is controlled as a defective area by a data U-TOC and controlled as a data track at a U-TOC.

As shown in FIG. 25(a), a simple U-TOC and data files KFL1 and KFL2 controlled by the simple U-TOC are positioned so as to continue on from a data track, i.e., a data U-TOC, data files FL1, FL2 and FL3 and a yet to be recorded block EB.

In this example, the simple U-TOC and data files KFL1 and KFL2 shown in FIG. 25(b) are controlled by being considered to be a part of the data track at the U-TOC. The region recorded with the simple U-TOC and data files KFL1 and KFL2 shown in FIG. 23 is therefore not controlled by being taken as a defective area.

On the other hand, the data files FL1, FL2 and FL3 and the yet to be recorded block EB shown in FIG. 25(c) are controlled at the data U-TOC. The region recorded with the simple U-TOC and data files KFl1 and KFL2 is controlled as a defective area within the data track, i.e., the allocation block including this region is designated as a defect allocation block on the volume space bitmap. The region for the simple U-TOC and data files KFL1 and KFL2 is therefore considered to be an invalid region with regards to the recording/playback operation within the data track, on the data U-TOC.

With regards to this simple U-TOC, the data files KFL1 and KFL2 are controlled as valid data files, as shown in FIG. 25(d).

The data files KFL1 and KFL2 can therefore, in this case also, only be played back by a playback device having a function to be described later for accessing a simple U-TOC.

Moreover, data files KFL1 and KFL2 controlled by this kind of simple U-TOC are included under the control of the data U-TOC and may therefore also be played back by playback operations employing the data U-TOC.

The conditions for the including of the data file KFL2 from the conditions in FIG. 25 under the control of the data U-TOC as data files are shown in FIG. 26.

In this case, as shown in FIG. 26(b), the control conditions on the U-TOC do not change.

Then, at the data U-TOC, as shown in FIG. 26(c), a region corresponding to the data file KFL2 of a region which up until now had been taken as a defective area is controlled as a new data file FL4.

The control conditions at the simple U-TOC basically do not change from those shown in FIG. 26(d) but the data file KFL2 is taken as an erasure inhibit region in the same way as the case in FIG. 24.

Next, in the example in FIG. 27, a region recorded with a simple U-TOC and a data file controlled by the simple U-TOC is controlled by a U-TOC and a defective area.

In the case in FIG. 27(a) where a data track is not recorded, the case is shown where a simple U-TOC and data files KFL1 and KFL2 are recorded at a U-TOC-controlled free area.

In this case, the region recorded with the simple U-TOC and the data files KFL1 and KFL2 is controlled by the U-TOC as a defective area, as shown in FIG. 27(b).

As shown in FIG. 27(c), there is obviously no data U-TOC because there is no data track and there is therefore no control carried out by the data U-TOC.

The data files KFL1 and KFL2 are controlled as valid data files at the simple U-TOC, as shown in FIG. 27(d).

Therefore, in this case also, the data files KFL1 and KFL2 can only be played back by a playback device having a function enabling it to access the simple U-TOC in a way to be described later.

Playback is also possible via a playback operation employing a data U-TOC by also including the data files KFL1 and KFL2 controlled by the simple U-TOC under the control of the data U-TOC.

The conditions for including the data file KFL2 from FIG. 27 under the control of the data U-TOC as a data file are shown in FIG. 28.

Figure 28A:
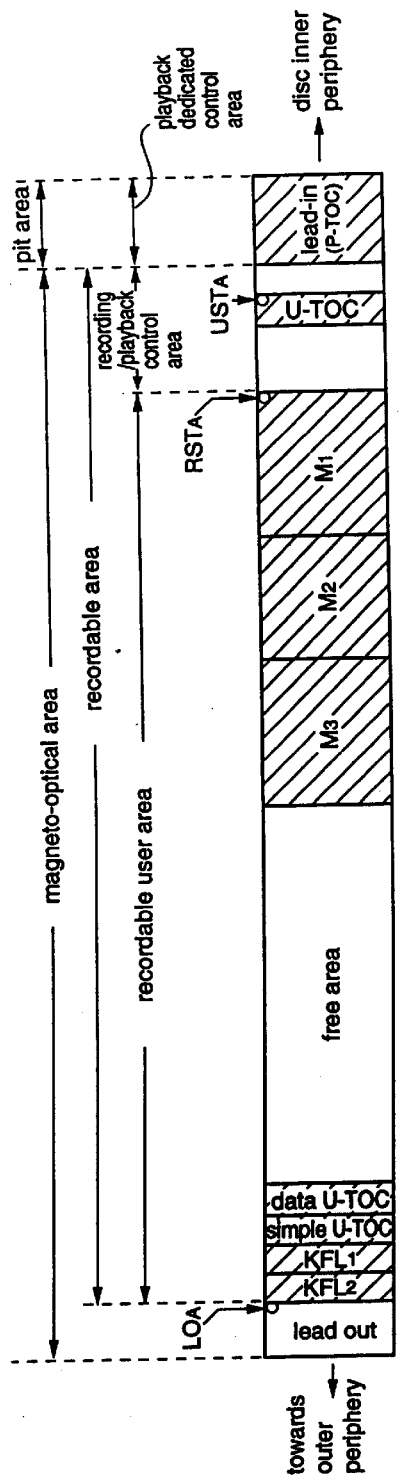
FIGS. 28(a) through 28(d) are views describing track control conditions after entry of data files corresponding to a simple U-TOC of the embodiment into a data U-TOC.
Figure 28B:

In this case, a data track is first created because no data track exists. i.e., a data U-TOC is recorded at the leading position of the simple U-TOC and data file KFL1, as shown in FIG. 28(a), and controlled on the U-TOC as a data track, as shown in FIG. 28(b).

Further, the data file KFL2 is controlled at the newly-recorded data U-TOC as a new data file FL1, while on the other hand, the region of the simple U-TOC and data file KFL1 is taken as a defective area, i.e., the allocation block including this region is controlled as a volume space defect allocation block on the bitmap (refer to FIG. 13-a and FIG. 13-b).

Figure 28C:
Figure 28D:
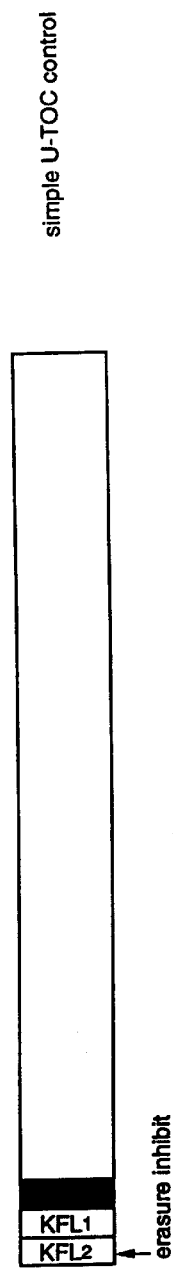

On the simple U-TOC, as shown in FIG. 28(d), the data file KFL2 is taken as being erasure inhibited on the directory unit.

In this way, only the data file KFL2 is controlled as a data file FL1 on the data U-TOC.

In this case, it is preferable to take only the region of the data track KFL2 and the newly recorded data U-TOC as a data track on the U-TOC, and the region of the simple U-TOC and the data file KFL1 as a defective area on the U-TOC.

Variations may be considered for the control conditions regarding the region recorded with the simple U-TOC and the data files controlled by the simple U-TOC.

IV-3 Data File Recording Process Employing Simple U-TOC

Next, a data file recording process employing a simple U-TOC is described for the kind of recording/playback device shown in FIG. 2 or a recording device equipped with a recording means of a similar block structure. This recording process is equipped with approximately the same recording block structure as for FIG. 2 but may also easily be used in, for example, portable, compact devices where each of the various specifications such as memory capacity are of a smaller scale.

FIG. 2 describes the recording/playback device playback operation.

Figure 29:
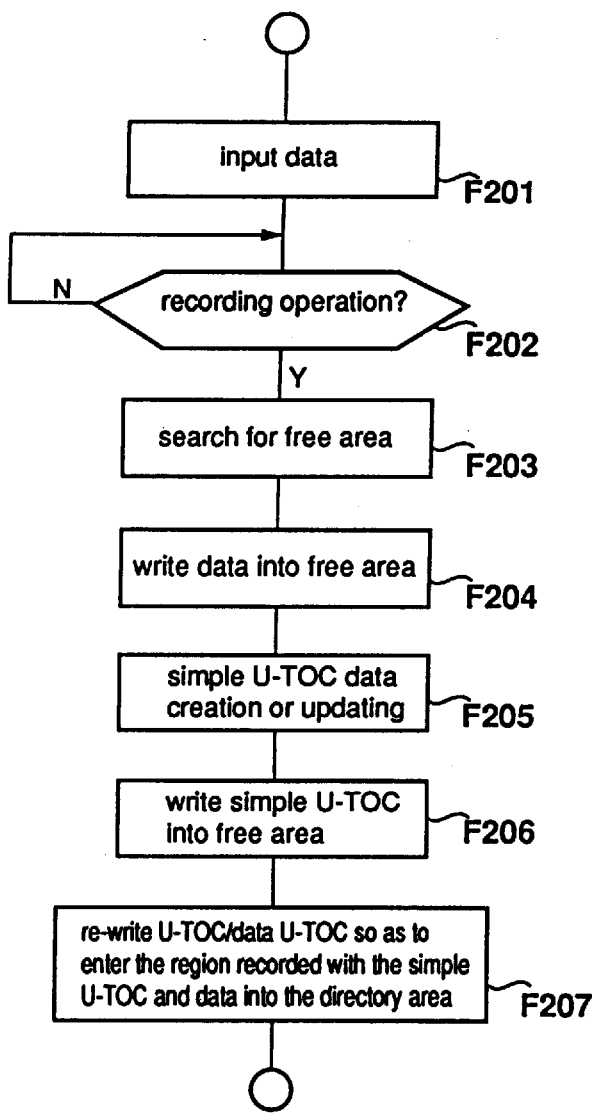
FIG. 29 is a flowchart for a recording process corresponding to a simple U-TOC of the embodiment.

FIG. 29 shows the system controller process during recording.

The actual recording process (F201–F202–F203) starts if the data to be recorded is inputted and a recording operation is made.

The data input may take place via the connector 15 and the communications circuit 24 of the block diagram in FIG. 2 or by using the image scanner 14. Further, data may be inputted from a photographing means in the case of, for example, a portable still camera, or as character data input via the key operations of equipment such as an electronic note book.

First, a free area where this input data can be recorded is searched from the U-TOC (F203) and the input data is recorded in this free area (F204).

Data is then generated because a directory unit corresponding to this recorded data file has to be recorded as a simple U-TOC (F205). Also, if a simple U-TOC already exists on a recorded disc, this is read out and a directory file corresponding to the data file to be recorded on this occasion is created. Further, if a simple U-TOC does not exist, simple U-TOC data recorded with a directory unit corresponding to the data file recorded on this occasion is created.

A detailed description of the determination of the presence or absence on the disc of a simple U-TOC or the reading out process if present will not be given here because this is the same as a reading process occurring at the time of playback to be described later.

If simple U-TOC data corresponding to the data file recording is edited or played back, this simple U-TOC data is recorded at a free area (F206). The U-TOC/data U-TOC is then re-written (F207) so that the region recorded with the simple U-TOC and data file is entered into the directory area of one of or both of the U-TOC and data U-TOC (F207). i.e. one or both of the U-TOC and the data U-TOC are re-written so as to achieve the control conditions in one of FIGS. 23, 25 or 27.

In this way, the recording operation for data files corresponding to the simple U-TOC is complete.

IV-4 Data File Playback Processing Employing a Simple U-TOC and Entry Processing Going to a Data U-TOC Next, the playback process for data files recorded under the control of a simple U-TOC, as shown, for example, in FIGS. 23, 25, and 27, and the process of including data files only under the control of a simple U-TOC under the control of a data U-TOC shown in FIG. 24, 26 and 28 are described.

Figure 30:
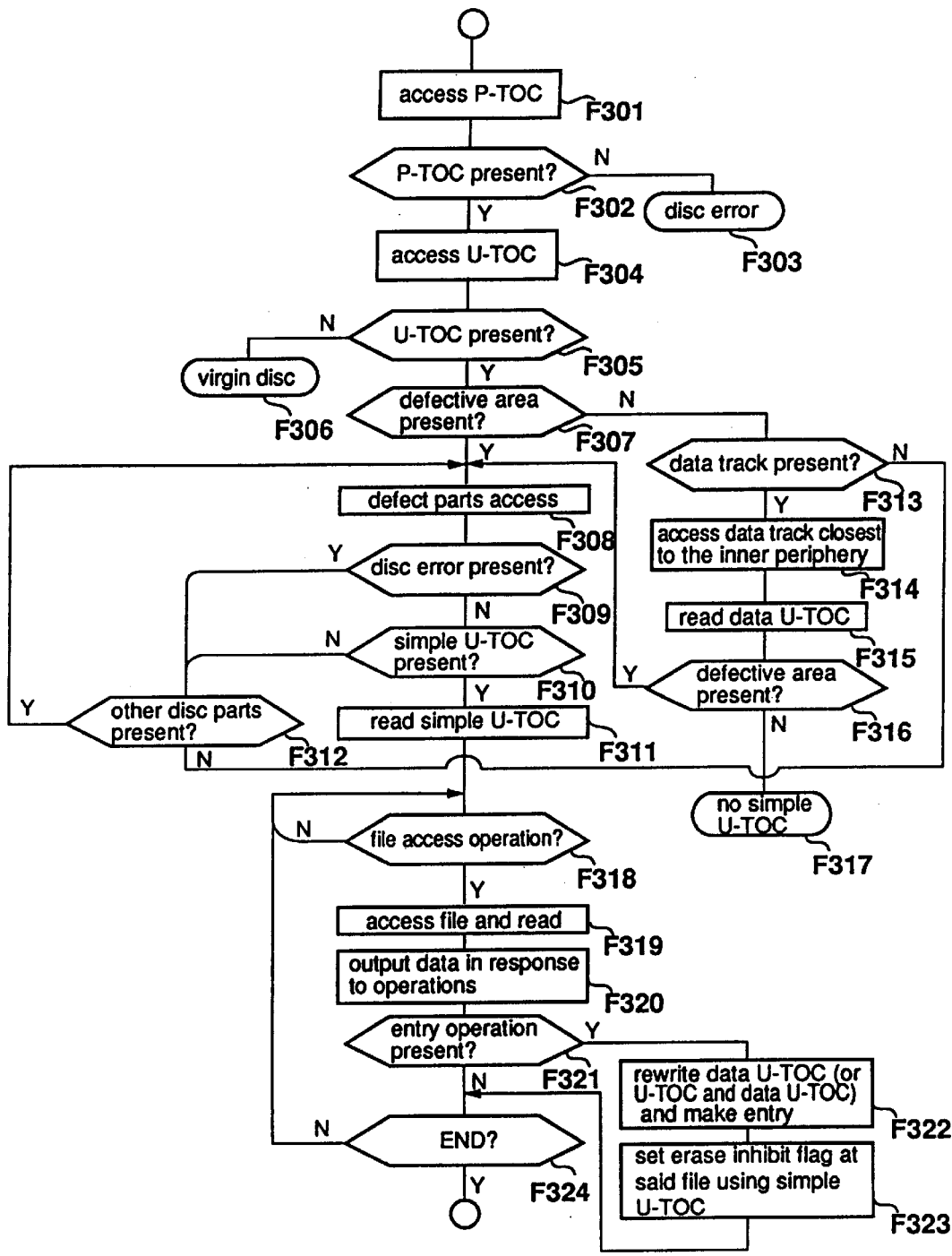
FIG. 30 is a flowchart of a playback editing process corresponding to a simple U-TOC of the embodiment.

FIG. 30 shows the process carried out by the system controller 21 with regards to data playback/entry corresponding to the simple U-TOC. Here, only the playback process can easily be applied to portable, compact equipment where each of the various specifications are to a smaller scale.

A simple U-TOC has to be read in order to have simple U-TOC compatible data file playback.

First, the system controller 21 makes the optical head 23 access the read-in area of the disc 1 and the P-TOC is read (F301). Here, if a P-TOC is not read, the process goes from step F302 to F303 and a step error is assumed.

When a P-TOC is read, accessing is performed based on the following U-TOC starter address (USTA) in the P-TOC and the U-TOC in the recording/playback processing area is read (F304).

When a U-TOC is not read, it is determined that this disc is a virgin disc (F305–F306).

If a U-TOC is read, the system controller 21 determines the existence of a defective area under the control of this U-TOC (F307). When a region recorded with a simple U-TOC and a data file controlled by this simple U-TOC is controlled under the conditions of FIG. 23 or FIG. 27, this region is taken as a defective area on the U-TOC, i.e., a defective area exists under the control of the U-TOC.

The parts indicated by the parts table arrived at from the table pointer P-DFA in the U-TOC are then accessed in sequence (F308).

First, the first part is accessed, information is read from this part and the occurrence or absence of disc errors is determined (F309). If these parts are actually defective parts, then a disc error is to be generated.

If a disc error is generated, the parts table shown by the parts table linked from the parts table of this part is accessed (F309–F312–F308).

Further, if a part taken as a defective area is accessed and played back and a disc error is not generated, the presence of absence of a simple U-TOC in this place is determined (F310), i.e., it is determined whether or not "MIEX" code data present in the system ID showing the presence of a simple U-TOC is read.

If it is determined in step F310 that "MIEX" is not read, this part is not a defective part, nor is it recorded with a simple U-TOC. This may be considered as, for example, a part where a data file is recorded under the control of a simple U-TOC or a defective part for which a disc error was not generated for whatever reason.

In this case, next, a part indicated by a parts table linked from a parts table showing this part is accessed (F310–F312–F308).

Figure 31:
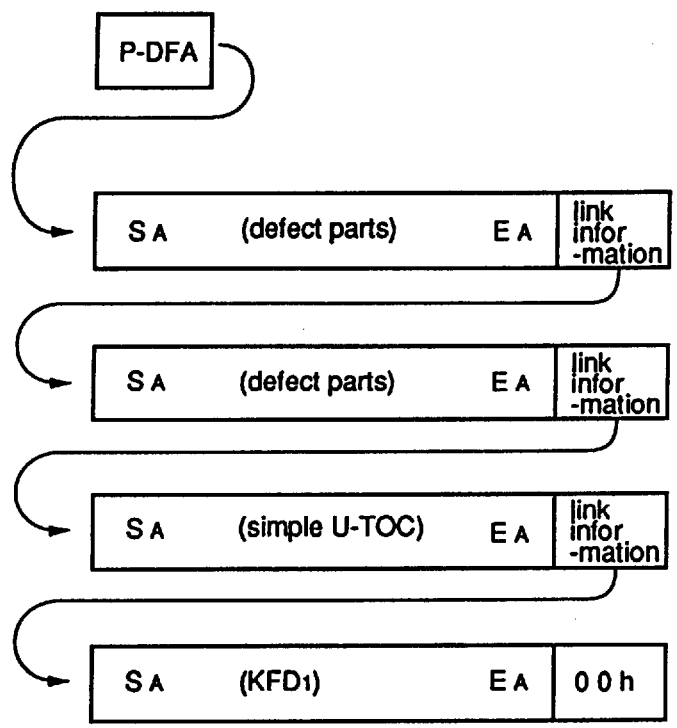
FIG. 31 is a view describing a simple U-TOC search operation of the embodiment.

When this kind of defective part is reached, at a certain point in time, a part for which a "MIEX" data code showing the presence of a simple U-TOC is read is found. For example, control is adopted for the defective part on the U-TOC as shown in FIG. 31, i.e., the first two parts indicated in the parts table reached at from the table pointed P-DFA which are defective parts, the next part having a simple U-TOC, and a part having a data file KFL1 controlled using a simple U-TOC are controllably linked. A simple U-TOC is therefore discovered when the third part is accessed.

In this kind of case, the process goes on from step F310 to step F311, and the discovered simple U-TOC is read.

If a simple U-TOC is still not found after parts taken to be defective areas are accessed, played back, and the reading out of the last part is completed, it is determined that there is no simple U-TOC on this disc and naturally, a playback operation for data files under the control of the simple U-TOC is not carried out (F312–F317). For example, with a disc under the kind of conditions shown in FIG. 4, a defective area caused by defects exists on the disc.

Further, if a defective area does not exist on the U-TOC in step F307, the existence or absence of a data track as a data track controlled by the U-TOC is confirmed, i.e., the existence or absence of a part having bit d4="1" as parts table track mode information is confirmed (F313).

For example, in the case of the control conditions shown in FIG. 25, a region recorded with a simple U-TOC and a data file controlled by this simple U-TOC is not taken as a defective area on the U-TOC but is taken as a defective area on the data U-TOC.

If it is determined in step F313 that a data track does not exist, then a data U-TOC is also not recorded and a simple U-TOC and data files controlled by this simple U-TOC taken as a defective area on the data U-TOC will also not exist. The playback process for data files which use the simple U-TOC is then completed with no simple U-TOC (F313–F317).

When a data track exists the process goes on to step F314. Here, first, the part including the smallest address of the parts comprising the data track is searched from the U-TOC and accessed, i.e., the optical head 23 accesses the portion within the data track which is furthest towards the innermost periphery of the disc and reads the data U-TOC (F315). This is to say that the management block being used is read from the volume management area starting from the volume descriptor for which the system ID is taken to be "MD001".

If a data U-TOC is read, the existence or absence of a defective area on the data U-TOC is determined, i.e., the existence or absence of a defect allocation block on the volume space bitmap is confirmed.

If a defect allocation block does not exist, the data file playback process using the simple U-TOC is completed with no simple U-TOC (F316 to F317).

If a defect allocation block exists, the process goes on to step F308, the detect parts (defect allocation blocks) are sequentially accessed and the simple U-TOC is searched in the same way as above (F308, F309, F310, F312). Then, if an allocation block capable of reading the "MIEX" code data is found, the simple U-TOC is read in step F311.

If "MIEX" is not found even after all of the defect allocation blocks are played back, it is determined that there is no simple U-TOC (F312–F317).

In the above process, playback of data files under the control of the simple U-TOC is possible if a simple U-TOC is read. Then, after each of the various operations for playback, i.e. the operations for designating the file to be played back (F318), the position displayed by the directory unit is accessed and the data file is read and put into the temporary buffer RAM 33 (F319).

Then, outputting is carried out under prescribed output conditions in response to. operations etc. (F320). For example, outputting is carried out to the display part 13 via the display controller 35 or outputting is carried out from the connector 15 to other equipment via the communications circuit 34.

If the playback operation is performed for other data files under the control of the simple U-TOC, step F318 is returned to from step F324 and the process is repeated.

If a user carries out an operation to enter a data file under the control of a data U-TOC while this data file is being played back and outputted, and entry processing is carried out, i.e. if an entry operation is made (F321), the data U-TOC is re-written and a data file of the kind shown in FIG. 24(c), FIG. 26(c) or FIG. 28(c) is taken to be a data file controlled by the data U-TOC. Further, when the control conditions up to this point have been as shown in FIG. 23 or FIG. 27, the U-TOC is updated so that control using the kind of U-TOC shown in FIG. 24(b) and FIG. 28(b) is carried out The simple U-TOC is then also re-written, i.e. an erasure inhibited flag (flag) is made to be "01h" at the directory unit corresponding to this data file (F323).

In the case of the playing back of data files corresponding to a simple U-TOC, a U-TOC is reached from the P-TOC, the directory area of the U-TOC is searched and the simple U-TOC is read out. Alternatively, the data U-TOC may be reached from the U-TOC, the defective area searched on the data U-TOC and the simple U-TOC read. The playback operation is then carried out in accordance with the directory unit in the simple U-TOC.

When recording/playback is carried out using the aforementioned simple U-TOC, it is not necessary to read or edit the data U-TOC. A large memory capacity is therefore not necessary at the time of recording/playing back and editing of the data files and the power consumption can also be made small. This recording/playback method is therefore extremely well suited to use in compact equipment or the like.

Further, a data file controlled by a simple U-TOC may be entered under the control of a data U-TOC. It therefore becomes possible to play back data files corresponding to simple U-TOC's by playing back usual data files employing data U-TOC's. Playback can therefore also be performed by devices which do not possess a playback function employing simple U-TOC's.

Moreover, by entering data files corresponding to a simple U-TOC under the control of a data U-TOC, this data file can become the object of high-speed editing operations occurring at the data U-TOC and can be utilized effectively by each type.

For example, photographs may be taken by a portable still camera having a recording function using a simple U-TOC and may be recorded on a disc as a data file. These may then be played back and viewed using full specification recording/playback equipment, the necessary data files may be selected and put under the control of the data U-TOC so that high speed editing for each type may be carried out.

IV-5 Copy Card Data Recording Employing a Simple U-TOC

As described above, the simple U-TOC is controlled as a defective area by a U-TOC and/or a data U-TOC. This can then be used as a hidden protection region for preventing illegal copying in carrying out copy protection.

With the optical disc device of this embodiment, a copy protect flag can be put up as the parts table track mode information in the U-TOC and a copy protect flag can also be put up in the data U-TOC as file or directory attribute data.

However, it is comparatively easy to re-model the recording/playback device so that these flags may be ignored so these flags cannot be construed as being an absolute copy protection means.

A more reliable method of copy protection employing a simple U-TOC is therefore described here.

This embodiment adopts an item employing a simple U-TOC. However, rather than using a simple U-TOC, a copy protection-dedicated sector may be provided and this may be controlled as a defective area in the same way as for the simple U-TOC.

First, in this copy protection method, a keyword for copy protection is recorded with the simple U-TOC.

Figure 32:
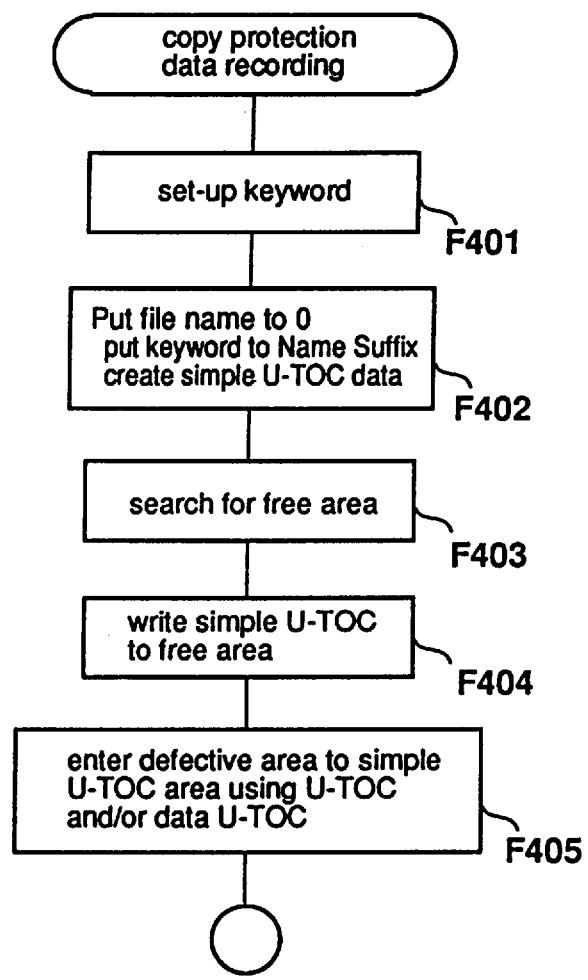
FIG. 32 is a flowchart of a copy-protection data recording process of the embodiment.

This recording process is shown in FIG. 32.

First, a keyword is set up (F401). This is, for example, keyword data set up at a recording program for copy protection generated by the recording device.

This keyword is then recorded using one directory unit of the simple U-TOC shown in FIG. 22.

For example, a keyword may be recorded using the 8 data file name bytes (Name 0 to Name 7) in the directory unit and the three suffix bytes (Suffix 0 to Suffix 2).

The presence of the keyword in the directory corresponding to the directory file for which the directory unit length is "0" i.e. the directory unit recorded with a keyword, is then indicated using the category information (Category) and the volume information (Volume 1-0, Volume 1—1).

If this kind of directory unit data is created (F402), a free area is searched from the U-TOC (F403) and this data is written into the free area as a simple U-TOC (F404).

Then, one or both of the U-TOC and the data U-TOC are updated so that the recorded simple U-TOC is taken as a defective area in the same way as for the recording of data files corresponding to a simple U-TOC (F405).

In this way, a keyword is preparedly recorded within the simple U-TOC and the playback device performs copy protection by carrying out processing in response to this keyword.

When data is copied from ordinary discs, the defective area on the U-TOC and the data U-TOC is ignored at the time of playing back the original disc.

A keyword is therefore not recorded for a copied disc.

It is not impossible to also make defective areas copyable. With regards to this, if the keyword is set up by performing operations on the information for the characteristics of the original disc, copy protection can also be achieved for the case of copying as far as the keyword.

For example, a copy protection system may be set up where an accurate keyword value is obtained by performing an operation on a keyword recording position cluster address and a keyword value.

In doing so, even if copying as far as the keyword is temporarily carried out, an accurate keyword cannot be obtained from a disc because the likelihood of the keyword being recorded at a cluster address having exactly the same address as on the disc prior to copying is virtually zero.

IV-6 Copy-Protection-Compatible Playback Processing

The playback process for carrying out copy protection will now be described for the case where a keyword is recorded within a simple U-TOC on a regular disc.

Figure 33:
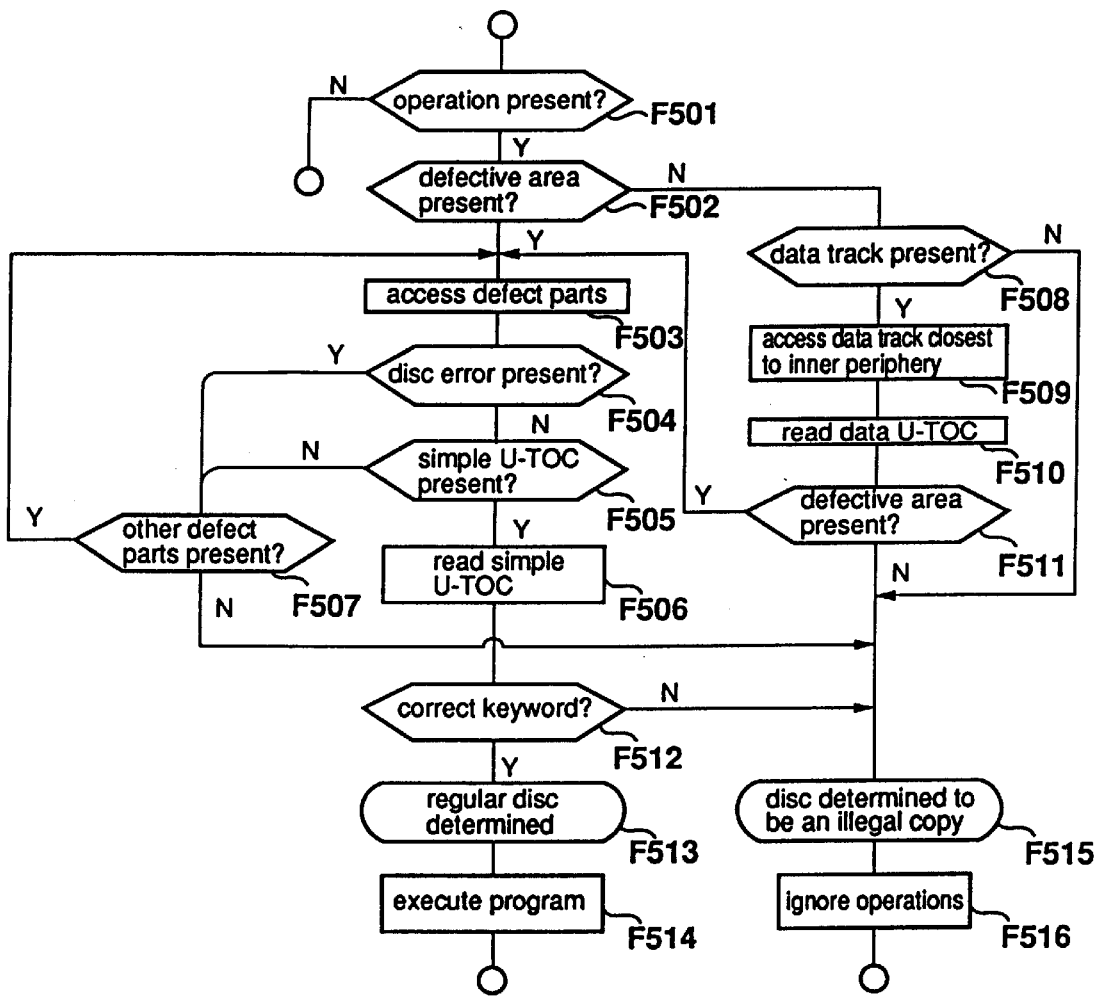
FIG. 33 is a flowchart of a playback process for providing copy protection in the embodiment.

FIG. 33 shows the process carried out during playback. This is shown as the process after the disc has been installed and the P-TOC and U-TOC have been read.

If there is an operation such as a playback operation with respect to the installed disc 1, the system controller 21 determines the existence or absence of a defective area under the control of the U-TOC (F501). If the disc is appropriate and there appears to be a keyword recorded in the simple U-TOC, the simple U-TOC exists as a defective area within either the U-TOC or the data U-TOC.

If a defective area exists under U-TOC control, parts indicated in the parts table reached from the table pointer P-DFA in the U-TOC are accessed in sequence and the simple U-TOC is searched for (F503, F504, F505, F507, i.e., the process is carried out in the same way as for the aforementioned steps F308, F309, F310 and F312 in FIG. 30. Then, if "MIEX" code data is read then a simple U-TOC has been found and this simple U-TOC is read (F506).

Further, if a defective area does not exist on the U-TOC, the process goes from step F502 to F508 and the existence or absence of a data track as a track controlled by the U-TOC is confirmed.

If a data track does not exist, the data U-TOC physically positioned at the head of the data track is accessed and read (F509, F510) and the existence of a defective area on the data U-TOC is confirmed (F511). If a defective area exists, the defective area, i.e. the simple U-TOC tracing the defect allocation block, is searched (F503, F504, F505, F507).

Then, if the code data "MIEX" is read, the simple U-TOC has been found, and this simple U-TOC is read (F506).

If the simple U-TOC is read, the directory unit recorded with the keyword, which is recorded within the simple U-TOC, is searched for, and the existence or absence of the correct keyword is confirmed (F512), i.e., the directory unit recorded with the keyword is confirmed from the category information (Category) and the volume information (Volume 1-0, Volume 1—1), and the keyword given by the data file (Name 0 to Name 7) and suffix (Suffix 0 to Suffix 2) bytes is confirmed.

Then, if the correct keyword is present, a regular disc is determined (F513) and a program is executed in accordance with the playback operation (F514).

On the other hand, in cases other than this, this disc is determined to be an illegal copy.

This is to say that if there is no defective area present in either the U-TOC or the data U-TOC, or if a defective area exists in either the U-TOC or the data U-TOC but this defective area does not include a simple U-TOC, the disc can be determined to be an illegal copy due to the absence of a simple U-TOC, which should be present as a recording (F508–F515), (F507–F515), (F511–F515).

An illegal copy is also determined in the case where a simple U-TOC exists but a keyword is not recorded, where the keyword is not correct, or where the value for the operation results in a system where a specific value is obtained by performing operations on, for example, a cluster address and keyword as described above (F512–F515).

If an illegally copied disc is determined in this way, the system controller 21 completely ignores the playback operations etc. and operations will not be carried out at all (F516). In this way, discs which have been copied illegally will be deemed invalid playback targets by the recording/playback device and accurate copy protection will therefore be provided.

V. Recording/Playback Methods Employing Simple U-TOC (Type B)

Next, a type B method where a simple U-TOC is recorded within a recording/playback control area will be described as a recording/playback method employing a simple U-TOC.

The sector structure of the simple U-TOC is the same as that for type A described using FIG. 22 and it's description is therefore omitted.

V-1 Control Conditions when a Simple U-TOC is Recorded

Examples of control conditions in cases of the recording of a simple U-TOC for a type-B recordings within the recording/playback control area are shown in FIG. 34, 36 and 38.

FIG. 34, 36 and 38 show the track conditions when control of the recording of a data file is carried out by a simple U-TOC. i.e., the conditions for recording a data file on the disc using a recording device equipped with a data file recording function using a simple U-TOC. A description is given in the following with regards to this recording method.

Now, in each of the examples explained here, in the same way as described for type A, three types of control conditions capable of execution are shown. There are control conditions where it is preferable to use a certain part of the free area with regards to the recording position of the data files KFL1 and KFL2 controlled by the simple U-TOC and control conditions where the recording position does not influence the specific classification of the control conditions. The setting up of the recording position is described later.

First, in the example in FIG. 34, a region recorded with a data file controlled by a simple U-TOC is controlled as a defective area by both a U-TOC and a data U-TOC.

Figures 34A, 34B, 34C, 34D:
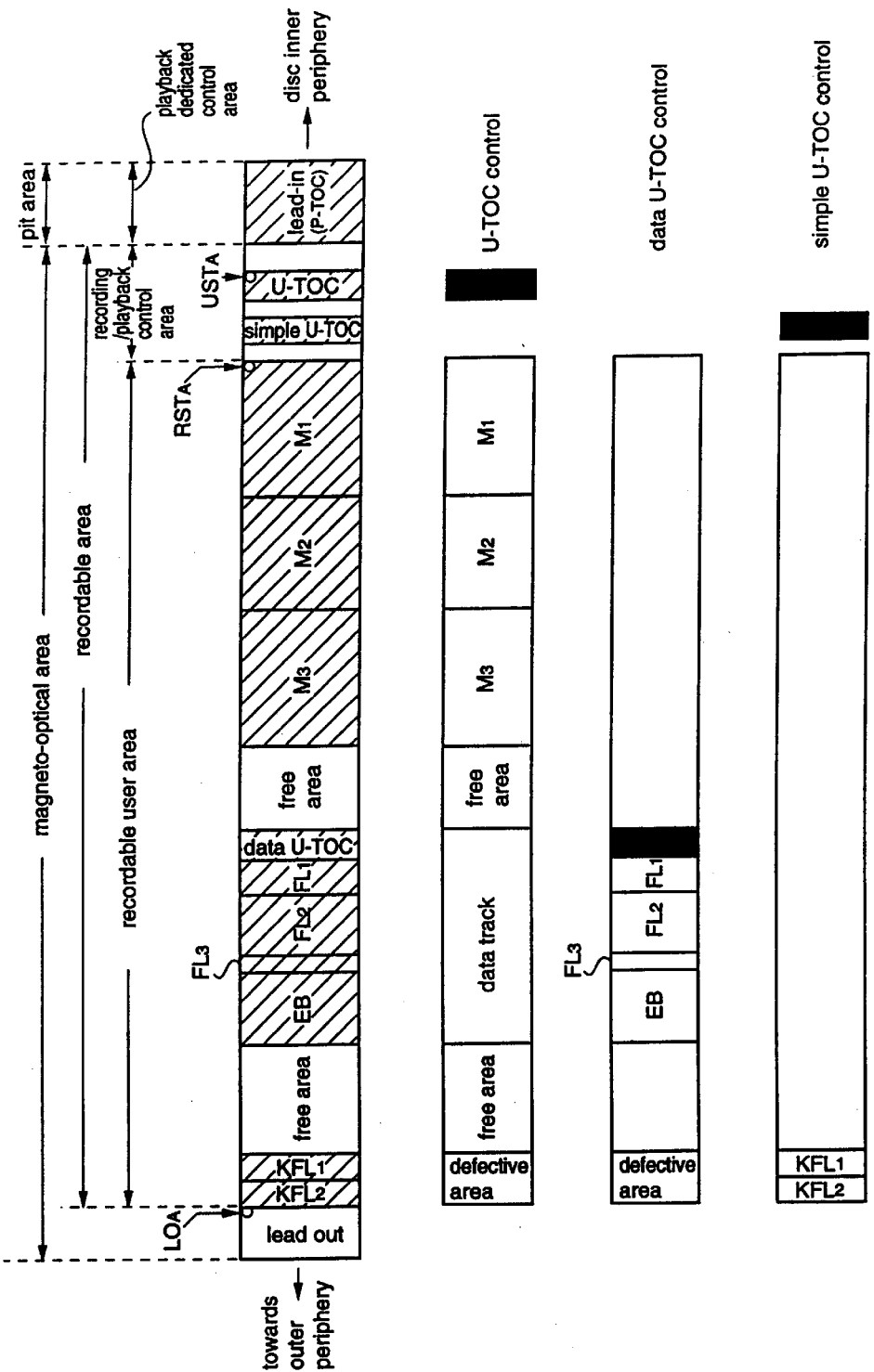
FIGS. 34(a) through 34(d) are views describing track control conditions of a disc recorded with a simple U-TOC of the embodiment.

As shown in FIG. 34(a), data files KFL1 and KFL2 controlled by a simple U-TOC positioned physically separate with respect to audio tracks M1, M2 and M3 and a data track, i.e. a data U-TOC, data files FL1, FL2 and FL3 and a yet to be recorded block EB, are recorded.

The simple U-TOC is recorded in a position within the recording/playback control area offset to a prescribed extent with respect to the U-TOC position.

In this case, the audio tracks M1, M2 and M3 are controlled by the U-TOC, as shown in FIG. 34(b), and the data U-TOC, data files FL1, FL2 and FL3 and the yet to be recorded block EB are controlled collectively as a data track.

The region recorded with the data files KFL1 and KFL2 is controlled as a defective area on the U-TOC indicated from the table pointer P-DFA, i.e., the region with the simple U-TOC and data files KFl1 and KFL2 is regarded as invalid by the recording/playback operation.

Further, the control of the data files FL1, FL2 and FL3 and the yet to be recorded block EB is carried out at the data U-TOC, as shown in FIG. 34(c).

The region recorded with the data files KFL1 and KFL2 is also controlled on the data U-TOC as a defective area. This is to say that this region is not taken as a data track controlled using a data U-TOC but an allocation block including this region is shown on the volume space bitmap as a defect allocation block.

The region for the data files KFL1 and KFL2 can also be regarded on the data U-TOC as an invalid region with regards to the recording/playback operation.

With regards to this simple U-TOC, the data files KFL1 and KFL2 are controlled as valid data files, as shown in FIG. 34(d).

The data files KFL1 and KFL2 can therefore only be played back by a playback device having a function to be described later for accessing a simple U-TOC.

Moreover, in the same way as for type A, data files KFL1 and KFL2 controlled by the simple U-TOC are included under the control of the data U-TOC and may therefore also be played back by playback operations employing the data U-TOC.

The conditions for the including of the data file KFL2 of the conditions in FIG. 34 under the control of the data U-TOC are shown in FIG. 35.

Figure 35A:
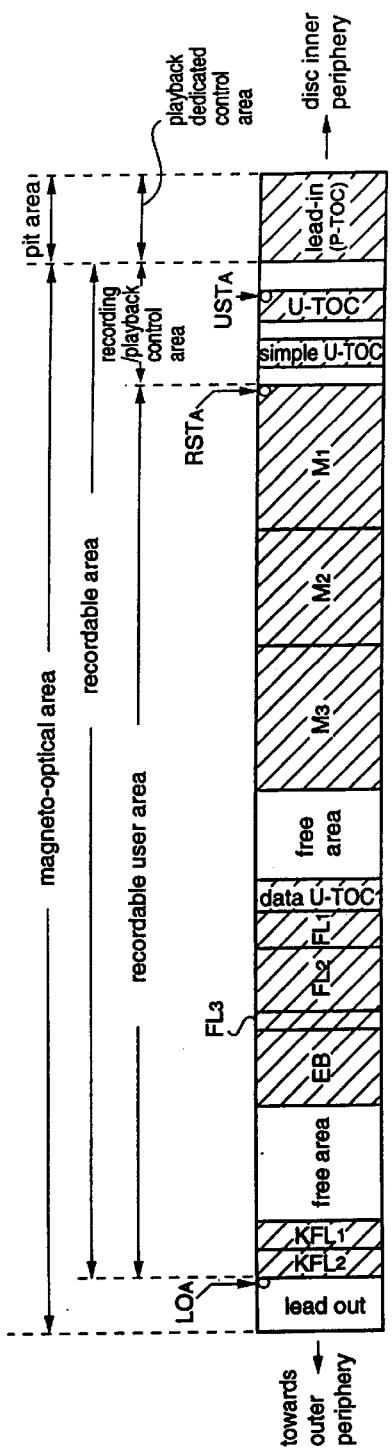
FIGS. 35(a) through 35(d) are views describing track control conditions after entry of data files corresponding to a simple U-TOC of the embodiment into a data U-TOC.
Figure 35B:
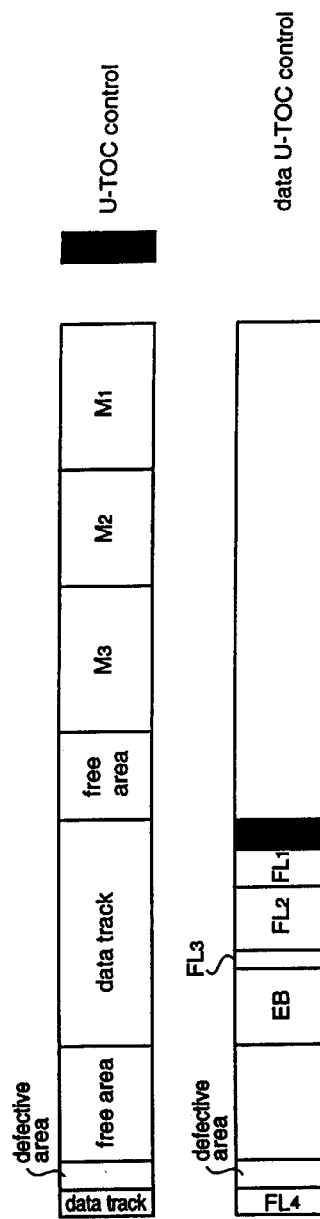

In this case, as shown in FIG. 35(b), the area of the data file KFL2 is updated so as to be included as one part of a data track.

Figure 35C:
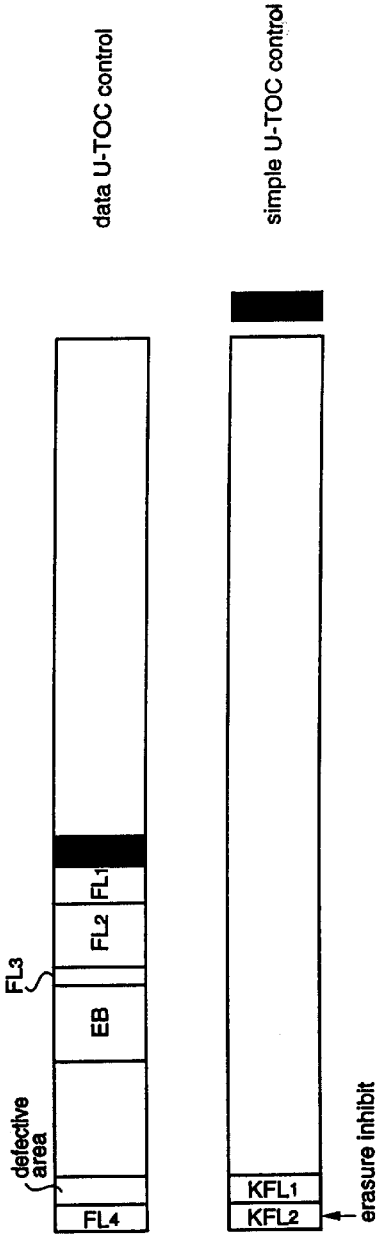

Then, at the data U-TOC, as shown in FIG. 35(c), a region corresponding to the data file KFL2 of a region which up until now had been taken as a defective area is controlled as a new data file FL4.

Figure 35D:

At the simple U-TOC, as shown in FIG. 35(d), the control conditions basically do not change but, with respect to the data file KFL2, the erasure prevention flag (Flag) of the directory unit corresponding to the data file KFL2 is taken as "01h" so as to be erasure inhibited. In this way, the erasure of the data file FL4 of the data U-TOC by an editing operation or the like corresponding to the data file KFL2 on the simple U-TOC is prevented.

Erasure is carried out using data U-TOC operations when it is wished to erase the data file KFL2 (=FL4).

In the example in FIG. 34, a region recorded with a data file controlled by a simple U-TOC is controlled as a defective area by both a U-TOC and a data U-TOC. However, control may also be carried out with just the U-TOC being taken as a defective area with the data U-TOC being outside the data track and not being controlled.

Next, in the example in FIG. 36, a region recorded with a data file controlled by a simple U-TOC is taken to be a defective area by a data U-TOC and not taken to be a defective area at a U-TOC, and control is then carried out.

Figures 36A, 36B, 36C, 36D:
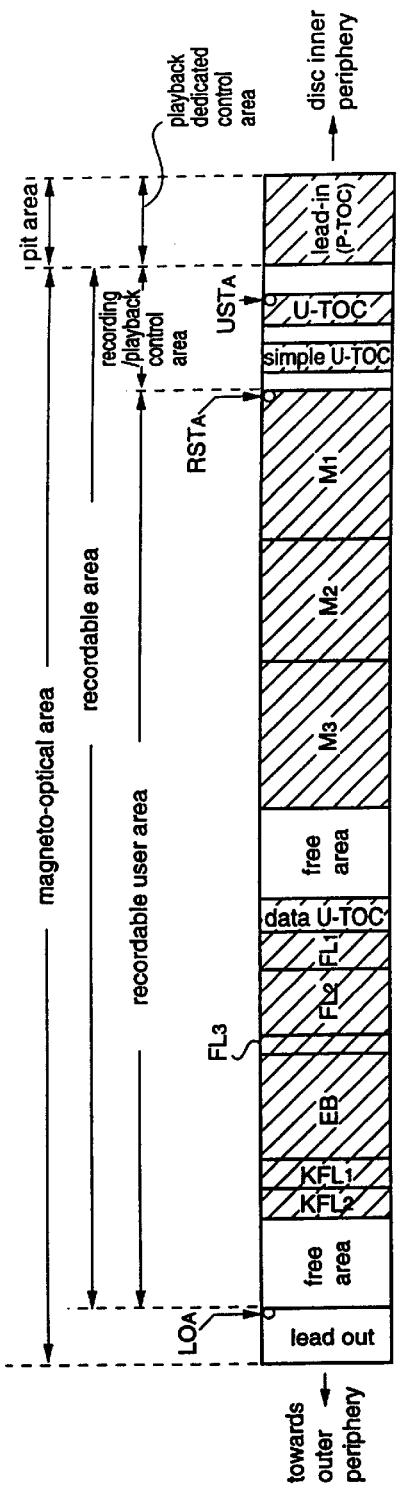
FIGS. 36(a) through 36(d) are views describing track control conditions of a disc recorded with a simple U-TOC of the embodiment.

As shown in FIG. 36(a), data files KFL1 and KFL2 controlled by the simple U-TOC are recorded in a position so as to continue on from a data track, i.e. a data U-TOC, data files FL1, FL2 and FL3 and a yet to be recorded block EB.

When recording in this position also, the control conditions can be made to be the same as those in FIG. 34. However, in this example, the data files KFL1 and KFL2 shown in FIG. 36(b) are controlled by being considered to be a part of the data track. The region recorded with the data files KFL1 and KFL2 shown in FIG. 34 is therefore not controlled by being taken as a defective area.

On the other hand, the data files FL1, FL2 and FL3 and the yet to be recorded block EB shown in FIG. 36(c) are controlled by the data U-TOC. The region recorded with the data files KFl1 and KFL2 is then controlled as a defective area within the data track, i.e., the allocation block including this region is indicated as a defect allocation block on the volume space bitmap. The region for the simple U-TOC and data files KFL1 and KFL2 is therefore considered to be an invalid region with regards to the recording/playback operation within the data track, on the data U-TOC.

With regards to this simple U-TOC, the data files KFL1 and KFL2 are controlled as valid data files, as shown in FIG. 36(d).

The data files KFL1 and KFL2 can therefore, in this case also, only be played back by a playback device having a function to be described later for accessing a simple U-TOC.

The conditions for the including of the data file KFL2, which is only under the control of the simple U-TOC in FIG. 36, under the control of the data U-TOC are shown in FIG. 37.

In this case, as shown in FIG. 37(b), the control conditions on the U-TOC do not change.

Then, at the data U-TOC, as shown in FIG. 37(c), a region corresponding to the data file KFL2 of a region which up until now had been taken as a defective area is controlled as a new data file FL4.

The control conditions at the simple U-TOC basically do not change from those shown in FIG. 37(d) but the data file KFL2 is erasure inhibited in the same way as the case in FIG. 35.

Next, in the example in FIG. 38, a region recorded with a data file controlled by the simple U-TOC is controlled by a U-TOC as a defective area.

In the case in FIG. 38 (a) where a data track is not recorded, the case is shown where data files KFL1 and KFL2 are recorded at a U-TOC-controlled free area.

The simple U-TOC is recorded at a position within the recording/playback control area which is offset to a prescribed extent from the position of the U-TOC.

In this case, the region recorded with the data files KFL1 and KFL2 is controlled by the U-TOC as a defective area, as shown in FIG. 38(b).

There is obviously no data U-TOC because there is no data track and there is therefore no control carried out by the data U-TOC (FIG. 38(c)).

The data files KFL1 and KFL2 are controlled as valid data files at the simple U-TOC, as shown in FIG. 38(d).

Therefore, in this case also, the data files KFL1 and KFL2 can only be played back by a playback device having a function enabling it to access the simple U-TOC in a way to be described later.

The conditions for including the data file KFL2 from the conditions in FIG. 38 under the control of the data U-TOC are shown in FIG. 39.

In this case, as no data track exists, a data track is generated.

Namely, a data U-TOC is recorded at the leading position of the region for the data files KFL1 and KFL2 as shown in FIG. 39(c) and this region is controlled as a data track on the U-TOC as shown in FIG. 39(b).

Further, the data file KFL2 is controlled at the newly-recorded data U-TOC as a new data file FL1, while on the other hand, the region for the data file KFL1 is controlled as a defective area.

On the simple U-TOC, as shown in FIG. 39(d), the data file KFL2 is taken as being erasure inhibited on the directory unit.

In this way, only the data file KFL2 is controlled as a data file FL1 on the data U-TOC.

In this case, it is preferable to take only the region of the data track KFL2 and the newly recorded data U-TOC as a data track on the U-TOC, and the region of the data file KFL1 as a defective area on the U-TOC.

Variations may be considered for the control conditions regarding the region recorded with the simple U-TOC and the data files controlled by the simple U-TOC.

V-2 Data File Recording Process Employing Simple U-TOC

Next, a data file recording process employing a simple U-TOC is described for the kind of recording/playback device shown in FIG. 2 or a recording device equipped with a recording means similar in block structure. In the same way as for the case for type A, this recording process is equipped with approximately the same recording block structure as for FIG. 2 but may also easily be used in, for example, portable, compact devices where each of the various specifications such as memory capacity are of a smaller scale.

FIG. 2 describes the recording/playback device playback operation.

Figure 40:
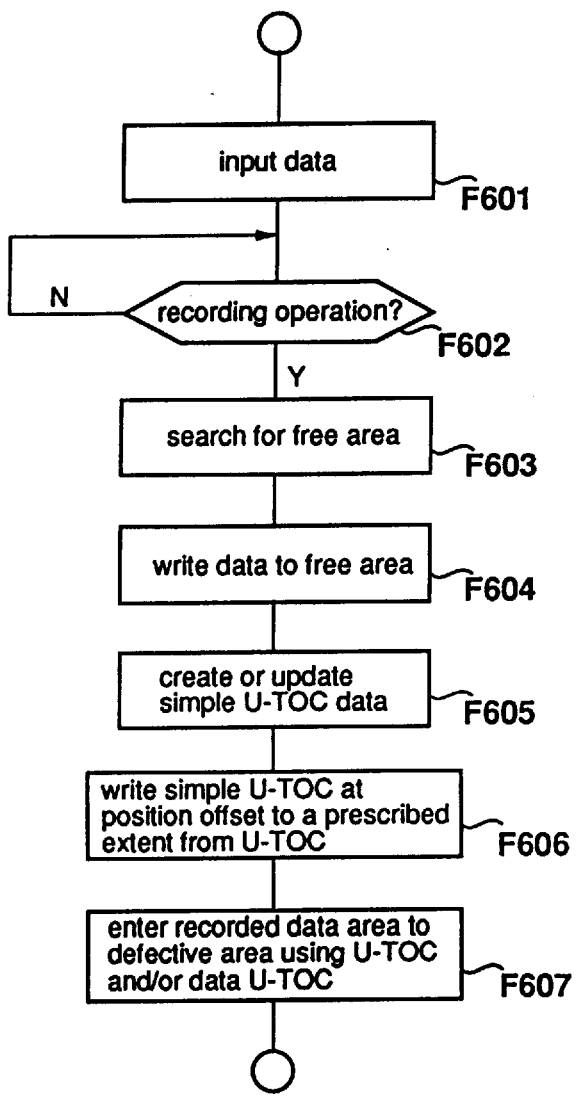
FIG. 40 is a flowchart for a recording process corresponding to a simple U-TOC of the embodiment.

FIG. 40 shows the process for the system controller 21 during recording.

The actual recording process commences (F601–F602–F603) if data to be recorded is inputted via the connector 15 and communications circuit 34 or via the image scanner 14 and a recording operation is made.

First, a free area where this input data can be recorded is searched from the U-TOC (F603) and the input data is recorded in this free area (F604).

Data is then generated because a directory unit corresponding to this recorded data file has to be recorded as a simple U-TOC (F605), i.e., if a simple U-TOC already exists on a recorded disc, this is read out and a directory file corresponding to the data file to be recorded on this occasion is created. Further, if a simple U-TOC does not exist, simple U-TOC data recorded with a directory unit corresponding to the data file recorded on this occasion is created.

A detailed description of the determination of the presence or absence on the disc of a simple U-TOC or the reading out process if present will not be given here because this is the same as a reading process occurring at the time of playback to be described later.

If simple U-TOC data corresponding to the data file recording is edited or played back, this simple U-TOC data is recorded at a recording/playback control area (F606). The recording position within the recording/playback area is offset to a prescribed extent from the recording position of the U-TOC. For example, a cluster address is obtained by adding a specific value to the U-TOC start address and this is taken as the simple U-TOC start address.

Next, the U-TOC/data U-TOC are re-written so as to enter the recorded data file region into the directory area using both or one of the U-TOC and the data U-TOC (F607), i.e., one or both of the U-TOC and data U-TOC are re-written so as to achieve the control conditions in one of FIG. 34, FIG. 36 or FIG. 38.

In this way, the operation of recording a data file corresponding to a simple U-TOC is completed.

V-3 Data File Playback Processing Employing a Simple U-TOC and Entry Processing Going to a Data U-TOC Next, the playback process for data files recorded under the control of a simple U-TOC, as shown, for example, in FIGS. 34, 36, and 38, and the process of including data files only under the control of a simple U-TOC under the control of a data U-TOC shown in FIGS. 35, 37 and 29 are described.

Figure 41:
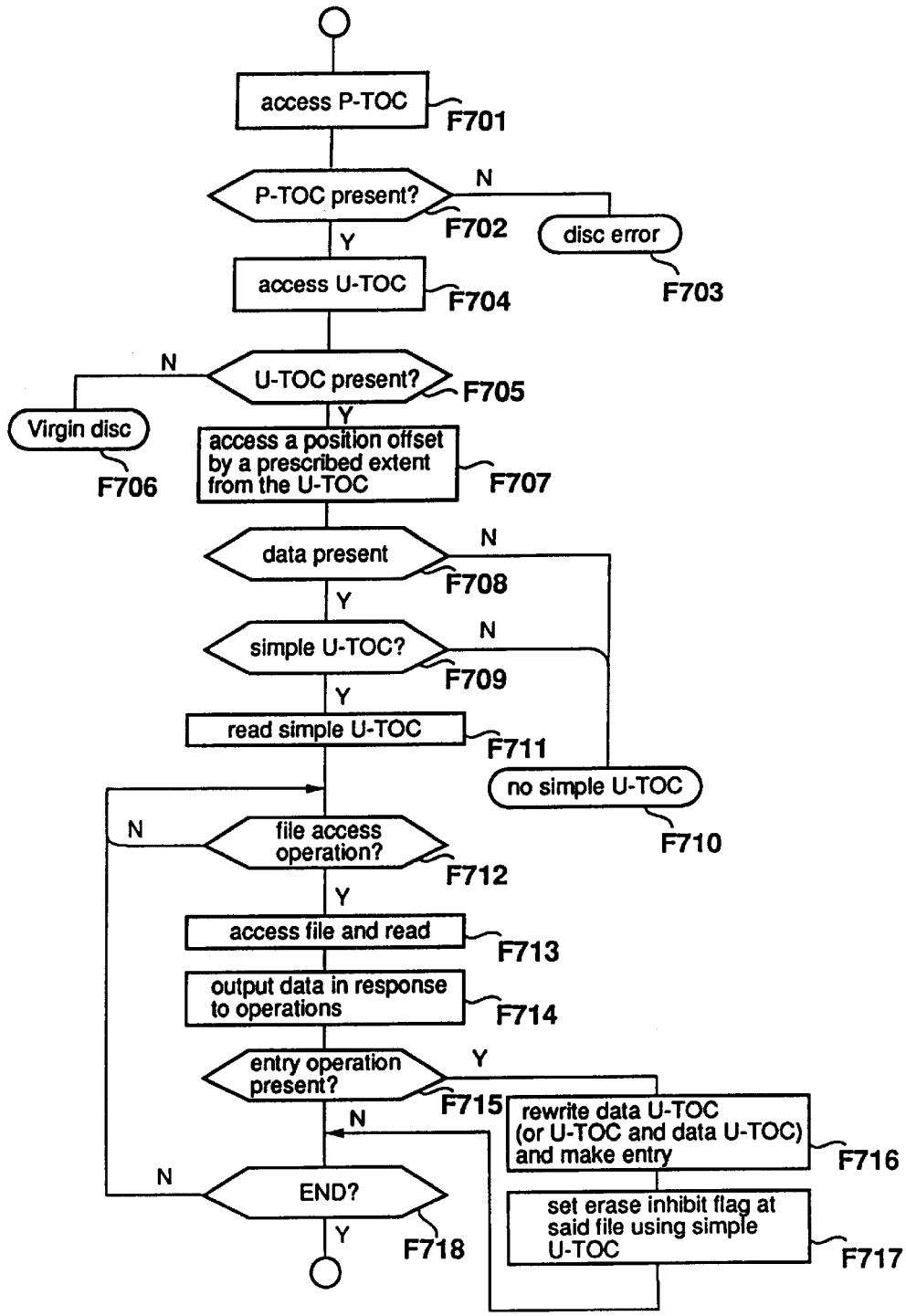
FIG. 41 is a flowchart of a playback editing process corresponding to a simple U-TOC of the embodiment.

FIG. 41 shows the process of the system controller 21 with regards to data playback/entry corresponding to the simple U-TOC. Here only the playback process can easily be applied to portable, compact equipment where each of the various specifications are to a smaller scale.

A simple U-TOC has to be read in order to have simple U-TOC compatible data file playback.

First, the system controller 21 makes the optical head 23 access the read-in area of the disc 1 and the P-TOC is read (F701). Here, if a P-TOC is not read, the process goes from step F702 to F703 and a step error is assumed.

When a P-TOC is read, accessing is performed based on the following U-TOC starter address (USTA) in the P-TOC and the U-TOC in the recording/playback processing area is read (F704).

When a U-TOC is not read, it is determined that this disc is a virgin disc (F705–F706).

If a U-TOC is read, the system controller 21 accesses a position offset by a prescribed amount from the next U-TOC with the optical head 23 (F707) and reads out data from this position, i.e., this becomes the operation for accessing the simple U-TOC.

If data is not read here, then a simple U-TOC does not exist. The data file playback process using the simple U-TOC is therefore ended with no simple U-TOC (F708–F710).

If data is read from a position offset by a prescribed extent from the U-TOC, it is determined whether or not this is a simple U-TOC (F709), i.e., it is determined whether or not a "MIEX" data code present in the system ID showing the presence of a simple U-TOC is read.

If it is determined that "MIEX" has not been read in step F709, a simple U-TOC is determined not to exist on this disc and the data file playback process using the simple U-TOC is ended (F709–F710).

If the code data "MIEX" exists in the data read from the position offset by a prescribed amount from the U-TOC, the process moves on from step F709 to step F711 and a simple U-TOC is read.

If a simple U-TOC is read, it becomes possible to play back data files controlled by the simple U-TOC. Then, in response to each of the various operations for playing back the data file i.e. in response to operations designating the data file to be played back (F712), the position indicated by this directory unit is accessed and this data file is read and then taken in by the temporary buffer RAM 33 (F713).

Next, outputting is carried out under prescribed output conditions in response to operations, etc. (F714). For example, outputting is carried out to the display part 13 via the display controller 35 or to other equipment from the connector 15 via the communications circuit 34.

When playback operations for other data filed controlled by the simple U-TOC are to be made, step F718 through to F712 are returned to and the process is repeated.

If a user carries out an operation to enter a data file under the control of a data U-TOC while this data file is being played back and outputted, and entry processing is carried out, i.e., if an entry operation is made (F715), the data U-TOC is re-written and a data file of the kind shown in FIG. 35(c), FIG. 37(c) or FIG. 39(c) is taken to be a data file controlled by the data U-TOC. Further, when the control conditions up to this point have been as shown in FIG. 34 or FIG. 38, the U-TOC is updated so that control using the kind of U-TOC shown in FIG. 35(b) and FIG. 37(b) is carried out (F716).

The simple U-TOC is then also re-written, i.e. an erasure inhibited flag (flag) is made to be "01h" at the directory unit corresponding to this data file (F717).

As above, in the case of playing back data files corresponding to a simple U-TOC, by obtaining an address for where a simple U-TOC is determined to be recorded by adding a prescribed offset value to a U-TOC start address USTA displayed at the P-TOC, a simple U-TOC may be read from this position. The playback operation may then be carried out in accordance with the directory unit in the simple P-TOC.

When recording/playback is carried out using the aforementioned simple U-TOC, as in the case described above in type A, it is not necessary to read or edit the data U-TOC. A large memory capacity is therefore not necessary at the time of recording/playing back and editing of the data files and the power consumption can also be made small. This recording/playback method is therefore extremely well suited to use in compact equipment or the like.

Further, a data file controlled by a simple U-TOC may be entered under the control of a data U-TOC. It therefore becomes possible to play back data files corresponding to simple U-TOC's by playing back usual data files employing data U-TOC's. Playback can therefore also be performed by devices which do not possess a playback function employing simple U-TOC's.

Moreover, by entering data files corresponding to a simple U-TOC under the control of a data U-TOC, this data file can become the object of high-speed editing operations occurring at the data U-TOC and can be utilized effectively by each type.

For example, photographs may be taken by a portable still camera having a recording function using a simple U-TOC and may be recorded on a disc as a data file. These may then be played back and viewed using full specification recording/playback equipment and the necessary data files may be selected and put under the control of the data U-TOC so that high speed editing for each type may be carried out.

V-4 Copy Protected Data Recording Employing a Simple U-TOC

With this type B also, the simple U-TOC is controlled by a U-TOC and/or a data U-TOC. This is then used to provide a hidden protection region for preventing illegal copying and copy protection is carried out.

In this embodiment, a simple U-TOC has been utilized. However, instead of a simple U-TOC, a recording/playback control area may be provided as a dedicated copy protection area and this may be recorded with a keyword.

In this case, a keyword for copy protection is first recorded within the simple U-TOC.

Figure 42:
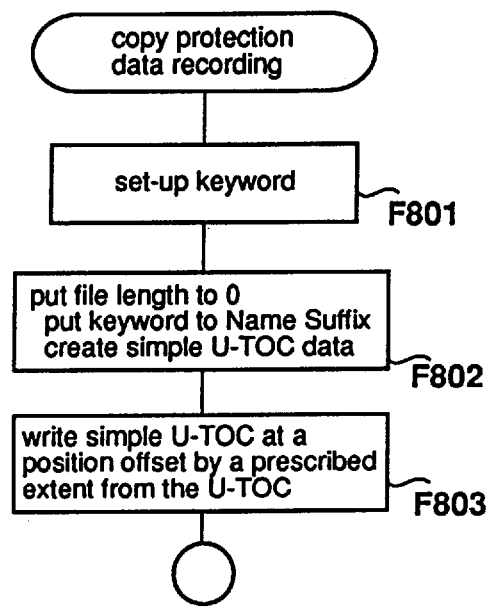
FIG. 42 is a flowchart of a copy-protection data recording process of the embodiment.

This recording process is shown in FIG. 42.

First, keyword data set-up in a recording program for copy protection is generated by the recording device (F801).

Then, a keyword is recorded using a single directory unit of the simple U-TOC shown in FIG. 22. This is to say that a keyword is recorded using the 8 data file name bytes of the directory unit (Name 0 to Name 7) and the 3 suffix bytes (Suffix to Suffix 2) in the same way as for the case described in type A.

Then, the presence of a directory corresponding to the data file of directory unit length "0" i.e. the presence of a directory unit recorded with a keyword, is indicated using category information (Category) and volume information (Volume 1-0, Volume 1-1).

If this kind of directory unit data is created (F802), a prescribed offset value is added to the U-TOC start address USTA and the cluster address of the simple U-TOC to be recorded within the recording/playback control area is obtained. This cluster address is then written as a simple U-TOC (F893).

Copy protection can therefore be carried out by preparedly recording a keyword within the simple U-TOC, with the playback device then carrying out processing in response to this keyword.

Usually, in the case of playing back data from a certain disc and copying it to another disc, the simple U-TOC is ignored at the disc on the playback side.

Further, it is possible to playback and copy a data file corresponding to a simple U-TOC by playing back using the aforementioned kind of simple U-TOC but copying cannot be achieved because the simple U-TOC does not itself provide a playback output.

It therefore follows that a keyword has not been recorded with the data copied to the disc.

V-5 Copy-Protection Compatible Playback Processing

Here, a playback process is described for carrying out copy protection in the case where a keyword is recorded within a simple U-TOC on a regular disc.

Figure 43:
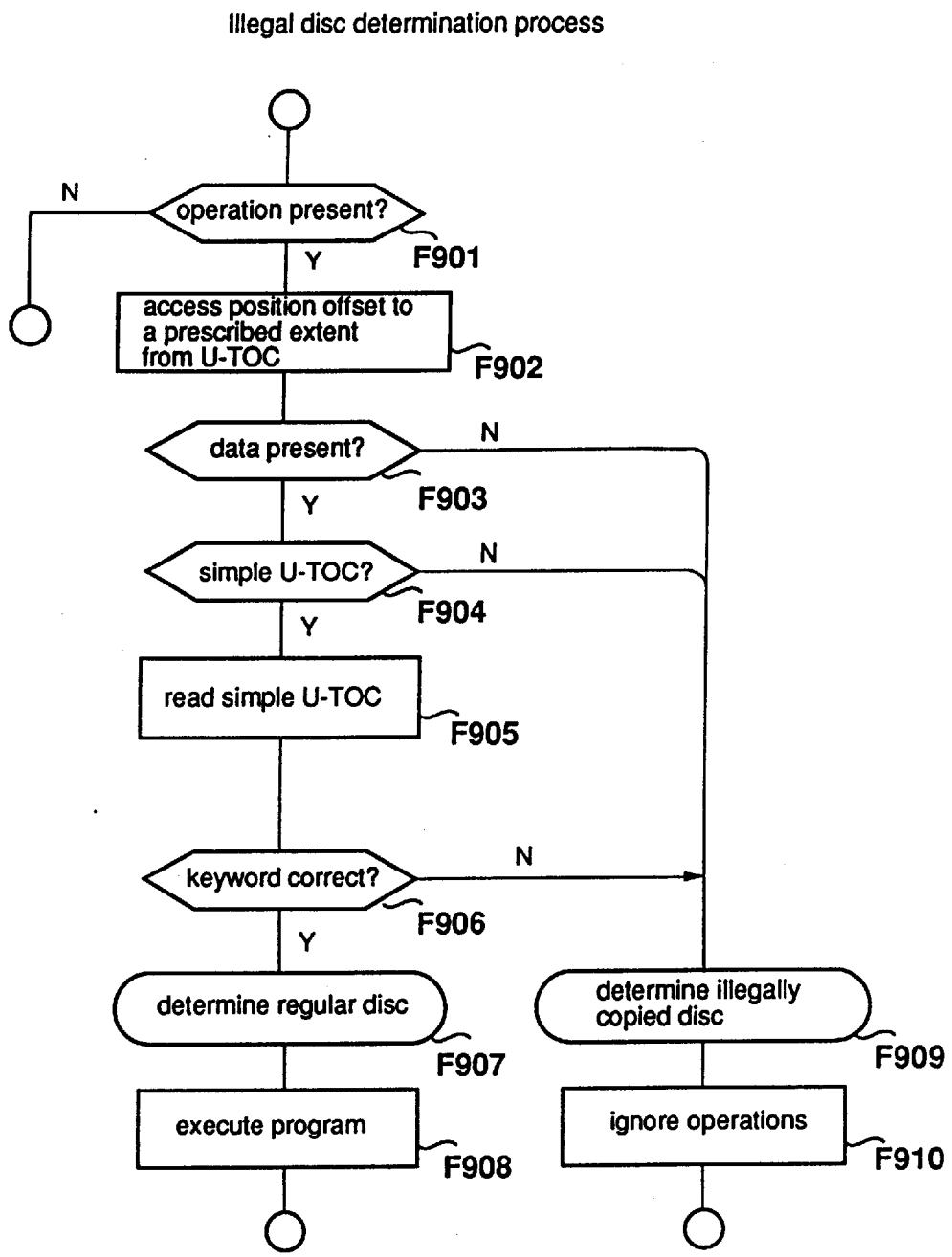
FIG. 43 is a flowchart of a playback process for providing copy protection in the embodiment.

FIG. 43 shows the process carried out during playback. The process after the disc has been installed and the P-TOC and U-TOC have been read out is shown.

If there is a playback operation or the like regarding the installed disc 1, the controller 21 accesses an address position which is the U-TOC starter address UST recorded in the P-TOC with a prescribed offset added (F902), determines whether there is data at this position, and then determines whether or not a simple U-TOC is present in this data (F903, F904).

Then, "MIEX" code data is read and a simple U-TOC is read (F905) if determined to exist.

If a simple U-TOC is read, a directory unit recorded with a keyword is searched for from within this simple U-TOC and the existence or absence of a keyword is confirmed (F906), i.e., a directory unit recorded with a keyword is confirmed from the category information (Category) and the volume information (Volume 1-0, Volume 1—1) and this keyword derived from the bytes of the data file (Name 0 to Name 7) and the suffix (Suffix 0 to Suffix 2) is confirmed.

If the correct keyword is present, the disc is determined to be regular (F907) and a program is executed in response to playback operations etc. (F908).

On the other hand, if a simple U-TOC does not exist, a simple U-TOC exists but is not written with a keyword or the keyword is not correct, this disc is determined to be an illegal copy (F903–F909), (F904–F909), (F906–F909).

When an illegally copied disc has been determined, the system controller 21 completely ignores playback operations etc. will not be operable (F910). In this way, an illegally copied disc is regarded as an invalid disc by the recording/playback device with respect to recording and playing back and reliable copy protection is achieved.

VI. Data File Recording Position Controlled Using Simple U-TOC

As described above, as recording/playback methods employing simple U-TOC's, there is a method A and a method B. In the case of method A, a simple U-TOC and a data file corresponding to the simple U-TOC are recorded in a free area. In the case of method B, a data file corresponding to a simple U-TOC is recorded in a free area. The simple U-TOC is then recorded continuously in the data U-TOC.

In either case, the data file (in the case of type A, the data file and the simple U-TOC) may be recorded at any position within the free area. However, in this embodiment, recording of these data files takes place at a position which is as far as possible towards the outer side periphery of the disc.

In the following, an explanation is given with regards to this recording position. This description is given taking type B as the example, with the recording position of the data file corresponding to the simple U-TOC being described, but this is equally applicable to type A. This is the same for the recording position of the simple U-TOC in type A.

Figures 44A, 44B, 44C:
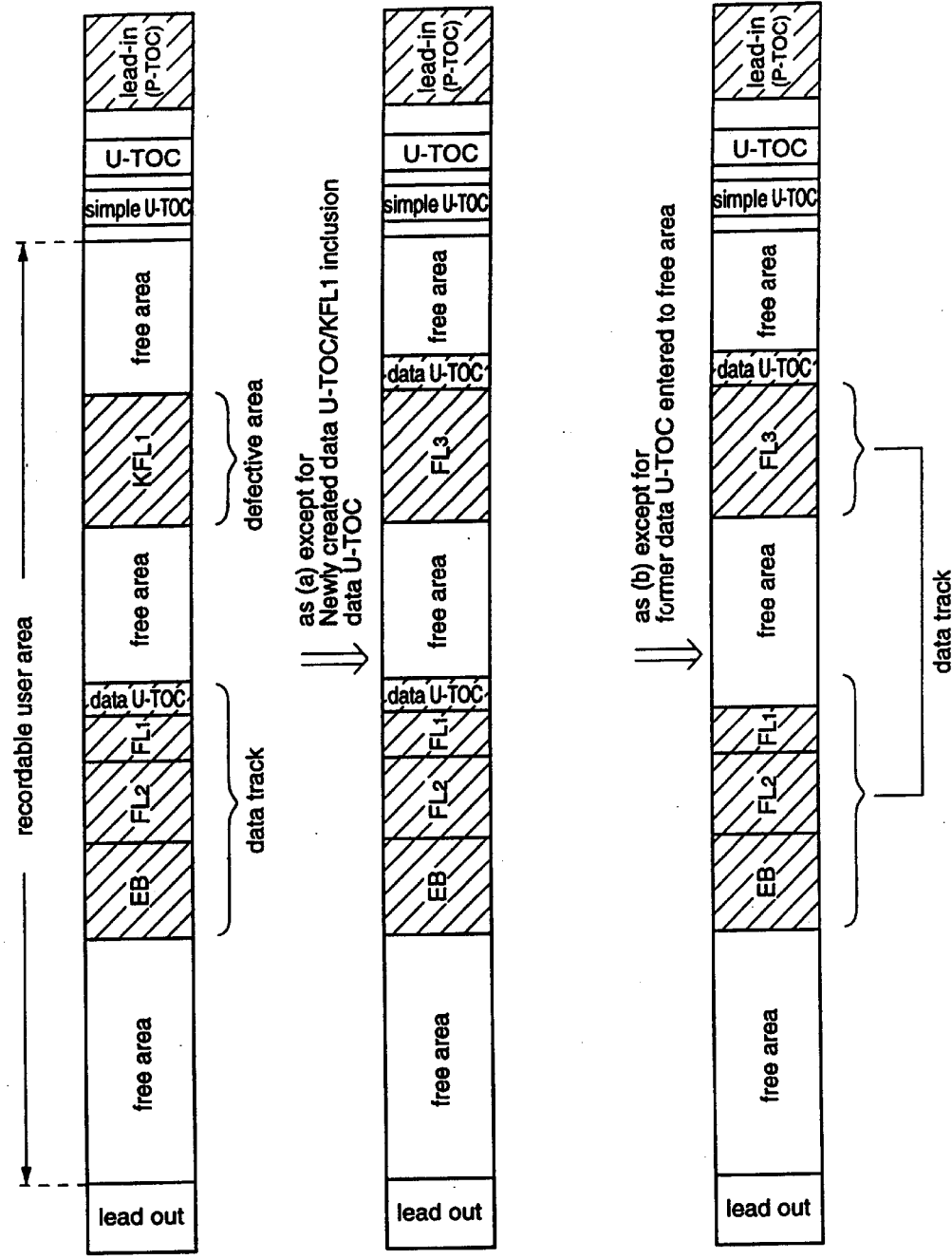
FIGS. 44(a) through 44(c) are views describing a data file recording position corresponding to a simple U-TOC of the embodiment.

FIG. 44(a) shows a case where a data file KFL1 corresponding to a simple U-TOC is recorded towards the inner periphery of the free area in relation to other items.

At this time, the data track is positioned further towards the outer periphery than the data file KFL1 i.e. the data U-TOC has an address which is later than that of the data file KFL1.

Here, as described above, an operation is carried out to enter a data file KFL1 corresponding to the simple U-TOC under the control of the data U-TOC.

In this case, as the entry operation, the data U-TOC may be updated in such a manner that the area recorded with the data file KFL1 may be controlled as a new data file FL3 at the data U-TOC. Also, the area of the data file KFL1 is taken out of the defective area on the U-TOC and incorporated with the data track parts.

This new data file FL3 is positioned further towards the inner periphery than the data U-TOC up until this point.

It is normal for the data U-TOC to be recorded at the leading position of the part at the innermost periphery of the parts making up the data track. Therefore, if the data file KFL1 is included with the parts making up the data track as the data file FL3, the data U-TOC has to be recorded directly before the part becoming this data file FL3.

Because of this, the updating for entry by the data U-TOC is not the only process carried out at the time of entry. This updated data U-TOC is recorded directly before a part which becomes the kind of data file FL3 shown in FIG. 44(b). A process for entering the data U-TOC area shown in FIG. 44(c) which has existed up until now as a free area is then required.

Namely, a multiplicity of processes consisting of updating the data U-TOC contents, recording to the updated position of the data U-TOC and updating the data track, defective area and free area in the U-TOC, become necessary.

Figures 45A, 45B:
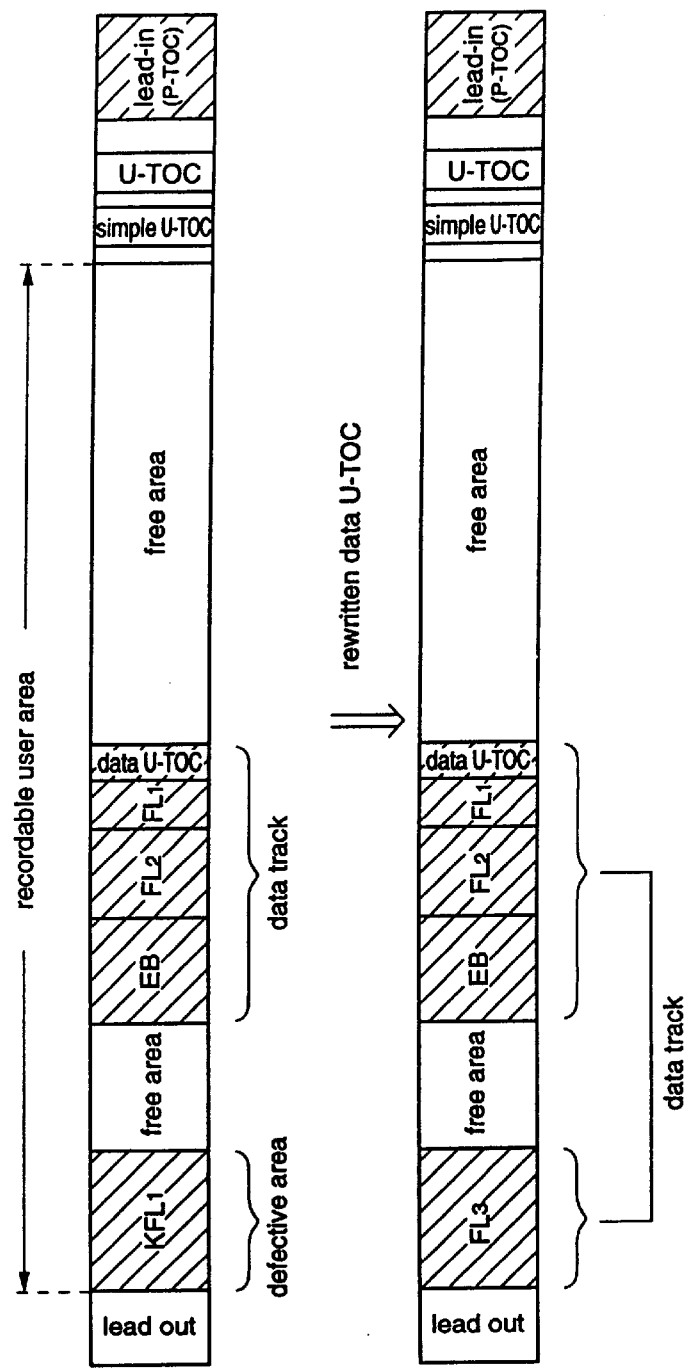
FIGS. 45(a) through 45(b) are views describing a data file recording position corresponding to a simple U-TOC of the embodiment.

On the other hand, FIG. 45(a) shows the case where a data file KFL1 corresponding to the simple U-TOC is recorded at a position towards the outer periphery disc side of the free area. In this case, the data track is positioned further towards the inner periphery than the data file KFL1. The data U-TOC therefore has an address preceding that of the data file KFL1.

Here, an operation for entering the data file KFL1 corresponding to the simple U-TOC under the control of the data U-TOC is carried out.

In this case, as an entry operation, the data U-TOC may be updated so that an area recorded with the data file KFL is controlled as a new data file FL at the data U-TOC. Further, the area for the data file KFL1 is taken out from the detect area on the U-TOC and incorporated with the data track parts.

In this case it is not necessary to modify the data U-TOC position and contents are re-written only for portions of the data U-TOC which require updating.

It is also not necessary to update the free area on the U-TOC. This means that entry can be completed by a comparatively simple process.

As can be seen from the examples in FIG. 44 and FIG. 45, with regards to a data file corresponding to a simple U-TOC, entry processing to a data U-TOC can be considered and recording as far as possible towards the outer periphery of the disc becomes possible.

In addition to this, after entry into the data U-TOC, it is preferable to have the position of the entered data files and the position of the data U-TOC physically close. This makes the access speed at the time of playback fast. In particular, in the case of the CLV method, the number of rotations of the spindle motor changes depending on the position on the disc and in the case of accesses over long distances, time is necessary to control the number of rotations of the spindle motor. From this point of view also, it is preferable to have the data file position and the data U-TOC position close together.

Therefore, in this embodiment, the recording position of a data file corresponding to a simple U-TOC is set up under the following conditions 1, 2 and 3.

1 When no data track (data U-TOC) exists.

The necessary area length is searched for at the region nearest to the outermost periphery of the disc of the 116 existing free area. In this way, when a data track is formed after this, the data U-TOC which becomes the leading position is made to be further towards the inner periphery of the disc than the data file corresponding to the simple U-TOC. Further, by recording at the outermost periphery, the degree of freedom is maximized when recording data tracks after this.

2 When a data track (data U-TOC) exists.

A region of the necessary length is searched for from the existing free area at positions which are towards the outer periphery from the data track and close to the data track. In this way, data files corresponding to the simple U-TOC are made to be further towards the outer periphery of the disc than the data U-TOC and if possible, recorded in a position continuing on from the data track. This can be utilized with regards to the access speed after entry.

3 When a free area fulfilling the above conditions does not exist.

In this case, recording is carried out at a position which is, if possible, close to the outer periphery of the existing free area. In this case, as shown in FIG. 44, the case arises where the data file corresponding to the simple U-TOC is further towards the inner periphery than the data U-TOC, but this does not present a problem.

During the recording of data files employing simple U-TOC's, by selecting the recording position in the above way, the recording and playing back etc. of normal data files using data U-TOC's can be achieved under the most desirable conditions.

An embodiment of the present invention has been described above, but various modifications of the present invention are possible in addition to the embodiment shown.

What is claimed is:

1. A reproducing device for reproducing data from a recording medium comprising:
   a first recordable area for recording first-type data composed of at least one program;
   a second recordable area for recording second-type data composed of at least one file;
   a first management area for managing the at least one program of the first recordable area and at least one file of the second recordable area, first management data comprising a corresponding part table indicating data for indicating a part table, the part table manages the start address, end address of part of a program, and link information for indicating next slot address to be linked;
   a second management area for managing the at least one file, the reproducing device comprising:
      means for reproducing the first management data from the first management area;
      means for determining whether or not second-type data is being reproduced by the reproducing means from the first management area;
      means for accessing, when the determining means determines the existence of the second type of data, the second management area in accordance with the first management data and reproducing the second management data; and
      means for accessing file data based on the reproduced second management data.

2. A reproducing device according to claim 1, further equipped with management means for accessing a defective area based on management data of the first management area and/or management data of the second control management area and means for reproducing the accessed defective area and determining whether or not a copy inhibit identification code is recorded.

3. A reproducing device according to claim 2, further comprising control means for inhibiting reproducing when a copy inhibit identification code is recorded at the management area.

4. A reproducing device for reproducing data from a recording medium comprising:
   a first recordable area for recording first-type data composed of at least one program;
   a second recordable area for recording second-type data composed of at least one file;
   a third recordable area for recording second-type data composed of at least one file;
   a first management area for managing the at least one program of the first recordable area and at least one file of the second recordable area and a defective area on the medium, first management data comprising a corresponding part table indicating data for indicating a part table, the part table manages the start address, end address of part of a program, and link information for indicating next slot address to be linked;
   a second management area for managing the at least one file of the second recordable area; and
   a third management area for managing at least one file of the third recordable area, the reproducing device comprising:
      means for reproducing the first management data of the first management area;
      first determining means for determining whether or not a defective area is being managed within the first management data of the first management area reproduced by the reproducing means;
      first management means for, when determined by the first determination means that a defective area is being managed, accessing the defective area based on defective area management data;
      second determining means for determining whether or not an error exists at the accessed defective area;
      third determining means for determining whether or not there is a third management area when there is no error present at the defective area accessed by the second determining means: and second management means for, when the third determining means determines the existence of a third management area, reproducing contents of the third management area and accessing file data based on reproduced third management data.

5. A reproducing device according to claim 4, further equipped with means for determining whether or not a copy inhibit identification code is recorded at the third management area.

6. A reproducing device according to claim 4, wherein the third determining means determines whether or not a third management area exists by determining whether or not a code corresponding to "MIEX" is recorded.

7. A reproducing device according to claim 5, further comprising control means for inhibiting reproducing when a copy inhibit identification code is recorded at the management area.

8. A reproducing device for reproducing data from a recording medium comprising:
    a first recordable area for recording first-type data composed of at least one program;
    a second recordable area for recording second-type data composed of at least one file;
    a third recordable area for recording second-type data composed of at least one file;
    a first management area for managing the at least one program of the first recordable area and at least one file of the second recordable area, first management data comprising a corresponding part table indicating data for indicating a part table, the part table manages the start address, end address of part of a program, and link information for indicating next slot address to be linked;
    a second management area for managing the at least one file of the second recordable area; and
    a third management area for managing at least one file of the third recordable area, recorded at a position having an address offset by a prescribed extent from within the first management area, said reproducing device comprising:
        reproducing means for reproducing recorded information;
        arithmetic means for carrying out a prescribed operation based on an address of a first management area read-out by the reproducing means; and
        control means for accessing the first management area read-out by the reproducing means based on results of a calculation carried out by the arithmetic means and
        accessing file data based on third management data read out by the reproducing means.

9. A reproducing device according to claim 8, further equipped with means for determining whether or not a copy inhibit identification code exists at the third management area.

10. A reproducing device according to claim 9, further comprising control means for inhibiting reproducing when a copy inhibit identification code is recorded at the management area.

11. A reproducing method for reproducing data from a recording medium having:
    a first recordable area for recording first-type data composed of at least one program;
    a second recordable area for recording second-type data composed of at least one file;
    a first management area for managing the at least one program of the first recordable area and at least one file of the second recordable area, and first management data comprising a corresponding part table indicating data for indicating a part table, the part table manages the start address and end address of part of a program, start address and end address of part of the second recordable area, and link information for indicating next slot address to be linked; and
    a second management area for managing the at least one file, the reproducing method comprising the steps of:
        reproducing the first management data from the first management area;
        determining whether or not second-type data has been reproduced from the first management area;
        accessing the management area in accordance with the first management data and reproducing the second management data when existence of the second-type data on the recording medium is determined; and
        reproducing file data in accordance with the second management data of the second management area.

12. A reproducing method for reproducing data from a recording medium having:
    a first recordable area for recording first-type data composed of at least one program;
    a second recordable area for recording second-type data composed of at least one file;
    a third recordable area for recording second-type data composed of at least one file;
    a first management area for managing the at least one program of the first recordable area, at least one file of the second recordable area and a defective area on the medium, first management data comprising a corresponding part table indicating data for indicating a part table, the part table manages the start address, end address of part of the part program or defective area, and link information for indicating next slot address to be linked;
    a second management area for managing the at least one file of the second recordable area; and
    a third management area for managing at least one file of the third recordable area, the reproducing method comprising the steps of:
        reproducing the first management data of the first management area;
        determining in a first determination step whether or not a defective area is being managed within the first management data of the first management area;
        accessing the defective area based upon the first management data when determined in the first determination that a defective area exists;
        determining in a second determination whether or not an error data exists in the accessed defective area;
        determining in a third determination whether or not a third management area exists in accordance with a result of the second determination;
        reproducing the third management data of the third management area when a third management area is determined to exist in the third determination; and
        accessing the at least one file data based on the reproduced third management data.

13. A reproducing method according to claim 12, wherein the third determination for determining whether or not a third management area exists determines whether or not a code corresponding to "MIEX" exists.

* * * * *